(12) United States Patent
Peck et al.

(10) Patent No.: US 9,895,673 B2
(45) Date of Patent: Feb. 20, 2018

(54) FUNCTIONALIZED SURFACES AND PREPARATION THEREOF

(71) Applicant: TWIST BIOSCIENCE CORPORATION, San Francisco, CA (US)

(72) Inventors: Bill James Peck, Santa Clara, CA (US); Pierre Indermuhle, Berkeley, CA (US); Eugene P. Marsh, El Granada, CA (US); Andres Fernandez, San Francisco, CA (US); David Stern, Mountain View, CA (US)

(73) Assignee: TWIST BIOSCIENCE CORPORATION, San Francisco, CA (US)

(*) Notice: Subject to any disclaimer, the term of this patent is extended or adjusted under 35 U.S.C. 154(b) by 0 days.

(21) Appl. No.: 15/365,826

(22) Filed: Nov. 30, 2016

(65) Prior Publication Data
US 2017/0151546 A1 Jun. 1, 2017

Related U.S. Application Data

(60) Provisional application No. 62/261,753, filed on Dec. 1, 2015.

(51) Int. Cl.
C40B 50/18 (2006.01)
B01J 19/00 (2006.01)
C12N 15/10 (2006.01)

(52) U.S. Cl.
CPC ...... B01J 19/0046 (2013.01); C12N 15/1093 (2013.01); *B01J 2219/00596* (2013.01); *B01J 2219/00608* (2013.01); *B01J 2219/00693* (2013.01); *B01J 2219/00711* (2013.01); *B01J 2219/00722* (2013.01)

(58) Field of Classification Search
None
See application file for complete search history.

(56) References Cited

U.S. PATENT DOCUMENTS

| | | |
|---|---|---|
| 3,549,368 A | 12/1970 | Collins et al. |
| 3,920,714 A | 11/1975 | Streck |
| 4,123,661 A | 10/1978 | Wolf et al. |
| 4,415,732 A | 11/1983 | Caruthers et al. |
| 4,613,398 A | 9/1986 | Chiong et al. |
| 4,726,877 A | 2/1988 | Fryd et al. |
| 4,808,511 A | 2/1989 | Holmes |
| 4,837,401 A | 6/1989 | Hirose et al. |
| 4,863,557 A | 9/1989 | Kokaku et al. |
| 4,981,797 A | 1/1991 | Jessee et al. |
| 4,988,617 A | 1/1991 | Landegren et al. |
| 5,102,797 A | 4/1992 | Tucker et al. |
| 5,137,814 A | 8/1992 | Rashtchian et al. |
| 5,143,854 A | 9/1992 | Pirrung et al. |
| 5,242,794 A | 9/1993 | Whiteley et al. |
| 5,242,974 A | 9/1993 | Holmes |
| 5,288,514 A | 2/1994 | Ellman |
| 5,299,491 A | 4/1994 | Kawada |
| 5,384,261 A | 1/1995 | Winkler et al. |
| 5,387,541 A | 2/1995 | Hodge et al. |
| 5,395,753 A | 3/1995 | Prakash |
| 5,431,720 A | 7/1995 | Nagai et al. |
| 5,445,934 A | 8/1995 | Fodor et al. |
| 5,449,754 A | 9/1995 | Nishioka |
| 5,459,039 A | 10/1995 | Modrich et al. |
| 5,474,796 A | 12/1995 | Brennan |
| 5,476,930 A | 12/1995 | Letsinger et al. |
| 5,487,993 A | 1/1996 | Herrnstadt et al. |
| 5,494,810 A | 2/1996 | Barany et al. |
| 5,501,893 A | 3/1996 | Laermer et al. |
| 5,508,169 A | 4/1996 | Deugau et al. |
| 5,510,270 A | 4/1996 | Fodor et al. |
| 5,514,789 A | 5/1996 | Kempe |
| 5,527,681 A | 6/1996 | Holmes |
| 5,530,516 A | 6/1996 | Sheets |
| 5,556,750 A | 9/1996 | Modrich et al. |
| 5,586,211 A | 12/1996 | Dumitrou et al. |
| 5,641,658 A | 6/1997 | Adams et al. |
| 5,677,195 A | 10/1997 | Winkler et al. |
| 5,679,522 A | 10/1997 | Modrich et al. |
| 5,700,637 A | 12/1997 | Southern |
| 5,700,642 A | 12/1997 | Monforte et al. |
| 5,702,894 A | 12/1997 | Modrich et al. |
| 5,707,806 A | 1/1998 | Shuber |
| 5,712,124 A | 1/1998 | Walker |
| 5,739,386 A | 4/1998 | Holmes |

(Continued)

FOREIGN PATENT DOCUMENTS

| | | |
|---|---|---|
| AU | 3157000 A | 9/2000 |
| CA | 2362939 A1 | 8/2000 |

(Continued)

OTHER PUBLICATIONS

Brunet, Aims and methods of biosteganography. Journal of Biotechnology, 226:56-64, 2016.
Church et al., Next-generation digital information storage in DNA. Science, 337:6102, 1628-1629, 2012.
Cohen et al., Human population: The next half century. Science, 302:1172-1175, 2003.
Elsik et al., The Genome sequence of taurine cattle: A window of ruminant biology and evolution. Science, 324:522-528, 2009.
Gu et al., Depletion of abundant sequences by hybridization (DASH): using Cas9 to remove unwanted high-abundance species in sequencing libraries and molecular counting applications. Genome Biology, 17:41, 13 pages, 2016.

(Continued)

*Primary Examiner* — Christopher M Gross
(74) *Attorney, Agent, or Firm* — Wilson Sonsini Goodrich & Rosati

(57) ABSTRACT

Compositions, devices, methods and systems are provided for differential functionalization of a surface of a structure to support biopolymer synthesis. Provided herein are processes which include use of lamps, lasers, and/or microcontact printing to add functional groups to surfaces for the efficient and uniform synthesis of oligonucleic acids.

21 Claims, 28 Drawing Sheets

(56) References Cited

U.S. PATENT DOCUMENTS

| | | |
|---|---|---|
| 5,750,672 A | 5/1998 | Kempe |
| 5,780,613 A | 7/1998 | Letsinger et al. |
| 5,830,655 A | 11/1998 | Monforte et al. |
| 5,830,662 A | 11/1998 | Soares et al. |
| 5,834,252 A | 11/1998 | Stemmer et al. |
| 5,843,767 A | 12/1998 | Beattie |
| 5,858,754 A | 1/1999 | Modrich et al. |
| 5,861,482 A | 1/1999 | Modrich et al. |
| 5,869,245 A | 2/1999 | Yeung |
| 5,877,280 A | 3/1999 | Wetmur |
| 5,882,496 A | 3/1999 | Northrup et al. |
| 5,922,539 A | 7/1999 | Modrich et al. |
| 5,922,593 A | 7/1999 | Livingston |
| 5,928,907 A | 7/1999 | Woudenberg et al. |
| 5,976,846 A | 11/1999 | Passmore et al. |
| 6,008,031 A | 12/1999 | Modrich et al. |
| 6,013,440 A | 1/2000 | Lipshutz et al. |
| 6,015,674 A | 1/2000 | Woudenberg et al. |
| 6,027,898 A | 2/2000 | Gjerde et al. |
| 6,028,189 A | 2/2000 | Blanchard |
| 6,028,198 A | 2/2000 | Liu et al. |
| 6,040,138 A | 3/2000 | Lockhart et al. |
| 6,077,674 A | 6/2000 | Schleifer et al. |
| 6,103,474 A | 8/2000 | Dellinger et al. |
| 6,107,038 A | 8/2000 | Choudhary et al. |
| 6,110,682 A | 8/2000 | Dellinger et al. |
| 6,114,115 A | 9/2000 | Wagner, Jr. |
| 6,132,997 A | 10/2000 | Shannon |
| 6,136,568 A | 10/2000 | Hiatt et al. |
| 6,171,797 B1 | 1/2001 | Perbost |
| 6,180,351 B1 | 1/2001 | Cattell |
| 6,201,112 B1 | 3/2001 | Ach |
| 6,218,118 B1 | 4/2001 | Sampson et al. |
| 6,221,653 B1 | 4/2001 | Caren et al. |
| 6,222,030 B1 | 4/2001 | Dellinger et al. |
| 6,232,072 B1 | 5/2001 | Fisher |
| 6,235,483 B1 | 5/2001 | Wolber et al. |
| 6,242,266 B1 | 6/2001 | Schleifer et al. |
| 6,251,588 B1 | 6/2001 | Shannon et al. |
| 6,251,595 B1 | 6/2001 | Gordon et al. |
| 6,251,685 B1 | 6/2001 | Dorsel et al. |
| 6,258,454 B1 | 7/2001 | Lefkowitz et al. |
| 6,262,490 B1 | 7/2001 | Hsu et al. |
| 6,274,725 B1 | 8/2001 | Sanghvi et al. |
| 6,284,465 B1 | 9/2001 | Wolber |
| 6,287,776 B1 | 9/2001 | Hefti |
| 6,297,017 B1 | 10/2001 | Schmidt et al. |
| 6,300,137 B1 | 10/2001 | Earhart et al. |
| 6,306,599 B1 | 10/2001 | Perbost |
| 6,309,822 B1 | 10/2001 | Fodor et al. |
| 6,309,828 B1 | 10/2001 | Schleifer et al. |
| 6,319,674 B1 | 11/2001 | Fulcrand et al. |
| 6,323,043 B1 | 11/2001 | Caren et al. |
| 6,329,210 B1 | 12/2001 | Schleifer |
| 6,346,423 B1 | 2/2002 | Schembri |
| 6,365,355 B1 | 4/2002 | McCutchen-Maloney |
| 6,372,483 B2 | 4/2002 | Schleifer et al. |
| 6,375,903 B1 | 4/2002 | Cerrina et al. |
| 6,376,285 B1 | 4/2002 | Joyner et al. |
| 6,384,210 B1 | 5/2002 | Blanchard |
| 6,387,636 B1 | 5/2002 | Perbost et al. |
| 6,399,394 B1 | 6/2002 | Dahm et al. |
| 6,399,516 B1 | 6/2002 | Ayon |
| 6,403,314 B1 | 6/2002 | Lange et al. |
| 6,406,849 B1 | 6/2002 | Dorsel et al. |
| 6,406,851 B1 | 6/2002 | Bass |
| 6,419,883 B1 | 7/2002 | Blanchard |
| 6,428,957 B1 | 8/2002 | Delenstarr |
| 6,440,669 B1 | 8/2002 | Bass et al. |
| 6,444,268 B2 | 9/2002 | Lefkowitz et al. |
| 6,446,642 B1 | 9/2002 | Caren et al. |
| 6,446,682 B1 | 9/2002 | Viken |
| 6,451,998 B1 | 9/2002 | Perbost |
| 6,458,526 B1 | 10/2002 | Schembri et al. |
| 6,458,583 B1 | 10/2002 | Bruhn et al. |
| 6,461,812 B2 | 10/2002 | Barth et al. |
| 6,461,816 B1 | 10/2002 | Wolber et al. |
| 6,469,156 B1 | 10/2002 | Schafer et al. |
| 6,492,107 B1 | 12/2002 | Kauffman et al. |
| 6,518,056 B2 | 2/2003 | Schembri et al. |
| 6,521,427 B1 | 2/2003 | Evans |
| 6,521,453 B1 | 2/2003 | Crameri et al. |
| 6,558,908 B2 | 5/2003 | Wolber et al. |
| 6,566,495 B1 | 5/2003 | Fodor et al. |
| 6,582,908 B2 | 6/2003 | Fodor et al. |
| 6,582,938 B1 | 6/2003 | Su et al. |
| 6,586,211 B1 | 7/2003 | Staehler et al. |
| 6,587,579 B1 | 7/2003 | Bass |
| 6,589,739 B2 | 7/2003 | Fisher |
| 6,599,693 B1 | 7/2003 | Webb |
| 6,602,472 B1 | 8/2003 | Zimmermann et al. |
| 6,610,978 B2 | 8/2003 | Yin et al. |
| 6,613,513 B1 | 9/2003 | Parce et al. |
| 6,613,523 B2 | 9/2003 | Fischer |
| 6,613,560 B1 | 9/2003 | Tso et al. |
| 6,613,893 B1 | 9/2003 | Webb |
| 6,621,076 B1 | 9/2003 | Van De Goor et al. |
| 6,630,581 B2 | 10/2003 | Dellinger et al. |
| 6,632,641 B1 | 10/2003 | Brennan et al. |
| 6,635,226 B1 | 10/2003 | Tso et al. |
| 6,642,373 B2 | 11/2003 | Manoharan et al. |
| 6,649,348 B2 | 11/2003 | Bass et al. |
| 6,660,338 B1 | 12/2003 | Hargreaves |
| 6,664,112 B2 | 12/2003 | Mulligan et al. |
| 6,670,127 B2 | 12/2003 | Evans |
| 6,670,461 B1 | 12/2003 | Wengel et al. |
| 6,673,552 B2 | 1/2004 | Frey |
| 6,682,702 B2 | 1/2004 | Barth et al. |
| 6,689,319 B1 | 2/2004 | Fisher et al. |
| 6,702,256 B2 | 3/2004 | Killeen et al. |
| 6,706,875 B1 | 3/2004 | Goldberg et al. |
| 6,709,852 B1 | 3/2004 | Bloom et al. |
| 6,709,854 B2 | 3/2004 | Donahue et al. |
| 6,713,262 B2 | 3/2004 | Gillibolian et al. |
| 6,716,629 B2 | 4/2004 | Hess et al. |
| 6,716,634 B1 | 4/2004 | Myerson |
| 6,723,509 B2 | 4/2004 | Ach |
| 6,743,585 B2 | 6/2004 | Dellinger et al. |
| 6,753,145 B2 | 6/2004 | Holcomb et al. |
| 6,768,005 B2 | 7/2004 | Mellor et al. |
| 6,770,748 B2 | 8/2004 | Imanishi et al. |
| 6,770,892 B2 | 8/2004 | Corson et al. |
| 6,773,676 B2 | 8/2004 | Schembri |
| 6,773,888 B2 | 8/2004 | Li et al. |
| 6,787,308 B2 | 9/2004 | Balasubramanian et al. |
| 6,789,965 B2 | 9/2004 | Barth et al. |
| 6,790,620 B2 | 9/2004 | Bass et al. |
| 6,794,499 B2 | 9/2004 | Wengel et al. |
| 6,796,634 B2 | 9/2004 | Caren et al. |
| 6,800,439 B1 | 10/2004 | McGall et al. |
| 6,814,846 B1 | 11/2004 | Berndt |
| 6,815,218 B1 | 11/2004 | Jacobson et al. |
| 6,824,866 B1 | 11/2004 | Glazer et al. |
| 6,830,890 B2 | 12/2004 | Lockhart et al. |
| 6,833,246 B2 | 12/2004 | Balasubramanian |
| 6,833,450 B1 | 12/2004 | McGall et al. |
| 6,835,938 B2 | 12/2004 | Ghosh et al. |
| 6,838,888 B2 | 1/2005 | Peck |
| 6,841,131 B2 | 1/2005 | Zimmermann et al. |
| 6,845,968 B2 | 1/2005 | Killeen et al. |
| 6,846,454 B2 | 1/2005 | Peck |
| 6,846,922 B1 | 1/2005 | Manoharan et al. |
| 6,852,850 B2 | 2/2005 | Myerson et al. |
| 6,858,720 B2 | 2/2005 | Myerson et al. |
| 6,879,915 B2 | 4/2005 | Cattell |
| 6,880,576 B2 | 4/2005 | Karp et al. |
| 6,884,580 B2 | 4/2005 | Caren et al. |
| 6,887,715 B2 | 5/2005 | Schembri |
| 6,890,723 B2 | 5/2005 | Perbost et al. |
| 6,890,760 B1 | 5/2005 | Webb |
| 6,893,816 B1 | 5/2005 | Beattie |
| 6,897,023 B2 | 5/2005 | Fu et al. |
| 6,900,047 B2 | 5/2005 | Bass |
| 6,900,048 B2 | 5/2005 | Perbost |

(56) References Cited

U.S. PATENT DOCUMENTS

| | | |
|---|---|---|
| 6,911,611 B2 | 6/2005 | Wong et al. |
| 6,914,229 B2 | 7/2005 | Corson et al. |
| 6,916,113 B2 | 7/2005 | Van De Goor et al. |
| 6,916,633 B1 | 7/2005 | Shannon |
| 6,919,181 B2 | 7/2005 | Hargreaves |
| 6,927,029 B2 | 8/2005 | Lefkowitz et al. |
| 6,929,951 B2 | 8/2005 | Corson et al. |
| 6,936,472 B2 | 8/2005 | Earhart et al. |
| 6,938,476 B2 | 9/2005 | Chesk |
| 6,939,673 B2 | 9/2005 | Bass et al. |
| 6,943,036 B2 | 9/2005 | Bass |
| 6,946,285 B2 | 9/2005 | Bass |
| 6,950,756 B2 | 9/2005 | Kincaid |
| 6,958,119 B2 | 10/2005 | Yin et al. |
| 6,960,464 B2 | 11/2005 | Jessee et al. |
| 6,969,488 B2 | 11/2005 | Bridgham et al. |
| 6,976,384 B2 | 12/2005 | Hobbs et al. |
| 6,977,223 B2 | 12/2005 | George et al. |
| 6,987,263 B2 | 1/2006 | Hobbs et al. |
| 6,989,267 B2 | 1/2006 | Kim et al. |
| 7,008,037 B2 | 3/2006 | Caren et al. |
| 7,025,324 B1 | 4/2006 | Slocum et al. |
| 7,026,124 B2 | 4/2006 | Barth et al. |
| 7,027,930 B2 | 4/2006 | Cattell |
| 7,028,536 B2 | 4/2006 | Karp et al. |
| 7,029,854 B2 | 4/2006 | Collins et al. |
| 7,034,290 B2 | 4/2006 | Lu et al. |
| 7,051,574 B2 | 5/2006 | Peck |
| 7,052,841 B2 | 5/2006 | Delenstarr |
| 7,062,385 B2 | 6/2006 | White et al. |
| 7,064,197 B1 | 6/2006 | Rabbani et al. |
| 7,070,932 B2 | 7/2006 | Leproust et al. |
| 7,075,161 B2 | 7/2006 | Barth |
| 7,078,167 B2 | 7/2006 | Delenstarr et al. |
| 7,078,505 B2 | 7/2006 | Bass et al. |
| 7,094,537 B2 | 8/2006 | Leproust et al. |
| 7,097,974 B1 | 8/2006 | Staehler et al. |
| 7,101,508 B2 | 9/2006 | Thompson et al. |
| 7,101,986 B2 | 9/2006 | Dellinger et al. |
| 7,105,295 B2 | 9/2006 | Bass et al. |
| 7,115,423 B1 | 10/2006 | Mitchell |
| 7,122,303 B2 | 10/2006 | Delenstarr et al. |
| 7,125,488 B2 | 10/2006 | Li |
| 7,125,523 B2 | 10/2006 | Sillman |
| 7,128,876 B2 | 10/2006 | Yin et al. |
| 7,129,075 B2 | 10/2006 | Gerard et al. |
| 7,135,565 B2 | 11/2006 | Dellinger et al. |
| 7,138,062 B2 | 11/2006 | Yin et al. |
| 7,141,368 B2 | 11/2006 | Fisher et al. |
| 7,141,807 B2 | 11/2006 | Joyce et al. |
| 7,147,362 B2 | 12/2006 | Caren et al. |
| 7,153,689 B2 | 12/2006 | Tolosko et al. |
| 7,163,660 B2 | 1/2007 | Lehmann |
| 7,166,258 B2 | 1/2007 | Bass et al. |
| 7,179,659 B2 | 2/2007 | Stolowitz et al. |
| 7,183,406 B2 | 2/2007 | Belshaw et al. |
| 7,192,710 B2 | 3/2007 | Gellibolian et al. |
| 7,193,077 B2 | 3/2007 | Dellinger et al. |
| 7,198,939 B2 | 4/2007 | Dorsel et al. |
| 7,202,264 B2 | 4/2007 | Ravikumar et al. |
| 7,202,358 B2 | 4/2007 | Hargreaves |
| 7,205,128 B2 | 4/2007 | Ilsley et al. |
| 7,205,400 B2 | 4/2007 | Webb |
| 7,206,439 B2 | 4/2007 | Zhou et al. |
| 7,208,322 B2 | 4/2007 | Stolowitz et al. |
| 7,217,522 B2 | 5/2007 | Brenner |
| 7,220,573 B2 | 5/2007 | Shea et al. |
| 7,221,785 B2 | 5/2007 | Curry et al. |
| 7,226,862 B2 | 6/2007 | Staehler et al. |
| 7,227,017 B2 | 6/2007 | Mellor et al. |
| 7,229,497 B2 | 6/2007 | Stott et al. |
| 7,247,337 B1 | 7/2007 | Leproust et al. |
| 7,247,497 B2 | 7/2007 | Dahm et al. |
| 7,252,938 B2 | 8/2007 | Leproust et al. |
| 7,269,518 B2 | 9/2007 | Corson |
| 7,271,258 B2 | 9/2007 | Dellinger et al. |
| 7,276,336 B1 | 10/2007 | Webb et al. |
| 7,276,378 B2 | 10/2007 | Myerson |
| 7,276,599 B2 | 10/2007 | Moore et al. |
| 7,282,183 B2 | 10/2007 | Peck |
| 7,282,332 B2 | 10/2007 | Caren et al. |
| 7,282,705 B2 | 10/2007 | Brennen |
| 7,291,471 B2 | 11/2007 | Sampson et al. |
| 7,302,348 B2 | 11/2007 | Ghosh et al. |
| 7,314,599 B2 | 1/2008 | Roitman et al. |
| 7,323,320 B2 | 1/2008 | Oleinikov |
| 7,344,831 B2 | 3/2008 | Wolber et al. |
| 7,348,144 B2 | 3/2008 | Minor |
| 7,351,379 B2 | 4/2008 | Schleifer |
| 7,353,116 B2 | 4/2008 | Webb et al. |
| 7,361,906 B2 | 4/2008 | Ghosh et al. |
| 7,364,896 B2 | 4/2008 | Schembri |
| 7,368,550 B2 | 5/2008 | Dellinger et al. |
| 7,371,348 B2 | 5/2008 | Schleifer et al. |
| 7,371,519 B2 | 5/2008 | Wolber et al. |
| 7,371,580 B2 | 5/2008 | Yakhini et al. |
| 7,372,982 B2 | 5/2008 | Le Cocq |
| 7,385,050 B2 | 6/2008 | Dellinger et al. |
| 7,390,457 B2 | 6/2008 | Schembri |
| 7,393,665 B2 | 7/2008 | Brenner |
| 7,396,676 B2 | 7/2008 | Robotti et al. |
| 7,399,844 B2 | 7/2008 | Sampson et al. |
| 7,402,279 B2 | 7/2008 | Schembri |
| 7,411,061 B2 | 8/2008 | Myerson et al. |
| 7,413,709 B2 | 8/2008 | Roitman et al. |
| 7,417,139 B2 | 8/2008 | Dellinger et al. |
| 7,422,911 B2 | 9/2008 | Schembri |
| 7,427,679 B2 | 9/2008 | Dellinger et al. |
| 7,435,810 B2 | 10/2008 | Myerson et al. |
| 7,439,272 B2 | 10/2008 | Xu |
| 7,476,709 B2 | 1/2009 | Moody et al. |
| 7,488,607 B2 | 2/2009 | Tom-Moy et al. |
| 7,504,213 B2 | 3/2009 | Sana et al. |
| 7,514,369 B2 | 4/2009 | Li et al. |
| 7,517,979 B2 | 4/2009 | Wolber |
| 7,524,942 B2 | 4/2009 | Wang et al. |
| 7,524,950 B2 | 4/2009 | Dellinger et al. |
| 7,531,303 B2 | 5/2009 | Dorsel et al. |
| 7,534,561 B2 | 5/2009 | Sana et al. |
| 7,534,563 B2 | 5/2009 | Hargreaves |
| 7,537,936 B2 | 5/2009 | Dahm et al. |
| 7,563,600 B2 | 7/2009 | Oleinikov |
| 7,572,585 B2 | 8/2009 | Wang |
| 7,572,907 B2 | 8/2009 | Dellinger et al. |
| 7,572,908 B2 | 8/2009 | Dellinger et al. |
| 7,585,970 B2 | 9/2009 | Dellinger et al. |
| 7,588,889 B2 | 9/2009 | Wolber et al. |
| 7,595,350 B2 | 9/2009 | Xu |
| 7,604,941 B2 | 10/2009 | Jacobson |
| 7,608,396 B2 | 10/2009 | Delenstarr |
| 7,618,777 B2 | 11/2009 | Myerson et al. |
| 7,629,120 B2 | 12/2009 | Bennett et al. |
| 7,635,772 B2 | 12/2009 | McCormac |
| 7,648,832 B2 | 1/2010 | Jessee et al. |
| 7,651,762 B2 | 1/2010 | Xu et al. |
| 7,659,069 B2 | 2/2010 | Belyaev et al. |
| 7,682,809 B2 | 3/2010 | Sampson |
| 7,709,197 B2 | 5/2010 | Drmanac |
| 7,718,365 B2 | 5/2010 | Wang |
| 7,737,088 B1 | 6/2010 | Staehler et al. |
| 7,737,089 B2 | 6/2010 | Guimil et al. |
| 7,749,701 B2 | 7/2010 | Leproust et al. |
| 7,759,471 B2 | 7/2010 | Dellinger et al. |
| 7,776,021 B2 | 8/2010 | Borenstein et al. |
| 7,790,369 B2 | 9/2010 | Stahler et al. |
| 7,790,387 B2 | 9/2010 | Dellinger et al. |
| 7,807,356 B2 | 10/2010 | Sampson et al. |
| 7,811,753 B2 | 10/2010 | Eshoo |
| 7,816,079 B2 | 10/2010 | Fischer |
| 7,855,281 B2 | 12/2010 | Dellinger et al. |
| 7,867,782 B2 | 1/2011 | Barth |
| 7,875,463 B2 | 1/2011 | Adaskin et al. |
| 7,879,541 B2 | 2/2011 | Kincaid |
| 7,879,580 B2 | 2/2011 | Carr et al. |

(56) References Cited

U.S. PATENT DOCUMENTS

| | | | |
|---|---|---|---|
| 7,894,998 B2 | 2/2011 | Kincaid |
| 7,919,239 B2 | 4/2011 | Wang |
| 7,919,308 B2 | 4/2011 | Schleifer |
| 7,927,797 B2 | 4/2011 | Nobile et al. |
| 7,927,838 B2 | 4/2011 | Shannon |
| 7,932,025 B2 | 4/2011 | Carr et al. |
| 7,932,070 B2 | 4/2011 | Hogrefe et al. |
| 7,939,645 B2 | 5/2011 | Borns |
| 7,943,046 B2 | 5/2011 | Martosella et al. |
| 7,943,358 B2 | 5/2011 | Hogrefe et al. |
| 7,960,157 B2 | 6/2011 | Borns |
| 7,977,119 B2 | 7/2011 | Kronick et al. |
| 7,979,215 B2 | 7/2011 | Sampas |
| 7,998,437 B2 | 8/2011 | Berndt et al. |
| 7,999,087 B2 | 8/2011 | Dellinger et al. |
| 8,021,844 B2 | 9/2011 | Wang |
| 8,048,664 B2 | 11/2011 | Guan et al. |
| 8,053,191 B2 | 11/2011 | Blake |
| 8,058,001 B2 | 11/2011 | Crameri et al. |
| 8,058,004 B2 | 11/2011 | Oleinikov |
| 8,058,055 B2 | 11/2011 | Barrett et al. |
| 8,067,556 B2 | 11/2011 | Hogrefe et al. |
| 8,073,626 B2 | 12/2011 | Troup et al. |
| 8,076,064 B2 | 12/2011 | Wang |
| 8,076,152 B2 | 12/2011 | Robotti |
| 8,097,711 B2 | 1/2012 | Timar et al. |
| 8,148,068 B2 | 4/2012 | Brenner |
| 8,154,729 B2 | 4/2012 | Baldo et al. |
| 8,168,385 B2 | 5/2012 | Brenner |
| 8,168,388 B2 | 5/2012 | Gormley et al. |
| 8,173,368 B2 | 5/2012 | Staehler et al. |
| 8,194,244 B2 | 6/2012 | Wang et al. |
| 8,198,071 B2 | 6/2012 | Goshoo et al. |
| 8,202,983 B2 | 6/2012 | Dellinger et al. |
| 8,202,985 B2 | 6/2012 | Dellinger et al. |
| 8,206,952 B2 | 6/2012 | Carr et al. |
| 8,213,015 B2 | 7/2012 | Kraiczek et al. |
| 8,242,258 B2 | 8/2012 | Dellinger et al. |
| 8,247,221 B2 | 8/2012 | Fawcett |
| 8,263,335 B2 | 9/2012 | Carr et al. |
| 8,268,605 B2 | 9/2012 | Sorge et al. |
| 8,283,148 B2 | 10/2012 | Sorge et al. |
| 8,298,767 B2 | 10/2012 | Brenner et al. |
| 8,304,273 B2 | 11/2012 | Stellacci et al. |
| 8,309,307 B2 | 11/2012 | Barrett et al. |
| 8,309,706 B2 | 11/2012 | Dellinger et al. |
| 8,309,710 B2 | 11/2012 | Sierzchala et al. |
| 8,314,220 B2 | 11/2012 | Mullinax et al. |
| 8,318,433 B2 | 11/2012 | Brenner |
| 8,318,479 B2 | 11/2012 | Domansky et al. |
| 8,357,489 B2 | 1/2013 | Chua et al. |
| 8,357,490 B2 | 1/2013 | Froehlich et al. |
| 8,367,016 B2 | 2/2013 | Quan et al. |
| 8,367,335 B2 | 2/2013 | Staehler et al. |
| 8,380,441 B2 | 2/2013 | Webb et al. |
| 8,415,138 B2 | 4/2013 | Leproust |
| 8,435,736 B2 | 5/2013 | Gibson et al. |
| 8,470,996 B2 | 6/2013 | Brenner |
| 8,476,018 B2 | 7/2013 | Brenner |
| 8,476,598 B1 | 7/2013 | Pralle et al. |
| 8,481,292 B2 | 7/2013 | Casbon et al. |
| 8,481,309 B2 | 7/2013 | Zhang et al. |
| 8,491,561 B2 | 7/2013 | Borenstein et al. |
| 8,507,226 B2 | 8/2013 | Carr et al. |
| 8,507,239 B2 | 8/2013 | Lubys et al. |
| 8,507,272 B2 | 8/2013 | Zhang et al. |
| 8,530,197 B2 | 9/2013 | Li et al. |
| 8,552,174 B2 | 10/2013 | Dellinger et al. |
| 8,569,046 B2 | 10/2013 | Love et al. |
| 8,577,621 B2 | 11/2013 | Troup et al. |
| 8,614,092 B2 | 12/2013 | Zhang et al. |
| 8,642,755 B2 | 2/2014 | Sierzchala et al. |
| 8,664,164 B2 | 3/2014 | Ericsson et al. |
| 8,679,756 B1 | 3/2014 | Brenner et al. |
| 8,685,642 B2 | 4/2014 | Sampas |
| 8,685,676 B2 | 4/2014 | Hogrefe et al. |
| 8,685,678 B2 | 4/2014 | Casbon et al. |
| 8,715,933 B2 | 5/2014 | Oliver |
| 8,715,967 B2 | 5/2014 | Casbon et al. |
| 8,716,467 B2 | 5/2014 | Jacobson |
| 8,722,368 B2 | 5/2014 | Casbon et al. |
| 8,722,585 B2 | 5/2014 | Wang |
| 8,728,766 B2 | 5/2014 | Casbon et al. |
| 8,741,606 B2 | 6/2014 | Casbon et al. |
| 8,808,896 B2 | 8/2014 | Choo et al. |
| 8,808,986 B2 | 8/2014 | Jacobson et al. |
| 8,889,851 B2 | 11/2014 | Leproust et al. |
| 9,018,365 B2 | 4/2015 | Brenner |
| 9,023,601 B2 | 5/2015 | Oleinikov |
| 9,051,666 B2 | 6/2015 | Oleinikov |
| 9,073,962 B2 | 7/2015 | Fracchia et al. |
| 9,074,204 B2 | 7/2015 | Anderson et al. |
| 9,085,797 B2 | 7/2015 | Gebeyehu et al. |
| 9,133,510 B2 | 9/2015 | Andersen et al. |
| 9,139,874 B2 | 9/2015 | Myers et al. |
| 9,150,853 B2 | 10/2015 | Hudson et al. |
| 9,187,777 B2 | 11/2015 | Jacobson et al. |
| 9,194,001 B2 | 11/2015 | Brenner |
| 9,216,414 B2 | 12/2015 | Chu |
| 9,217,144 B2 | 12/2015 | Jacobson et al. |
| 9,279,149 B2 | 3/2016 | Efcavitch et al. |
| 9,286,439 B2 | 3/2016 | Shapiro et al. |
| 9,295,965 B2 | 3/2016 | Jacobson et al. |
| 9,315,861 B2 | 4/2016 | Hendricks et al. |
| 9,375,748 B2 | 6/2016 | Harumoto et al. |
| 9,376,677 B2 | 6/2016 | Mir |
| 9,388,407 B2 | 7/2016 | Jacobson |
| 9,394,333 B2 | 7/2016 | Wada et al. |
| 9,403,141 B2 | 8/2016 | Banyai et al. |
| 9,409,139 B2 | 8/2016 | Banyai et al. |
| 9,410,149 B2 | 8/2016 | Brenner et al. |
| 9,422,600 B2 | 8/2016 | Ramu et al. |
| 9,555,388 B2 | 1/2017 | Banyai et al. |
| 9,670,529 B2 | 6/2017 | Osborne et al. |
| 9,670,536 B2 | 6/2017 | Casbon et al. |
| 9,677,067 B2 | 6/2017 | Toro et al. |
| 9,695,211 B2 | 7/2017 | Wada et al. |
| 2001/0018512 A1 | 8/2001 | Blanchard |
| 2001/0039014 A1 | 11/2001 | Bass et al. |
| 2001/0055761 A1 | 12/2001 | Kanemoto et al. |
| 2002/0012930 A1 | 1/2002 | Rothberg et al. |
| 2002/0076716 A1 | 6/2002 | Sabanayagam et al. |
| 2002/0081582 A1 | 6/2002 | Gao et al. |
| 2002/0094533 A1 | 7/2002 | Hess et al. |
| 2002/0095073 A1 | 7/2002 | Jacobs et al. |
| 2002/0119459 A1 | 8/2002 | Griffiths et al. |
| 2002/0132308 A1 | 9/2002 | Liu et al. |
| 2002/0155439 A1 | 10/2002 | Rodriguez et al. |
| 2002/0160536 A1 | 10/2002 | Regnier et al. |
| 2002/0164824 A1 | 11/2002 | Xiao et al. |
| 2003/0008411 A1 | 1/2003 | Van Dam et al. |
| 2003/0022207 A1 | 1/2003 | Balasubramanian et al. |
| 2003/0022317 A1 | 1/2003 | Jack et al. |
| 2003/0044781 A1 | 3/2003 | Korlach et al. |
| 2003/0058629 A1 | 3/2003 | Hirai et al. |
| 2003/0064398 A1 | 4/2003 | Barnes |
| 2003/0068633 A1 | 4/2003 | Belshaw et al. |
| 2003/0100102 A1 | 5/2003 | Rothberg et al. |
| 2003/0108903 A1 | 6/2003 | Wang et al. |
| 2003/0120035 A1 | 6/2003 | Gao et al. |
| 2003/0138782 A1 | 7/2003 | Evans |
| 2003/0143605 A1 | 7/2003 | Lok et al. |
| 2003/0148291 A1 | 8/2003 | Robotti |
| 2003/0148344 A1 | 8/2003 | Rothberg et al. |
| 2003/0171325 A1 | 9/2003 | Gascoyne et al. |
| 2003/0186226 A1 | 10/2003 | Brennan et al. |
| 2003/0228602 A1 | 12/2003 | Parker et al. |
| 2003/0228620 A1 | 12/2003 | Du |
| 2004/0043509 A1 | 3/2004 | Stahler et al. |
| 2004/0053362 A1 | 3/2004 | De Luca et al. |
| 2004/0086892 A1 | 5/2004 | Crothers et al. |
| 2004/0087008 A1 | 5/2004 | Schembri |
| 2004/0106130 A1 | 6/2004 | Besemer et al. |
| 2004/0106728 A1 | 6/2004 | McGall et al. |

(56) References Cited

U.S. PATENT DOCUMENTS

| | | |
|---|---|---|
| 2004/0110133 A1 | 6/2004 | Xu et al. |
| 2004/0175710 A1 | 9/2004 | Haushalter |
| 2004/0175734 A1 | 9/2004 | Stahler et al. |
| 2004/0191810 A1 | 9/2004 | Yamamoto |
| 2004/0236027 A1 | 11/2004 | Maeji et al. |
| 2004/0248161 A1 | 12/2004 | Rothberg et al. |
| 2005/0022895 A1 | 2/2005 | Barth et al. |
| 2005/0049796 A1 | 3/2005 | Webb et al. |
| 2005/0053968 A1 | 3/2005 | Bharadwaj et al. |
| 2005/0079510 A1 | 4/2005 | Berka et al. |
| 2005/0100932 A1 | 5/2005 | Lapidus et al. |
| 2005/0112608 A1 | 5/2005 | Grossman et al. |
| 2005/0124022 A1 | 6/2005 | Srinivasan et al. |
| 2005/0227235 A1 | 10/2005 | Carr et al. |
| 2005/0255477 A1 | 11/2005 | Carr et al. |
| 2005/0266045 A1 | 12/2005 | Canham et al. |
| 2005/0277125 A1 | 12/2005 | Benn et al. |
| 2005/0282158 A1 | 12/2005 | Landegren |
| 2006/0003381 A1 | 1/2006 | Gilmore et al. |
| 2006/0012784 A1 | 1/2006 | Ulmer |
| 2006/0012793 A1 | 1/2006 | Harris |
| 2006/0019084 A1 | 1/2006 | Pearson |
| 2006/0024678 A1 | 2/2006 | Buzby |
| 2006/0024711 A1 | 2/2006 | Lapidus et al. |
| 2006/0024721 A1 | 2/2006 | Pedersen |
| 2006/0076482 A1 | 4/2006 | Hobbs et al. |
| 2006/0078909 A1 | 4/2006 | Srinivasan et al. |
| 2006/0078927 A1 | 4/2006 | Peck et al. |
| 2006/0078937 A1 | 4/2006 | Korlach et al. |
| 2006/0127920 A1 | 6/2006 | Church et al. |
| 2006/0134638 A1 | 6/2006 | Mulligan et al. |
| 2006/0171855 A1 | 8/2006 | Yin et al. |
| 2006/0202330 A1 | 9/2006 | Reinhardt et al. |
| 2006/0203236 A1 | 9/2006 | Ji et al. |
| 2006/0203237 A1 | 9/2006 | Ji et al. |
| 2006/0207923 A1 | 9/2006 | Li |
| 2006/0219637 A1 | 10/2006 | Killeen et al. |
| 2007/0031857 A1 | 2/2007 | Makarov et al. |
| 2007/0031877 A1 | 2/2007 | Stahler et al. |
| 2007/0054127 A1 | 3/2007 | Hergenrother et al. |
| 2007/0059692 A1 | 3/2007 | Gao et al. |
| 2007/0087349 A1 | 4/2007 | Staehler et al. |
| 2007/0099208 A1 | 5/2007 | Drmanac et al. |
| 2007/0196854 A1 | 8/2007 | Stahler et al. |
| 2007/0207482 A1 | 9/2007 | Church et al. |
| 2007/0207487 A1 | 9/2007 | Emig et al. |
| 2007/0231800 A1 | 10/2007 | Roberts et al. |
| 2007/0238104 A1 | 10/2007 | Barrett et al. |
| 2007/0238106 A1 | 10/2007 | Barrett et al. |
| 2007/0238108 A1 | 10/2007 | Barrett et al. |
| 2007/0259344 A1 | 11/2007 | Leproust et al. |
| 2007/0259345 A1 | 11/2007 | Sampas |
| 2007/0259346 A1 | 11/2007 | Gordon et al. |
| 2007/0259347 A1 | 11/2007 | Gordon et al. |
| 2007/0269870 A1 | 11/2007 | Church et al. |
| 2008/0085514 A1 | 4/2008 | Peck et al. |
| 2008/0087545 A1 | 4/2008 | Jensen et al. |
| 2008/0161200 A1 | 7/2008 | Yu et al. |
| 2008/0182296 A1 | 7/2008 | Chanda et al. |
| 2008/0214412 A1 | 9/2008 | Stahler et al. |
| 2008/0227160 A1 | 9/2008 | Kool |
| 2008/0233616 A1 | 9/2008 | Liss |
| 2008/0287320 A1 | 11/2008 | Baynes et al. |
| 2008/0308884 A1 | 12/2008 | Kalvesten |
| 2009/0036664 A1 | 2/2009 | Peter |
| 2009/0053704 A1 | 2/2009 | Novoradovskaya et al. |
| 2009/0062129 A1 | 3/2009 | McKernan et al. |
| 2009/0087840 A1 | 4/2009 | Baynes et al. |
| 2009/0088679 A1 | 4/2009 | Wood et al. |
| 2009/0170802 A1 | 7/2009 | Stahler et al. |
| 2009/0176280 A1 | 7/2009 | Hutchison, III et al. |
| 2009/0181861 A1 | 7/2009 | Li et al. |
| 2009/0194483 A1 | 8/2009 | Robotti et al. |
| 2009/0230044 A1 | 9/2009 | Bek |
| 2009/0238722 A1 | 9/2009 | Mora-Fillat et al. |
| 2009/0239759 A1 | 9/2009 | Balch |
| 2009/0263802 A1 | 10/2009 | Drmanac |
| 2010/0004143 A1 | 1/2010 | Shibahara |
| 2010/0047805 A1 | 2/2010 | Wang |
| 2010/0051967 A1 | 3/2010 | Bradley et al. |
| 2010/0069250 A1 | 3/2010 | White, III et al. |
| 2010/0090341 A1 | 4/2010 | Wan et al. |
| 2010/0160463 A1 | 6/2010 | Wang et al. |
| 2010/0167950 A1 | 7/2010 | Juang et al. |
| 2010/0173364 A1 | 7/2010 | Evans, Jr. et al. |
| 2010/0216648 A1 | 8/2010 | Staehler et al. |
| 2010/0256017 A1 | 10/2010 | Larman et al. |
| 2010/0258487 A1 | 10/2010 | Zelechonok et al. |
| 2010/0286290 A1 | 11/2010 | Lohmann et al. |
| 2010/0292102 A1 | 11/2010 | Nouri |
| 2010/0300882 A1 | 12/2010 | Zhang et al. |
| 2011/0009607 A1 | 1/2011 | Komiyama et al. |
| 2011/0114244 A1 | 5/2011 | Yoo et al. |
| 2011/0114549 A1 | 5/2011 | Yin et al. |
| 2011/0124049 A1 | 5/2011 | Li et al. |
| 2011/0124055 A1 | 5/2011 | Carr et al. |
| 2011/0126929 A1 | 6/2011 | Velasquez-Garcia et al. |
| 2011/0171651 A1 | 7/2011 | Richmond |
| 2011/0172127 A1 | 7/2011 | Jacobson et al. |
| 2011/0201057 A1 | 8/2011 | Carr et al. |
| 2011/0217738 A1 | 9/2011 | Jacobson |
| 2011/0230653 A1 | 9/2011 | Novoradovskaya et al. |
| 2011/0254107 A1 | 10/2011 | Bulovic et al. |
| 2011/0287435 A1 | 11/2011 | Grunenwald et al. |
| 2012/0003713 A1 | 1/2012 | Hansen et al. |
| 2012/0021932 A1 | 1/2012 | Mershin et al. |
| 2012/0027786 A1 | 2/2012 | Gupta et al. |
| 2012/0028843 A1 | 2/2012 | Ramu et al. |
| 2012/0050411 A1 | 3/2012 | Mabritto et al. |
| 2012/0094847 A1 | 4/2012 | Warthmann et al. |
| 2012/0129704 A1 | 5/2012 | Gunderson et al. |
| 2012/0149602 A1 | 6/2012 | Friend et al. |
| 2012/0164691 A1 | 6/2012 | Eshoo et al. |
| 2012/0184724 A1 | 7/2012 | Sierzchala et al. |
| 2012/0220497 A1 | 8/2012 | Jacobson et al. |
| 2012/0231968 A1 | 9/2012 | Bruhn et al. |
| 2012/0238737 A1 | 9/2012 | Dellinger et al. |
| 2012/0258487 A1 | 10/2012 | Chang et al. |
| 2012/0264653 A1 | 10/2012 | Carr et al. |
| 2012/0270750 A1 | 10/2012 | Oleinikov |
| 2012/0270754 A1 | 10/2012 | Blake |
| 2012/0283140 A1 | 11/2012 | Chu |
| 2012/0288476 A1 | 11/2012 | Hartmann et al. |
| 2012/0289691 A1 | 11/2012 | Dellinger et al. |
| 2012/0315670 A1 | 12/2012 | Jacobson et al. |
| 2012/0322681 A1 | 12/2012 | Kung et al. |
| 2013/0005612 A1 | 1/2013 | Carr et al. |
| 2013/0017642 A1 | 1/2013 | Milgrew et al. |
| 2013/0017977 A1 | 1/2013 | Oleinikov |
| 2013/0017978 A1 | 1/2013 | Kavanagh et al. |
| 2013/0035261 A1 | 2/2013 | Sierzchala et al. |
| 2013/0045483 A1 | 2/2013 | Treusch et al. |
| 2013/0053252 A1 | 2/2013 | Xie et al. |
| 2013/0059296 A1 | 3/2013 | Jacobson et al. |
| 2013/0059761 A1 | 3/2013 | Jacobson et al. |
| 2013/0065017 A1 | 3/2013 | Sieber |
| 2013/0109595 A1 | 5/2013 | Routenberg |
| 2013/0109596 A1 | 5/2013 | Peterson et al. |
| 2013/0123129 A1 | 5/2013 | Zeiner et al. |
| 2013/0130321 A1 | 5/2013 | Staehler et al. |
| 2013/0137161 A1 | 5/2013 | Zhang et al. |
| 2013/0137173 A1 | 5/2013 | Zhang et al. |
| 2013/0137174 A1 | 5/2013 | Zhang et al. |
| 2013/0137861 A1 | 5/2013 | Leproust et al. |
| 2013/0225421 A1 | 8/2013 | Li et al. |
| 2013/0244884 A1 | 9/2013 | Jacobson et al. |
| 2013/0252849 A1 | 9/2013 | Hudson et al. |
| 2013/0281308 A1 | 10/2013 | Kung et al. |
| 2013/0296192 A1 | 11/2013 | Jacobson et al. |
| 2013/0296194 A1 | 11/2013 | Jacobson et al. |
| 2013/0309725 A1 | 11/2013 | Jacobson et al. |
| 2013/0323722 A1 | 12/2013 | Carr et al. |
| 2013/0323725 A1 | 12/2013 | Peter et al. |
| 2013/0330778 A1 | 12/2013 | Zeiner et al. |

(56) References Cited

U.S. PATENT DOCUMENTS

| | | |
|---|---|---|
| 2014/0011226 A1 | 1/2014 | Bernick et al. |
| 2014/0018441 A1 | 1/2014 | Fracchia et al. |
| 2014/0038240 A1 | 2/2014 | Temme et al. |
| 2014/0106394 A1 | 4/2014 | Ko et al. |
| 2014/0141982 A1 | 5/2014 | Jacobson et al. |
| 2014/0170665 A1 | 6/2014 | Hiddessen et al. |
| 2014/0178992 A1 | 6/2014 | Nakashima et al. |
| 2014/0274729 A1 | 9/2014 | Kurn et al. |
| 2014/0274741 A1 | 9/2014 | Hunter et al. |
| 2014/0303000 A1 | 10/2014 | Armour et al. |
| 2014/0309119 A1 | 10/2014 | Jacobson et al. |
| 2014/0309142 A1 | 10/2014 | Tian |
| 2015/0010953 A1 | 1/2015 | Lindstrom et al. |
| 2015/0012723 A1 | 1/2015 | Park et al. |
| 2015/0031089 A1 | 1/2015 | Lindstrom |
| 2015/0038373 A1 | 2/2015 | Banyai et al. |
| 2015/0057625 A1 | 2/2015 | Coulthard |
| 2015/0065393 A1 | 3/2015 | Jacobson |
| 2015/0120265 A1 | 4/2015 | Amirav-Drory et al. |
| 2015/0159152 A1 | 6/2015 | Allen et al. |
| 2015/0183853 A1 | 7/2015 | Sharma et al. |
| 2015/0191719 A1 | 7/2015 | Hudson et al. |
| 2015/0196917 A1 | 7/2015 | Kay et al. |
| 2015/0203839 A1 | 7/2015 | Jacobson et al. |
| 2015/0211047 A1 | 7/2015 | Borns |
| 2015/0225782 A1 | 8/2015 | Walder et al. |
| 2015/0240232 A1 | 8/2015 | Zamore et al. |
| 2015/0261664 A1 | 9/2015 | Goldman et al. |
| 2015/0321191 A1 | 11/2015 | Kendall et al. |
| 2015/0322504 A1 | 11/2015 | Lao et al. |
| 2015/0344927 A1 | 12/2015 | Sampson et al. |
| 2015/0353921 A9 | 12/2015 | Tian |
| 2015/0353994 A1 | 12/2015 | Myers et al. |
| 2015/0361420 A1 | 12/2015 | Hudson et al. |
| 2015/0361422 A1 | 12/2015 | Sampson et al. |
| 2015/0361423 A1 | 12/2015 | Sampson et al. |
| 2015/0368687 A1 | 12/2015 | Saaem et al. |
| 2015/0376602 A1 | 12/2015 | Jacobson et al. |
| 2016/0001247 A1 | 1/2016 | Oleinikov |
| 2016/0002621 A1 | 1/2016 | Nelson et al. |
| 2016/0002622 A1 | 1/2016 | Nelson et al. |
| 2016/0010045 A1 | 1/2016 | Cohen et al. |
| 2016/0017394 A1 | 1/2016 | Liang et al. |
| 2016/0017425 A1 | 1/2016 | Ruvolo et al. |
| 2016/0024138 A1 | 1/2016 | Gebeyehu et al. |
| 2016/0024576 A1 | 1/2016 | Chee |
| 2016/0026753 A1 | 1/2016 | Krishnaswami et al. |
| 2016/0026758 A1 | 1/2016 | Jabara et al. |
| 2016/0046973 A1 | 2/2016 | Efcavitch et al. |
| 2016/0046974 A1 | 2/2016 | Efcavitch et al. |
| 2016/0082472 A1 | 3/2016 | Perego et al. |
| 2016/0089651 A1 | 3/2016 | Banyai |
| 2016/0090592 A1 | 3/2016 | Banyai |
| 2016/0096160 A1 | 4/2016 | Banyai et al. |
| 2016/0097051 A1 | 4/2016 | Jacobson et al. |
| 2016/0102322 A1 | 4/2016 | Ravinder et al. |
| 2016/0108466 A1 | 4/2016 | Nazarenko et al. |
| 2016/0122755 A1 | 5/2016 | Hall et al. |
| 2016/0168611 A1 | 6/2016 | Efcavitch et al. |
| 2016/0184788 A1 | 6/2016 | Hall et al. |
| 2016/0200759 A1 | 7/2016 | Srivastava et al. |
| 2016/0229884 A1 | 8/2016 | Indermuhle et al. |
| 2016/0230175 A1 | 8/2016 | Carstens |
| 2016/0251651 A1 | 9/2016 | Banyai et al. |
| 2016/0264958 A1 | 9/2016 | Toro et al. |
| 2016/0289839 A1 | 10/2016 | Harumoto et al. |
| 2016/0303535 A1 | 10/2016 | Banyai et al. |
| 2016/0310426 A1 | 10/2016 | Wu |
| 2016/0310927 A1 | 10/2016 | Banyai et al. |
| 2016/0333340 A1 | 11/2016 | Wu |
| 2016/0339409 A1 | 11/2016 | Banyai et al. |
| 2016/0340672 A1 | 11/2016 | Banyai et al. |
| 2016/0354752 A1 | 12/2016 | Banyai et al. |
| 2017/0017436 A1 | 1/2017 | Church |
| 2017/0081660 A1 | 3/2017 | Cox et al. |
| 2017/0081716 A1 | 3/2017 | Peck |
| 2017/0095785 A1 | 4/2017 | Banyai et al. |
| 2017/0141793 A1 | 5/2017 | Strauss et al. |
| 2017/0159044 A1 | 6/2017 | Toro et al. |

FOREIGN PATENT DOCUMENTS

| | | |
|---|---|---|
| EP | 0090789 A1 | 10/1983 |
| EP | 0126621 B1 | 8/1990 |
| EP | 0753057 A1 | 1/1997 |
| EP | 1314783 A1 | 5/2003 |
| EP | 1546387 A2 | 6/2005 |
| EP | 1153127 B1 | 7/2006 |
| EP | 1728860 A1 | 12/2006 |
| EP | 1072010 B1 | 4/2010 |
| EP | 2175021 A2 | 4/2010 |
| EP | 2330216 A1 | 6/2011 |
| EP | 1343802 B1 | 5/2012 |
| EP | 2504449 A1 | 10/2012 |
| EP | 2928500 A1 | 10/2015 |
| EP | 2971034 A1 | 1/2016 |
| EP | 3030682 A2 | 6/2016 |
| EP | 3044228 A4 | 4/2017 |
| EP | 2994509 B1 | 6/2017 |
| JP | 2002536977 A | 11/2002 |
| WO | WO-9015070 A1 | 12/1990 |
| WO | WO-9210092 A1 | 6/1992 |
| WO | WO-9210588 A1 | 6/1992 |
| WO | WO-9309668 A1 | 5/1993 |
| WO | WO-9525116 A1 | 9/1995 |
| WO | WO-9526397 A1 | 10/1995 |
| WO | WO-9615861 A1 | 5/1996 |
| WO | WO-9710365 A1 | 3/1997 |
| WO | WO-9822541 A2 | 5/1998 |
| WO | WO-9841531 A2 | 9/1998 |
| WO | WO-9942813 A1 | 8/1999 |
| WO | WO-0013017 A2 | 3/2000 |
| WO | WO-0018957 A1 | 4/2000 |
| WO | WO-0042559 A1 | 7/2000 |
| WO | WO-0042560 A2 | 7/2000 |
| WO | WO-0042561 A2 | 7/2000 |
| WO | WO-0049142 A1 | 8/2000 |
| WO | WO-0210443 A1 | 2/2002 |
| WO | WO-0220537 A2 | 3/2002 |
| WO | WO-0224597 A2 | 3/2002 |
| WO | WO-2002033669 | 4/2002 |
| WO | WO-03040410 A1 | 5/2003 |
| WO | WO-03046223 A1 | 6/2003 |
| WO | WO-03054232 A2 | 7/2003 |
| WO | WO-03064026 A1 | 8/2003 |
| WO | WO-03064027 A2 | 8/2003 |
| WO | WO-03064699 A2 | 8/2003 |
| WO | WO-03065038 A2 | 8/2003 |
| WO | WO-03066212 A2 | 8/2003 |
| WO | WO-03089605 A2 | 10/2003 |
| WO | WO-03100012 A2 | 12/2003 |
| WO | WO-2004024886 A2 | 3/2004 |
| WO | WO-2004029220 A2 | 4/2004 |
| WO | WO-2004029586 A1 | 4/2004 |
| WO | WO-2004031351 A2 | 4/2004 |
| WO | WO-2004031399 A2 | 4/2004 |
| WO | WO-2005051970 A2 | 6/2005 |
| WO | WO-2006076679 A1 | 7/2006 |
| WO | WO-2006116476 A1 | 11/2006 |
| WO | WO-2007120627 A2 | 10/2007 |
| WO | WO-2007137242 A2 | 11/2007 |
| WO | WO-2008006078 A2 | 1/2008 |
| WO | WO-2008027558 A2 | 3/2008 |
| WO | WO-2008054543 A2 | 5/2008 |
| WO | WO-2008063135 A1 | 5/2008 |
| WO | WO-2008109176 A2 | 9/2008 |
| WO | WO-2010025310 A2 | 3/2010 |
| WO | WO-2010025566 A1 | 3/2010 |
| WO | WO-2010027512 A2 | 3/2010 |
| WO | WO-2011053957 A2 | 5/2011 |
| WO | WO-2011056872 A2 | 5/2011 |
| WO | WO-2011066185 A1 | 6/2011 |
| WO | WO-2011066186 A1 | 6/2011 |
| WO | WO-2011085075 A2 | 7/2011 |

(56) References Cited

FOREIGN PATENT DOCUMENTS

| | | |
|---|---|---|
| WO | WO-2011103468 A2 | 8/2011 |
| WO | WO-2011143556 A1 | 11/2011 |
| WO | WO-2011150168 A1 | 12/2011 |
| WO | WO-2011161413 A2 | 12/2011 |
| WO | WO-2012061832 A1 | 5/2012 |
| WO | WO-2012078312 A2 | 6/2012 |
| WO | WO-2012149171 A1 | 11/2012 |
| WO | WO-2012154201 A1 | 11/2012 |
| WO | WO-2013032850 A2 | 3/2013 |
| WO | WO-2013036668 A1 | 3/2013 |
| WO | WO-2013101896 A1 | 7/2013 |
| WO | WO-2013177220 A1 | 11/2013 |
| WO | WO-2014004393 A1 | 1/2014 |
| WO | WO-2014035693 A2 | 3/2014 |
| WO | WO-2014088693 A1 | 6/2014 |
| WO | WO-2014089160 A1 | 6/2014 |
| WO | WO-2014093694 A1 | 6/2014 |
| WO | WO-2014151696 A1 | 9/2014 |
| WO | WO-2014160004 A1 | 10/2014 |
| WO | WO-2014160059 A1 | 10/2014 |
| WO | WO-2015017527 A2 | 2/2015 |
| WO | WO-2015021080 A2 | 2/2015 |
| WO | WO-2015021280 A1 | 2/2015 |
| WO | WO-2015040075 A1 | 3/2015 |
| WO | WO-2015054292 A1 | 4/2015 |
| WO | WO-2015081114 A2 | 6/2015 |
| WO | WO-2015090879 A1 | 6/2015 |
| WO | WO-2015120403 A1 | 8/2015 |
| WO | WO-2015160004 A1 | 10/2015 |
| WO | WO-2015175832 A1 | 11/2015 |
| WO | WO-2016007604 A1 | 1/2016 |
| WO | WO-2016011080 A2 | 1/2016 |
| WO | WO-2016022557 A1 | 2/2016 |
| WO | WO-2016053883 A1 | 4/2016 |
| WO | WO-2016065056 A1 | 4/2016 |
| WO | WO-2016126882 A1 | 8/2016 |
| WO | WO-2016126987 A1 | 8/2016 |
| WO | WO-2016130868 A2 | 8/2016 |
| WO | WO-2016172377 A1 | 10/2016 |
| WO | WO-2016183100 A1 | 11/2016 |
| WO | WO-2017049231 A1 | 3/2017 |
| WO | WO-2017053450 A1 | 3/2017 |
| WO | WO-2017095958 A1 | 6/2017 |

OTHER PUBLICATIONS

Lewontin and Harti, Population genetics in forensic DNA typing. Science, 254:1745-1750, 1991.
Milo and Phillips, Numbers here reflect the number of protein coding genes and excludes tRNA and non-coding RNA. Cell Biology by the Numbers, p. 286, 2015.
PCT Patent Application No. PCT/US2016/052916 International Search Report and Written Opinion dated Dec. 30, 2016.
Rafalski and Morgante, Corn and humans: recombination and linkage disequilibrium in two genomes of similar size. Trends in Genetics, 20(2):103-111, 2004.
Sargolzaei et al., Extent of linkage disequilibrium in Holstein cattle in North America. J.Dairy Science, 91:2106-2117, 2007.
U.S. Appl. No. 14/885,962 Office Action dated Dec. 16, 2016.
U.S. Appl. No. 14/885,965 Office Action dated Feb. 10, 2017.
U.S. Appl. No. 15/154,879 Notice of Allowance dated Feb. 1, 2017.
U.S. Appl. No. 15/187,721 Notice of Allowance dated Dec. 7, 2016.
U.S. Appl. No. 15/187,721 Office Action dated Oct. 14, 2016.
U.S. Appl. No. 15/233,835 Office Action dated Feb. 8, 2017.
Van Tassell et al., SNP discovery and allele frequency estimation by deep sequencing of reduced representation libraries. Nature Methods, 5:247-252, 2008.
Abudayyeh et al., C2c2 is a single-component programmable RNA-guided RNA-targeting CRISPR effector. Science, available on line, Jun. 13, 2016, at: http://zlab.mit.edu/assets/reprints/Abudayyeh__OO__Science__2016.pdf , 17 pages.
Adessi, et al. Solid phase DNA amplification: characterisation of primer attachment and amplification mechanisms. Nucleic Acids Res. Oct. 15, 2000;28(20):E87.
Alexeyev, Mikhail F. et al., "Gene synthesis, bacterial expression and purification of the Rickettsia prowazekii ATP/ADP translocase", Biochimica et Biophysics Acta, vol. 1419, 299-306 (1999).
Al-Housseiny et al., Control of interfacial instabilities using flow geometry Nature Physics, 8:747-750 (2012); Published online at: DOI:10.1038/NPHYS2396.
Amblard, Francois et al., "A magnetic manipulator for studying local rheology and micromechanical properties of biological systems", Rev. Sci. Instrum., vol. 67, No. 3, 818-827, Mar. 1996.
Arkles, et al. The Role of Polarity in the Structure of Silanes Employed in Surface Modification. Silanes and Other Coupling Agents. 2009; 5:51-64.
Arkles, Hydrophobicity, Hydrophilicity Reprinted with permission from the Oct. 2006 issue of Paint & Coatings Industry magazine, Retrieved on Mar. 19, 2016, 10 pages.
Assi, Fabiano et al., "Massive-parallel adhesion and reactivity-measurements using simple and inexpensive magnetic tweezers", J. Appl. Phys., vol. 92, No. 9, 5584-5586, Nov. 1, 2002.
ATDBio, "Nucleic Acid Structure," Nucleic Acids Book, 9 pages, published on Jan. 22, 2005. from: http://www.atdbio.com/content/5/Nucleic-acid-structure.
ATDBio, "Solid-Phase Oligonucleotide Synthesis," Nucleic Acids Book, 20 pages, Published on Jul. 31, 2011. from: http://www.atdbio.com/content/17/Solid-phase-oligonucleotide-synthesis.
Au, Lo-Chun et al. "Gene synthesis by a LCR-based approach: high level production of Leptin-L54 using synthetic gene in *Escherichia coli*", Biochemical and Biophysical Research Communications, vol. 248, 200-203 (1998).
Baedeker, Mathias et al., Overexpression of a designed 2.2kb gene of eukaryotic phenylalanine ammonialyase in *Escherichia coli*. FEBS Letters, vol. 457, 57-60 (1999).
Barbee, et al. Magnetic Assembly of High-Density DNA Arrays for Genomic Analyses. Anal Chem. Mar. 15, 2008; 80(6): 2149-2154.
Barton et al., A desk electrohydrodynamic jet printing system. Mechatronics, 20:611-616, 2010.
Beaucage, et al. Advances in the synthesis of oligonucleotides by the phosphoramidite approach. Tetrahedron. 1992; 48:2223-2311.
Beaucage, et al. Deoxynucleoside phosphoramidites—A new class of key intermediates for deoxypolynucleotide synthesis. Tetrahedron Lett. 1981; 22(20):1859-1862.
Beaulieu, Martin et al., "PCR candidate region mismatch scanning adaptation to quantitative, high-throughput genotyping", Nucleic Acids Research, vol. 29, No. 5, 1114-1124 (2001).
Beigelman, et al. Base-modified phosphoramidite analogs of pyrimidine ribonucleosides for RNA structure-activity studies. Methods Enzymol. 2000;317:39-65.
Biswas, Indranil et al., "Identification and characterization of a thermostable MutS homolog from Thennus aquaticus", The Journal of Biological Chemistry, vol. 271, No. 9, 5040-5048 (Mar. 1, 1996).
Biswas, Indranil et al., "Interaction of MutS protein with the major and minor grooves of a heteroduplex DNA", The Journal of Biological Chemistry, vol. 272, No. 20, 13355-13364 (May 1, 1997).
Bjornson, Keith P. et al., "Differential and simultaneous adenosine Di- and Tri-hosphate binding by MutS", The Journal of Biological Chemistry, vol. 278, No. 20, 18557-18562 (May 16, 2003).
Blanchard, et al., "High-Density Oligonucleotide Arrays," Biosensors & Bioelectronics, 11(6/7):687-690, 1996.
Blanchard, in: Genetic Engineering, Principles and Methods, vol. 20, Ed. J. Sedlow, New York: Plenum Press, pp. 111-124, 1979.
Buermans et al., "Next Generation sequencing technology: Advances and applications," Biochimica et Biophysica Acta (BBA) Molecular Basis of Disease, 1842:1931-1941, 2014.
Butler, et al. In situ synthesis of oligonucleotide arrays by using surface tension. J Am Chem Soc. Sep. 19, 2001;123(37):8887-94.
Calvert, Lithographically patterned self-assembled films. In: Organic Thin Films and Surfaces: Directions for The Nineties, vol. 20, p. 109, ed. By Abraham Ulman, San Diego: Academic Press, 1995.

(56) References Cited

OTHER PUBLICATIONS

Carr, et al. Protein-mediated error correction for de novo DNA synthesis. Nucleic Acids Res. Nov. 23, 2004;32(20):e162.
Caruthers, Chemical synthesis of deoxyoligonucleotides by the phosphoramidite method. In Methods in Enzymology, Chapter 15, 154:287-313 (1987).
Caruthers. Gene synthesis machines: DNA chemistry and its uses. Science. Oct. 18, 1985;230(4723):281-5.
Casmiro, Danilo R. et al., "PCR-based gene synthesis and protein NMR spectroscopy", Structure, vol. 5, •No. 11, 1407-1412 (1997).
Cello, et al. Chemical synthesis of poliovirus cDNA: generation of infectious virus in the absence of natural template. Science. Aug. 9, 2002;297(5583):1016-8. Epub Jul. 11, 2002.
Chalmers, et al. Scaling up the ligase chain reaction-based approach to gene synthesis. Biotechniques. Feb. 2001;30(2):249-52.
Chan, et al. Natural and engineered nicking endonucleases—from cleavage mechanism to engineering of strand-specificity. Nucleic Acids Res. Jan. 2011; 39(1): 1-18.
Chen, et al. Chemical modification of gene silencing oligonucleotides for drug discovery and development. Drug Discov Today. Apr. 15, 2005;10(8):587-93.
Cheng, et al. High throughput parallel synthesis of oligonucleotides with 1536 channel synthesizer. Nucleic Acids Res. Sep. 15, 2002;30(18):e93.
Cho, et al. Capillary passive valve in microfluidic systems. NSTI—Nanotech. 2004; 1:263-266.
Chrisey et al., Fabrication of patterned DNA surfaces Nucleic Acids Research, 24(15):3040-3047 (1996).
Chung et al., One-step preparation of competent *Escherichia coli*: Transformation and storage of bacterial cells in the same solution. Proc Natl Acad Sci U S A. Apr. 1989;86(7):2172-2175.
Cleary et al. Production of complex nucleic acid libraries using highly parallel in situ oligonucleotide synthesis. Nat Methods 1(3):241-248 (2004).
Crick. On protein synthesis. Symp Soc Exp Biol12:138-163, 1958.
Cutler, David J. et al., "High-throughput variation detection and genotyping using microarrays", Genome Research, vol. 11, 1913-19 (2001).
Dahl, et al. Circle-to-circle amplification for precise and sensitive DNA analysis. Proc Natl Acad Sci U S A. Mar. 30, 2004;101(13):4548-53.
De Mesmaeker, et al. Backbone modifications in oligonucleotides and peptide nucleic acid systems. Curr Opin Struct Biol. Jun. 1995;5(3):343-55.
Deamer, David W. et al., "Characterization of nucleic acids by nanopore analysis", Ace. Cham. Res., vol. 35, No. 10, 817-825 (2002).
Deaven, The Human Genome Project: Recombinant clones for mapping and sequencing DNA. Los Alamos Science, 20:218-249, 1992.
Deng et al., Targeted bisulfite sequencing reveals changes in DNA methylation associated with nuclear reprogramming Nature Biotechnology, 27:352-360 (2009).
Dietrich, Rudiger.et al., "Gene assembly based on blunt-ended double-stranded DNA-modules", Biotechnology Techniques, vol. 12, No. 1, 49-54 (Jan. 1998).
Doudna et al. Genome editing. The new frontier of genome engineering with CRISPR-Cas9. Science 346(6213):1258096-1-1258096-9, 2014.
Dower et al., High efficiency transformation of *E.coli* by high voltage electroporation. Nucleic Acids Res. 16(13):6127-45 (1988).
Dressman, et al. Transforming single DNA molecules into fluorescent magnetic particles for detection and enumeration of genetic variations. Proc Natl Acad Sci U S A. Jul. 22, 2003;100(15):8817-22.
Drmanac, et al. Human genome sequencing using unchained base reads on self-assembling DNA nanoarrays. Science. Jan. 1, 2010;327(5961):78-81.
Droege and Hill, The Genome Sequencer FLXTM System—Longer reads, more applications, straight forward bioinformatics and more complete data sets Journal of Biotechnology, 136:3-10, 2008.
Duffy, et al. Rapid Prototyping of Microfluidic Systems in Poly(dimethylsiloxane). Anal Chem. Dec. 1, 1998;70(23):4974-84.
Duggan, et al. Expression profiling using cDNA microarrays. Nat Genet. Jan. 1999;21(1 Suppl):10-14.
Eadie, et al. Guanine modification during chemical DNA synthesis. Nucleic Acids Res. Oct. 26, 1987;15(20):8333-49.
Eisen, Jonathan A., "A phylogenomic study of the MutS family of proteins", Nucleic Acids Research, vol. 26, No. 18, 4291-4300 (1998).
Ellis, et al. DNA assembly for synthetic biology: from parts to pathways and beyond. Integr Biol (Camb). Feb. 2011;3(2):109-18. doi: 10.1039/c0ib00070a. Epub Jan. 19, 2011.
El-Sagheer, et al. Biocompatible artificial DNA linker that is read through by DNA polymerases and is functional in *Escherichia coli*. Proc Natl Acad Sci U S A. Jul. 12, 2011;108(28):11338-43. doi: 10.1073/pnas.1101519108. Epub Jun. 27, 2011.
Elsner et al., 172 nm excimer VUV-triggered photodegradation and micropatterning of aminosilane films, Thin Solid Films, 517:6772-6776 (2009).
Engler, et al. A one pot, one step, precision cloning method with high throughput capability. PLoS One. 2008;3(11):e3647. doi: 10.1371/journal.pone.0003647. Epub Nov. 5, 2008.
Engler, et al. Golden gate shuffling: a one-pot DNA shuffling method based on type IIs restriction enzymes. PLoS One. 2009;4(5):e5553. doi: 10.1371/journal.pone.0005553. Epub May 14, 2009.
Evans et al., DNA Repair Enzymes. Current Protocols in Molecular Biology 84:III:3.9:3.9.1-3.9.12 http://www.ncbi.nlm.nih.gov/pubmed/18972391 (Published online Oct. 1, 2008 Abstract only provided.
Fahy, et al. Self-sustained sequence replication (3SR): an isothermal transcription-based amplification system alternative to PCR. PCR Methods Appl. Aug. 1991;1(1):25-33.
Fedoryak, Olesya D. et al., "Brominated hydroxyquinoline as a photolabile protecting group with sensitivity to multiphoton excitation", Org. Lett., vol. 4, No. 2 , 3419-3422 (2002).
Ferretti et al., Total synthesis of a gene for bovine rhodopsin. PNAS, 83:599-603 (1986).
Fodor et al. "Light-Directed, Spatially Addressable Parallel Chemical Synthesis," Science, 251(4995):767-773, 1991.
Foldesi, et al. The synthesis of deuterionucleosides. Nucleosides Nucleotides Nucleic Acids. Oct.-Dec. 2000;19(10-12):1615-56.
Frandsen, et al. Efficient four fragment cloning for the construction of vectors for targeted gene replacement in filamentous fungi. BMC Molecular Biology 2008, 9:70.
Frandsen. Experimental setup. Dec. 7, 2010, 3 pages. http://www.rasmusfrandsen.dk/experimental_setup.htm.
Frandsen. The USER Friendly technology. USER cloning. Oct. 7, 2010, 2 pages. http://rasmusfrandsen.dk/user_cloning.htm.
Fullwood et al., Next-generation DNA sequencing of paired-end tags [PET] for transcriptome and genome analysis Genome Research, 19:521-532, 2009.
Galneder. et al., Microelectrophoresis of a bilayer-coated silica bead in an optical trap: application to enzymology. Biophysical Journal, vol. 80, No. 5, 2298-2309 (May 2001).
Gao, et al. A flexible light-directed DNA chip synthesis gated by deprotection using solution photogenerated acids. Nucleic Acids Res. Nov. 15, 2001;29(22):4744-50.
Gao, et al. Thermodynamically balanced inside-out (TBIO) PCR-based gene synthesis: a novel method of primer design for high-fidelity assembly of longer gene sequences. Nucleic Acids Res. Nov. 15, 2003;31(22):e143.
Garaj, et al. Graphene as a subnanometre trans-electrode membrane. Nature. Sep. 9, 2010;467(7312):190-3.
Garbow, Norbert et al., "Optical tweezing electroghoresis of isolated, highly charged colloidal spheres", Colloids and Surfaces A: Physiochem. Eng. Aspects, vol. 195, 227-241 (2001).
Genomics 101. An Introduction to the Genomic Workflow. 2016 edition, 64 pages. Available at: http://www.frontlinegenomics.com/magazine/6757/genomics-101/.

(56) References Cited

OTHER PUBLICATIONS

Geu-Flores, et al. USER fusion: a rapid and efficient method for simultaneous fusion and cloning of multiple PCR products. Nucleic Acids Res. 2007;35(7):e55. Epub Mar. 27, 2007.
Gibson, et al. Complete chemical synthesis, assembly, and cloning of a Mycoplasma genitalium genome. Science. Feb. 29, 2008;319(5867):1215-20. doi: 10.1126/science.1151721. Epub Jan. 24, 2008.
Gosse, Charlie et al. "Magnetic tweezers: micromanipulation and force measurement at the molecular level", Biophysical Journal, vol. 8, 3314-3329 (Jun. 2002).
Grovenor. Microelectronic materials. Graduate Student Series in Materials Science and Engineering. Bristol, England: Adam Hilger, 1989; pp. 113-123.
Haber, Charbel et al., Magnetic tweezers for DNA micromanipulation, Rev. Sci. Instrum., vol. 71, No. 12, 4561-4570 (Dec. 2000).
Hanahan and Cold Spring Harbor Laboratory, Studies on transformation of *Escherichia coli* with plasmids J. Mol. Biol. 166:557-580 (1983).
Hanahan et al., Plasmid transformation of *Escherichia coli* and other bacteria. Methods Enzymol, vol. 204, pp. 63-113 (1991).
Harada, et al. Unexpected substrate specificity of T4 DNA ligase revealed by in vitro selection. Nucleic Acids Res. May 25, 1993;21(10):2287-91.
Heckers Karl H. et al., "Error analysis of chemically synthesized polynucleotides", BioTechniques, vol. 24, No. 2, 256-260 (1998).
Herzer et al.: Fabrication of patterned silane based self-assembled monolayers by photolithography and surface reactions on silicon-oxide substrates Chem. Commun., 46:5634-5652 (2010).
Hoover et al., "DNAWorks: an automated method for designing oligonucleotides for PCR-based gene synthesis", Nucleic Acids Research, vol. 30, No. 10, e43, 7 pages. (2002).
Hosu, Basarab G. et al., Magnetic tweezers for intracellular applications•, Rev. Sci. Instrum., vol. 74, No. 9, 4158-4163 (Sep. 2003).
Huang, Hayden et al., "Three-dimensional cellular deformation analysis with a two-photon magnetic manipulator workstation", Biophysical Journal, vol. 82, No. 4, 2211-2223 (Apr. 2002).
Hughes, et al. Expression profiling using microarrays fabricated by an ink-jet oligonucleotide synthesizer. Nat Biotechnol. Apr. 2001;19(4):342-7.
Hughes et al. Principles of early drug discovery. Br J Pharmacol 162(2):1239-1249, 2011.
Hutchison, et al. Cell-free cloning using phi29 DNA polymerase. Proc Natl Acad Sci U S A. Nov. 29, 2005;102(48):17332-6. Epub Nov. 14, 2005.
Jackson, Brian A. et al., "Recognition of DNA base mismatches by a rhodium intercalator", J. Am. Chem. Soc., vol. 19, 12986-12987 (1997).
Jacobs and Schar, DNA glycosylases: In DNA repair and beyond Chromosome, 121:1-20 (2012)—http://www.ncbi.nlm.nih.gov/pmc/articles/PMC3260424/.
Karagiannis and El-Osta, RNA interference and potential therapeutic applications of short interfering RNAs Cancer Gene Therapy, 12:787-795, 2005.
Ke, Song-Hua et al., "Influence of neighboring base pairs on the stability of single base bulges and base pairs in a DNA fragment", Biochemistry, Vo. 34, 4593-4600 (1995).
Kelley, Shana, et al. Single-base mismatch detection based on charge transduction through DNA, Nucleic Acids Research, vol. 27, No. 24, 4830-4837 (1999).
Kim et al., High-resolution patterns of quantum dots formed by electrohydrodynamic jet printing for light-emitting diodes. Nano Letters, 15:969-973, 2015.
Kim, Yang-Gyun et al., "Chimeric restriction endonuclease", Proc. Natl. Acad. Sci. USA, vol. 91, 883-887 (Feb. 1994).
Kim, Yang-Gyun, "The interaction between Z-ONA and the Zab domain of double-stranded RNA adenosine deaminase characterized using fusion nucleases", The Journal of Biological Chemistry, vol. 274, No. 27, 19081-19086 (1999).
Kim, Yan-Gyun et al., "Site•specific cleavage of DNA-RNA hybrids by zinc finger/Fok I cleavage domain fusions" Gene, vol. 203, 43-49 (1997).
Kinde et al., Detection and quantification of rare mutations with massively parallel sequencing PNAS, 108(23):9530-9535, 2011.
Kodumal, et al. Total synthesis of long DNA sequences: synthesis of a contiguous 32-kb polyketide synthase gene cluster. Proc Natl Acad Sci U S A. Nov. 2, 2004;101(44):15573-8. Epub Oct. 20, 2004.
Kong et al., Parallel gene synthesis in a microfluidic device. Nucleic Acids Res., 35(8):e61 (2007).
Kong. Microfluidic Gene Synthesis. MIT Thesis. Submitted to the program in Media Arts and Sciences, School of Architecture and Planning, in partial fulfillment of the requirements for the degree of Doctor of Philosophy in Media Arts and Sciences at the Massachusetts Institute of Technology. 143 pages Jun. 2008.
Kopp, Martin U. et al., "Chemical amplification: continuous-flow PCR on a chip", Science, vol. 280, 1046-1048 (May 15, 1998).
Kosuri and Church, "Large-scale de novo DNA synthesis: technologies and applications," Nature Methods, 11:499-507, 2014. Available at: http://www.nature.com/nmeth/journal/v11/n5/full/nmeth.2918.html.
Kosuri et al., A scalable gene synthesis platform using high-fidelity DNA microchips Nat.Biotechnol., 28(12):1295-1299, 2010.
Krayden, Inc., A Guide to Silane Solutions. Silane coupling agents. 7 pages. Published on May 31, 2005 at: http://krayden.com/pdf/xia_silane_chemistry.pdf.
Lagally, E.T. et al., "Single-molecule DNA amplification and analysis in an integrated microfluidic device" Anal. Chem., vol. 73, No. , 565-570 (Feb. 1, 2001).
Lahue, R.S. et al., "DNA mismatch correction in a defined system", Science, vol. 425; No. 4914, 160-164 (Jul. 14, 1989).
Lambrinakos, A. et al., "Reactivity of potassium permanganate and tetraethylammonium chloride with mismatched bases and a simple mutation detection protocol", Nucleic Acids Research, vol. 27, No. 8, 1866-1874 (1999).
Landegren, et al. A ligase-mediated gene detection technique. Science. Aug. 26, 1988;241(4869):1077-80.
Lang, Matthew J. et al., "An automated two-dimensional optical force clamp for single molecule studies", Biophysical Journal, vol. 83, 491-501 (Jul. 2002).
Lashkari, et al. An automated multiplex oligonucleotide synthesizer: development of high-throughput, low-cost DNA synthesis. Proc Natl Acad Sci U S A. Aug. 15, 1995;92(17):7912-5.
Lausted et al., "POSaM: a fast, flexible, open-source, inkjet oligonucleotide synthesizer and microarrayer," Genome Biology, 5:R58, 17 pages, 2004. available at https://www.ncbi.nlm.nih.gov/pmc/articles/PMC507883/.
Leamon, et al. A massively parallel PicoTiterPlate based platform for discrete picoliter-scale polymerase chain reactions. Electrophoresis. Nov. 2003;24(21):3769-77.
Lee, Covalent end-immobilization of oligonucleotides onto solid surfaces. Thesis submitted to the Department of Chemical Engineering in Partial Fulfillment of the Requirements for the Degree of Doctor of Philosophy in Chemical Engineering at the Massachusetts Institute of Technology. Aug. 2001, 315 pages.
Lee, C.S. et al., "Microelectromagnets for the control of magnetic nanoparticles", Appl. Phys. Lett., vol. 79, No. 20, 3308-3310 (Nov. 12, 2001).
Lee, et al. A microfluidic oligonucleotide synthesizer. Nucleic Acids Research 2010 vol.: 38(8):2514-2521. DOI: 10.1093/nar/gkq092.
Leproust, et al. Agilent's Microarray Platform: How High-Fidelity DNA Synthesis Maximizes the Dynamic Range of Gene Expression Measurements. 2008; 1-12. http://www.miltenyibiotec.com/~/media/Files/Navigation/Genomic%20Services/Agilent_DNA_Microarray_Platform.ashx.
Leproust et al., "Synthesis of high-quality libraries of long (150mer) oligonucleotides by a novel depurination controlled process," Nucleic Acids Research, 35(8):2522-2540, 2010.
Lesnikowski, et al. Nucleic acids and nucleosides containing carboranes. J. Organometallic Chem. 1999; 581:156-169.
Leumann. DNA analogues: from supramolecular principles to biological properties. Bioorg Med Chem. Apr. 2002;10(4):841-54.

(56) References Cited

OTHER PUBLICATIONS

Levene, et al. Zero-mode waveguides for single-molecule analysis at high concentrations. Science. Jan. 31, 2003;299(5607):682-6.
Lipshutz, Robert J. et al., "High density synthetic oligonucleotide arrays", Nature Genetics Supplement, vol. 21, 20-24 (Jan. 1999).
Lishanski, Alia et al., "Mutation detection by mismatch binding protein, MutS, in amplified DNA: application to the cystic fibrosis gene", Proc. Natl. Acad. Sci. USA, vol. 91, 2674-2678 (Mar. 1994).
Liu et al., Comparison of Next-Generation Sequencing Systems. Journal of Biomedicine and Biotechnology, 11 pages, 2012.
Liu, et al. Enhanced Signals and Fast Nucleic Acid Hybridization By Microfluidic Chaotic Mixing. Angew. Chem. Int. Ed. 2006; 45:3618-3623.
Lizardi, et al. Mutation detection and single-molecule counting using isothermal rolling-circle amplification. Nat Genet. Jul. 1998;19(3):225-32.
Li, Lin et al., "Functional domains in Fok I restriction endonuclease", Proc. Natl. Acad. Sci. USA, vol. 89, 4275-4279 (May 1992).
Lu, A.-Lien et al., "Methyl-directed repair of DNA base-pair mismatches in vitro", Proc. Natl. Acad. Sci. USA, vol. 80, 4639-4643 (Aug. 1983).
Lund, et al. A validated system for ligation-free uracil excision based assembly of expression vectors for mammalian cell engineering. DTU Systems of Biology. 2011. 1 page. http://www.lepublicsystemepco.com/files/modules/gestion_rubriques/REF-B036-Lund_Anne%20Mathilde.pdf.
Ma, et al. DNA synthesis, assembly and application in synthetic biology. Current Opinion in Chemical Biology. 2012; 16:260-267.
Ma et al., Versatile surface functionalization of cyclic olefin copolymer (COC) with sputtered SiO2 thin film for potential BioMEMS applications. Journal of Materials Chemistry, DOI: 10.1039/b904663a, 11 pages (2009).
Mahato et al., Modulation of gene expression by antisense and antigene oligodeoxynucleotides and small interfering RNA Expert Opin. Drug Delivery, 2(1):3-28, 2005.
Margulies, et al. Genome sequencing in open microfabricated high-density picolitre reactors. Nature. Sep. 15, 2005;437(7057):376-80. Epub Jul. 31, 2005.
Matteucci, et al. Synthesis of deoxyoligonucleotides on a polymer support. J. Am. Chem. Soc. 1981; 103(11):3185-3191.
Matzas et al., Next generation gene synthesis by targeted retrieval of bead-immobilized, sequence verified DNA clones from a high throughput pyrosequencing device. Nat. Biotechnol., 28(12):1291-1294, 2010.
McBride & Caruthers, "An investigation of several deoxynucleoside phosphoramidites useful for synthesizing deoxyoligonucleotides." Tetrahedron Lett. 24: 245-248, 1983.
McGall, et al. Light-directed synthesis of high-density oligonucleotide arrays using semiconductor photoresists. Proc Natl Acad Sci U S A. Nov. 26, 1996;93(24):13555-60.
McGall, et al. The Efficiency of Light-Directed Synthesis of DNA Arrays on Glass Substrates. J. Am. Chem. Soc. 1997; 119(22):5081-5090.
Mei et al., Cell-free protein synthesis in microfluidic array devices Biotechnol. Prog., 23(6):1305-1311, 2007.
Mendel-Hartvig. Padlock probes and rolling circle amplification. New possibilities for sensitive gene detection. Comprehensive Summaries of Uppsala Dissertations from the Faculty of Medicine 1175. Uppsala University. 2002, 39 pages. http://www.diva-portal.org/smash/get/diva2:161926/FULLTEXT01.pdf.
Meyers and Friedland, Knowledge-based simulation of genetic regulation in bacteriophage lambda. Nucl. Acids Research, 12(1):1-16, 1984.
Mitra, et al. In situ localized amplification and contact replication of many individual DNA molecules. Nucleic Acids Res. Dec. 15, 1999;27(24):e34.
Muller, Caroline et al. "Protection and labelling of thymidine by a fluorescent photolabile group", Helvetica Chimica Acta, vol. 84, 3735-3741 (2001).
Nakatani, Kazuhiko et al., "Recognition of a single guanine bulge by 2-Acylamino-1,8-naphthyridine", J. Am. Chem. Soc., vol. 122, 2172-2177 (2000).
Nishikura, a short primer on RNAi: RNA-directed RNA polymerase acts as a key catalyst Cell, 107:415-418, 2001.
Nour-Eldin, et al. USER Cloning and USER Fusion: The Ideal Cloning Techniques for Small and Big Laboratories. Plant Secondary Metabolism Engineering. Methods in Molecular Biology vol. 643, 2010, pp. 185-200.
Ochman, et al. Genetic applications of an inverse polymerase chain reaction. Genetics. Nov. 1988;120(3):621-3.
Pan, et al. An approach for global scanning of single nucleotide variations. Proc Natl Acad Sci U S A. Jul. 9, 2002;99(14):9346-51.
Pankiewicz. Fluorinated nucleosides. Carbohydr Res. Jul. 10, 2000;327(1-2):87-105.
PCT Patent Application No. PCT/US2014/049834 International Preliminary Report on Patentability dated Feb. 18, 2016.
PCT Patent Application No. PCT/US2015/043605 International Search Report and Written Opinion dated Jan. 6, 2016.
PCT Patent Application No. PCT/US2015/043605 Invitation to Pay Additional Fees dated Oct. 28, 2015.
PCT Patent Application No. PCT/US2016/016459 International Search Report and Written Opinion dated Apr. 13, 2016.
PCT Patent Application No. PCT/US2016/016636 International Search Report and Written Opinion dated May 2, 2016.
PCT Patent Application No. PCT/US2016/028699 International Search Report and Written Opinion dated Jul. 29, 2016.
PCT Patent Application No. PCT/US2016/031674 International Search Report and Written Opinion dated Aug. 11, 2016.
PCT Patent Application No. PCT/US2016/052336 International Search Report and Written Opinion dated Dec. 7, 2016.
PCT Patent Application No. PCT/US2014/049834 International Search Report and Written Opinion dated Mar. 19, 2015.
PCT Patent Application No. PCT/US2014/049834, "Invitation to Pay Additional Fees and, where applicable, protest fee," dated Jan. 5, 2015.
Pease, et al. Light-generated oligonucleotide arrays for rapid DNA sequence analysis. Proc Natl Acad Sci U S A. May 24, 1994;91(11):5022-6.
Peisajovich, et al. BBF RFC 28: A method for combinatorial multi-part assembly based on the type-lis restriction enzyme aarl. Sep. 16, 2009, 7 pages.
Pellois, et al. "Individually addressable parallel peptide synthesis on microchips", Nature Biotechnology, vol. 20, 922-926 (Sep. 2002).
Petersen, et al. LNA: a versatile tool for therapeutics and genomics. Trends Biotechnol. Feb. 2003;21(2):74-81.
Pierce, et al. Linear-after-the-exponential polymerase chain reaction and allied technologies. Real-time detection strategies for rapid, reliable diagnosis from single cells. Methods Mol Med. 2007;132:65-85.
Pirrung. How to make a DNA chip. Angew. Chem. Int. Ed., 41:1276-1289, 2002.
Pon. Solid-phase supports for oligonucleotide synthesis. Methods Mol Biol. 1993;20:465-96.
Poster. Reimagine Genome Scale Research. 2016, 1 page. Available at http://www2.twistbioscience.com/Oligo_Pools_CRISPR_poster.
Powers et al. Optimal strategies for the chemical and enzymatic synthesis of bihelical deoxyribonucleic acids. J Am Chem Soc., 97(4):875-884, 1975.
Pray. "Discovery of DNA Structure and Function: Watson and Crick," Nature Education, 2008, 6 pages. available at: http://www.nature.com/scitable/topicpage/discovery-of-dna-structure-and-function-watson-397.
Prodromou, et al. Recursive PCR: a novel technique for total gene synthesis. Protein Eng. Dec. 1992;5(8):827-9.
Quan et al., "Parallel on-chip gene synthesis and application to optimization of protein expression," Nature Biotechnology, 29(5):449-452, 2011.
Raje and Murma, A Review of electrohydrodynamic-inkjet printing technology. International Journal of Emerging Technology and Advanced Engineering, 4(5):174-183, 2014.

(56) References Cited

OTHER PUBLICATIONS

Reimagine Sequence Space, Reimagine Research, Twist Bioscience, Product Brochure, Published Apr. 6, 2016 online at: www2.twistbioscience.com/TB_Product_Brochure_04.2016, 8 pages.
RF Electric discharge type excimer lamp. Products Catalog. Excimer lamp light source "flat excimer," 16 pages dated Jan. 2016. From: http://www.hamamatsu.com/jp/en/product/category/1001/3026/index.html.
Richmond, et al. Amplification and assembly of chip-eluted DNA (AACED): a method for high-throughput gene synthesis. Nucleic Acids Res. Sep. 24, 2004;32(17):5011-8. Print 2004.
Roche. Restriction Enzymes from Roche Applied Science—A Tradition of Premium Quality and Scientific Support. FAQS and Ordering Guide. Roche Applied Science. Accessed Jan. 12, 2015, 37 pages.
Ruminy, et al., "Long-range identification of hepatocyte nuclear factor-3 (FoxA) high and low-affinity binding Sites with a chimeric nuclease", J. Mol. Bioi., vol. 310, 523-535 (2001).
Saaem et al., In situ synthesis of DNA microarray on functionalized cyclic olefin copolymer substrate ACS Applied Materials & Interfaces, 2(2):491-497, 2010.
Saboulard, et al. High-throughput site-directed mutagenesis using oligonucleotides synthesized on DNA chips. Biotechniques. Sep. 2005;39(3):363-8.
Sacconi, L. et al., Three-dimensional magneto-optic trap for microobject manipulation, Optics Letters, vol. 26, No. 17, 1359-1361 (Sep. 1, 2001).
Saiki et al. Analysis of enzymatically amplified beta-globin and HLA-DQ alpha DNA with allele-specific oligonucleotide probes Nature 324:163-166 (1986).
Sandhu, et al. Dual asymmetric PCR: one-step construction of synthetic genes. Biotechniques. Jan. 1992;12(1):14-6.
Schaller, et al. Studies on Polynucleotides. XXV.1 The Stepwise Synthesis of Specific Deoxyribopolynucleotides (5). Further Studies on the Synthesis of Internucleotide Bond by the Carbodiimide Method. The Synthesis of Suitably Protected Dinucleotides as Intermediates in the Synthesis of Higher Oligonucleotides. J. Am. Chem. Soc. 1963; 85(23):3828-3835.
Schmalzing, Dieter et al., "Microchip electrophoresis: a method for high-speed SNP detection", Nucleic Acids Research, vol. 28, No. 9, i-vi (2000).
Smith, et al. Generating a synthetic genome by whole genome assembly: phiX174 bacteriophage from synthetic oligonucleotides. Proc Natl Acad Sci U S A. Dec. 23, 2003;100(26):15440-5. Epub Dec. 2, 2003.
Smith, et al. Generation of cohesive ends on PCR products by UDG-mediated excision of dU, and application for cloning into restriction digest-linearized vectors. PCR Methods Appl. May 1993;2(4):328-32.
Smith, Jane et al., "Mutation detection with MutH, MutL, and MutS mismatch repair proteins", Proc. Natl. Acad. Sci. USA, vol. 93, 4374-4379 (Apr. 1996).
Smith Jane et al., "Removal of Polymerase-Produced mutant sequences from PCR products", Proc. Natl. Acad. Sci. USA, vol. 94, 6847-6850 (Jun. 1997).
Smith, Steven B. et al., "Direct mechanical measurements of the elasticity of single DNA molecules using magnetic beads", Science, vol. 258, 1122-1126 (Nov. 13, 1992).
Soni, et al. Progress toward ultrafast DNA sequencing using solid-state nanopores. Clin Chem. Nov. 2007;53(11):1996-2001. Epub Sep. 21, 2007.
Southern, et al. Analyzing and comparing nucleic acid sequences by hybridization to arrays of oligonucleotides: evaluation using experimental models. Genomics. Aug. 1992;13(4):1008-17.
Sproat, et al. An efficient method for the isolation and purification of oligoribonucleotides. Nucleosides & Nucleotides. 1995; 14(1 &2):255-273.
Steel, The Flow-Thru Chip a Three-dimensional biochip platform. In: Schena, Microarray Biochip Technology, Chapter 5, Natick, MA: Eaton Publishing, 2000, 33 pages.
Stemmer, et al. Single-step assembly of a gene and entire plasmid from large numbers of oligodeoxyribonucleotides. Gene. Oct. 16, 1995;164(1):49-53.
Stryer. "DNA Probes and genes can be synthesized by automated solid-phase methods." Biochemistry, 3rd edition, New York: W.H. Freeman and Company, 1988; 123-125.
Stutz, et al. Novel fluoride-labile nucleobase-protecting groups for the synthesis of 3'(2')-O-amino-acylated RNA sequences. Helv. Chim. Acta. 2000; 83(9):2477-2503.
Takahashi, Cell-free cloning using multiply-primed rolling circle amplification with modified RNA primers. Biotechniques. Jul. 2009;47(1):609-15. doi: 10.2144/000113155.
Tanase, M. et al., "Magnetic trapping of multicomponent nanowires", The Johns Hopkins University, Baltimore, Maryland, pp. 1-3 (Jun. 25, 2001).
Taylor et al., Impact of surface chemistry and blocking strategies on DNA microarrays. Nucleic Acids Research, 31(16):e87, 19 pages, 2003.
The Hood Laboratory, "Beta Group." Assembly Manual for the POSaM: The ISB Piezoelelctric Oligonucleotide Synthesizer and Microarrayer, Inkjet Microarrayer Manual Version 1.2, 50 pages, May 28, 2004.
Tian, et al. Accurate multiplex gene synthesis from programmable DNA microchips. Nature. Dec. 23, 2004;432(7020):1050-4.
Tsai et al., Dimeric CRISPR RNA-guided Fokl nucleases for highly specific genome editing Nat. Biotechnol., 32(6):569-576, 2014.
Unger, et al. Monolithic microfabricated valves and pumps by multilayer soft lithography. Science. Apr. 7, 2000;288(5463):113-6.
U.S. Appl. No. 14/885,965 Office Action dated Jul. 7, 2016.
U.S. Appl. No. 14/452,429 Office Action dated Apr. 9, 2015.
U.S. Appl. No. 14/452,429 Notice of Allowance dated Jun. 7, 2016.
U.S. Appl. No. 14/452,429 Office Action dated Oct. 21, 2015.
U.S. Appl. No. 14/452,429 Restriction Requirement dated Dec. 12, 2014.
U.S. Appl. No. 14/885,962 Office Action dated Sep. 8, 2016.
U.S. Appl. No. 14/885,962 Restriction Requirement dated Mar. 1, 2016.
U.S. Appl. No. 14/885,963 Notice of Allowance dated May 24, 2016.
U.S. Appl. No. 14/885,965 Office Action dated Feb. 18, 2016.
U.S. Appl. No. 15/233,835 Restriction Requirement dated Nov. 4, 2016.
U.S. Appl. No. 15/245,054 Office Action dated Oct. 19, 2016.
Vaijayanthi, et al. Recent advances in oligonucleotide synthesis and their applications. Indian J Biochem Biophys. Dec. 2003;40(6):377-91.
Van Den Brulle, et al. A novel solid phase technology for high-throughput gene synthesis. Biotechniques. 2008; 45(3):340-343.
Vargeese, et al. Efficient activation of nucleoside phosphoramidites with 4,5-dicyanoimidazole during oligonucleotide synthesis. Nucleic Acids Res. Feb. 15, 1998;26(4):1046-50.
Verma, et al. Modified oligonucleotides: synthesis and strategy for users. Annu Rev Biochem. 1998;67:99-134.
Vincent, et al. Helicase-dependent isothermal DNA amplification. EMBO Rep. Aug. 2004;5(8):795-800.
Visscher et al., "Construction of multiple-beam optical traps with nanometer-resolution position sensing", IEEE Journal of Selected Topics in Quantum Electronics, vol. 2, No. 4, 1066-1076 (Dec. 1996.
Voldmans Joel et al., "Holding forces of single-particle dielectrophoretic traps." Biophysical Journal, vol. 80, No. 1, 531-541 (Jan. 2001).
Vos, et al. AFLP:A new technique for DNA fingerprinting. Nucleic Acids Res. Nov. 11, 1995;23(21):4407-14.
Wah, David A. et al., "Structure of Fok I has implications for DNA cleavage", Proc. Natl. Acad. Sci. USA, vol. 95, 10564-10569 (Sep. 1998).
Wah, David A. et al., "Structure of the multimodular endonuclease Fok I bound to DNA", Nature, vol. 388, 97-100 ( Jul. 1997).
Walker, et al. Strand displacement amplification—an isothermal, in vitro DNA amplification technique. Nucleic Acids Res. Apr. 11, 1992;20(7):1691-6.

(56) References Cited

OTHER PUBLICATIONS

Weber, et al. A modular cloning system for standardized assembly of multigene constructs. PLoS One. Feb. 18, 2011;6(2):e16765. doi: 10.1371/journal.pone.0016765.
Welz, et al. 5-(Benzylmercapto)-1H-tetrazole as activator for 2'-O-TBDMS phosphoramidite building blocks in RNA synthesis. Tetrahedron Lett. 2002; 43(5):795-797.
Westin et al., Anchored multiplex amplification on a microelectronic chip array Nature Biotechnology, 18:199-202 (2000) (abstract only).
Whitehouse, Adrian et al. "Analysis of the mismatch and insertion/deletion binding properties of Thermus thermophilus, HB8, MutS", Biochemical and Biophysical Research Communications, vol. 233, 834-837 (1997).
Wijshoff, Herman. Structure and fluid-dynamics in Piezo inkjet printheads. Thesis. Venio, The Netherlands, published 2008, pp. 1-185.
Wirtz, Denis, "Direct measurement of the transport properties of a single DNA molecule", Physical Review Letters, vol. 75, No. 12, 2436-2439 (Sep. 18, 1995).
Withers-Martinez, Chrislaine et al., "PCR-based gene synthesis as an efficient approach for expression of the A+ T-rich malaria genome", Protein Engineering, vol. 12, No. 12, 1113-1120 (1999).
Wood, Richard D. et al., "Human DNA repair genes", Science, vol. 291, 1284-1289 (Feb. 16, 2001).
Wosnick, et al. Rapid construction of large synthetic genes: total chemical synthesis of two different versions of the bovine prochymosin gene. Gene. 1987;60(1):115-27.
Wu, et al. RNA-mediated gene assembly from DNA arrays. Angew Chem Int Ed Engl. May 7, 2012;51(19):4628-32. doi: 10.1002/anie. 201109058.
Wu, et al. Specificity of the nick-closing activity of bacteriophage T4 DNA ligase. Gene. 1989;76(2):245-54.
Wu, Xing-Zheng et al., "An improvement of the on-line electrophoretic concentration method for capillary electrophoresis of proteins an experimental factors affecting he concentration effect", Analytical Sciences, vol. 16, 329-331 (Mar. 2000).
Xiong, et al. A simple, rapid, high-fidelity and cost-effective PCR-based two-step DNA synthesis method for long gene sequences. Nucleic Acids Res. Jul. 7, 2004;32(12):e98.
Xiong et al., Chemical gene synthesis: Strategies, softwares, error corrections, and applications. FEMS Microbiol. Rev., 32:522-540, 2008.
Xiong, et al. Non-polymerase-cycling-assembly-based chemical gene synthesis: Strategies, methods, and progress. Biotechnology Advances. 2008; 26(2):121-134.
Yang, et al "Purification, cloning, and characterization of the CEL I nuclease", Biochemistry, vol. 39, No. 13, 3533-351 (2000).
Yehezkel et al., De novo DNA synthesis using single molecule PCR Nucleic Acids Research, 36(17):e107, 2008.
Youil, Rima et al., "Detection of 81 of 81 known mouse Beta-Giobin promoter mutations with T4 Endonuclease VII• The EMC Method", Genomics, vol. 32, 431-435 (1996).
Young, et al. Two-step total gene synthesis method. Nucleic Acids Res. Apr. 15, 2004;32(7):e59.
Zheleznaya, et al. Nicking endonucleases. Biochemistry (Mosc). Dec. 2009;74(13):1457-66.
Zhou et al., Microfluidic PicoArray synthesis of oligodeoxynucleotides and simultaneous assembling of multiple DNA sequences Nucleic Acids Research, 32(18):5409-5417, 2004.
Bethge et al., "Reverse synthesis and 3'-modification of RNA." Jan. 1, 2011, pp. 64-64, XP055353420. Retrieved from the Internet: URL:http://www.is3na.org/assets/events/Category%202-Medicinal%20Chemistry%20of%2001igonucleotides%20%2864-108%29. pdf.
Binkowski et al., Correcting errors in synthetic DNA through consensus shuffling. Nucleic Acids Research, 33(6):e55, 8 pages, 2005.
Blanchard, et al. High-Density Oligonucleotide Arrays. Biosens. & Bioelectronics. 11:687-690, 1996.

Borovkov et al., High-quality gene assembly directly from unpurified mixtures of microassay-synthesized oligonucleotides. Nucleic Acid Research, 38(19):e180, 10 pages, 2010.
Cleary et al. Production of complex nucleic acid libraries using highly parallel in situ oligonucleotide synthesis. Nat Methods 1(3):241-248, 2004.
Dormitzer et al., Synthetic generation of influenza vaccine viruses for rapid response to pandemics. Sci Translational Medicine, 5(185):185ra68, 14 pages, 2013.
Fodor, et al. Light-directed, spatially addressable parallel chemical synthesis. Science. 251(4995):767-73, 1991.
Leproust, et al. Synthesis of high-quality libraries of long (150mer) oligonucleotides by a novel depurination controlled process. Nucleic Acids Research. 2010; 38(8):2522-2540.
Link Technologies. "Product Guide 2010." Nov. 27, 2009, 136 pages. XP055353191. Retrieved from the Internet: URL:http://www.linktech.co.uk/documents/517/517.pdf.
Morin et al., Profiling the HeLa S3 transcriptome using randomly primed cDNA and massively parallel short-read sequencing. Biotechniques, 45:81-94, 2008.
PCT/US2016/016459 International Preliminary Report on Patentability dated Aug. 17, 2017.
PCT/US2016/016636 International Preliminary Report on Patentability dated Aug. 17, 2017.
PCT/US2017/026232 International Search Report and Written Opinion dated Aug. 28, 2017.
PCT/US2017/036868 International Search Report and Written Opinion dated Aug. 11, 2017.
Quan, et al. Parallel on-chip gene synthesis and application to optimization of protein expression. Nature Biotechnology. 29:449-452, 2011.
Srivannavit et al., Design and fabrication of microwell array chips for a solution-based, photogenerated acid-catalyzed parallel oligonucleotide DNA synthesis. Sensors and Actuators A, 116:150-160, 2004.
Srivastava et al., "RNA synthesis: phosphoramidites for RNA synthesis in the reverse direction. Highly efficient synthesis and application to convenient introduction of ligands, chromophores and modifications of synthetic RNA at the 3'-end", Nucleic Acids Symposium Series, 52(1):103-104, 2008.
U.S. Appl. No. 14/241,874 Office Action dated Feb. 27, 2017.
U.S. Appl. No. 14/885,965 Office Action dated Aug. 30, 2017.
U.S. Appl. No. 15/135,434 Restriction Requirement dated Jul. 12, 2017.
U.S. Appl. No. 15/233,835 Office Action dated Jul. 26, 2017.
Wagner et al., "Nucleotides, Part LXV, Synthesis of 2'-Deoxyribonucleoside 5'-Phosphoramidites: New Building Blocks for the Inverse (5'-3')-0iigonucleotide Approach." Helvetica Chimica Acta, 83(8):2023-2035, 2000.
Xu et al., Design of 240,000 orthogonal 25mer DNA barcode probes. PNAS, 106(7):2289-2294, 2009.
Yes HMDS vapor prime process application note Prepared by UC Berkeley and University of Texas at Dallas and re-printed by Yield Engineering Systems, Inc., 6 pages (http://www.yieldengineering.com/Portals/0/HMDS%20Application%20Note.pdf (Published online Aug. 23, 2013).
Andoni and Indyk, Near-Optimal Hashing Algorithms for Approximate Nearest Neighbor in High Dimensions, Communications of the ACM, 51(1):117-122, Jan. 2008.
Blawat et al., Forward error correction for DNA data storage. Procedia Computer Science, 80:1011-1022, 2016.
Bornholt et al., A DNA-Based Archival Storage System, in International Conference on Architectural Support for Programming Languages and Operating Systems (ASPLOS), Apr. 2-6, 2016, Atlanta, GA, 2016, 637-649.
Cardelli, Two-Domain DNA Strand Displacement, Electron. Proc. Theor. Comput. Sci., 26:47-61, 2010.
Carlson, "Time for New DNA Synthesis and Sequencing Cost Curves," 2014. [Online]. Available: http://www.synthesis.cc/synthesis/2014/02/time_for_new_cost_curves_2014. [Accessed: May 25, 2017], 10 pages.
Caruthers, The Chemical Synthesis of DNA/RNA: Our Gift to Science. J. Biol. Chem., 288(2):1420-1427, 2013.

(56) References Cited

OTHER PUBLICATIONS

Chan et al., Programmable chemical controllers made from DNA, Nat. Nanotechnol., 8(10):755-762, 2013.
Erlich and Zielinski, DNA fountain enables a robust and efficient storage architecture. Science, 355(6328):950-054, 2017.
European Patent Application No. 14834665.3 extended European Search Report dated Apr. 28, 2017.
Finger et al., The wonders of Flap Endonucleases: Structure, function, mechanism and regulation. Subcell Biochem., 62:301-326, 2012.
Fogg et al., Structural basis for uracil recognition by archaeal family B DNA polymerases. Nature Structural Biology, 9(12):922-927, 2002.
GeneArt Seamless Cloning and Assembly Kits. Life Technologies Synthetic Biology. 8 pages, available online Jun. 15, 2012.
Gibson Assembly. Product Listing. Application Overview. 2 pages, available online Dec. 16, 2014.
Goldman et al., Towards practical, high-capacity, low-maintenance information storage in synthesized DNA, Nature, 494(7435):77-80, 2013.
Grass, et al., Robust chemical preservation of digital information on DNA in silica with error-correcting codes, Angew. Chemie—Int. Ed., 54(8): 2552-2555, 2015.
Greagg et al., A read-ahead function in archaeal DNA polymerases detects promutagenic template-strand uracil. Proc. Nat. Acad. Sci. USA, 96:9045-9050, 1999.
In-Fusion Cloning: Accuracy, Not Background. Cloning & Competent Cells, ClonTech Laboratories, 3 pages, available online Jul. 6, 2014.
Jinek et al., A Programmable dual-RNA-guided DNA endonuclease in adaptive bacterial immunity. Science, 337:816-821, 2012.
Limbachiya et al., Natural data storage: A review on sending information from now to then via Nature. ACM Journal on Emerging Technologies in Computing Systems, V(N):Article A, May 19, 2015, 17 pages.
Liu et al., Rational design of CXCR4 specific antibodies with elongated CDRs. JACS, 136:10557-10560, 2014.
Neiman M.S,. Negentropy principle in information processing systems. Radiotekhnika, 1966, No. 11, pp. 2-9.
Neiman M.S., On the bases of the theory of information retrieval. Radiotekhnika, 1967, No. 5, pp. 2-10.
Neiman M.S., On the molecular memory systems and the directed mutations. Radiotekhnika, 1965, No. 6, pp. 1-8.
Neiman M.S., On the relationships between the reliability, performance and degree of microminiaturization at the molecular-atomic level. Radiotekhnika, 1965, No. 1, pp. 1-9.
Neiman M.S., Some fundamental issues of microminiaturization. Radiotekhnika, 1964, No. 1, pp. 3-12.
Organick et al., Scaling up DNA data storage and random access retrieval, bioRxiv, preprint first posted online Mar. 7, 2017, 14 pages.
PCT Patent Application No. PCT/US2015/043605 International Preliminary Report on Patentability dated Feb. 16, 2017.
PCT/US2016/064270 International Search Report and Written Opinion dated Apr. 28, 2017.
Qian and Winfree, Scaling up digital circuit computation with DNA strand displacement cascades. Science, 332(6034):1196-1201, 2011.
Qian, et al., Neural network computation with DNA strand displacement cascades, Nature, 475(7356):368-372, 2011.
Rastegari, et al., XNOR-Net: ImageNet Classification Using Binary Convolutional Neural Networks, in ECCV 2016, Part IV, LNCS 9908, pp. 525-542, 2016.
Seelig, et al., Enzyme-Free Nucleic Acid Logic Circuits, Science, 314(5805):1585-1588, 2006.
Simonyan and Zisserman, Very Deep Convolutional Networks for Large-Scale Image Recognition, Published as a conference paper at Int. Conf. Learn. Represent, pp. 1-14, 2015.
The SLIC, Gibson, CPEC and SLiCE assembly methods (and GeneArt Seamless, In-Fusion Cloning). 5 pages, available online Sep. 2, 2010.
U.S. Appl. No. 15/245,054 Office Action dated Mar. 21, 2017.
U.S. Appl. No. 15/377,547 Office Action dated Mar. 24, 2017.
Wan et al., Deep Learning for Content-Based Image Retrieval: A comprehensive study. in Proceedings of the 22nd ACM International Conference on Multimedia—Nov. 3-7, 2014, Orlando, FL, pp. 157-166, 2014.
Wright and Church, An open-source oligomicroarray standard for human and mouse. Nature Biotechnology, 20:1082-1083, 2002.
Yazdi et al., A Rewritable, Random-Access DNA-Based Storage System, Scientific Reports, 5, Article No. 14138, 27 pages, 2015.
Zhang and Seelig, Dynamic DNA nanotechnology using strand-displacement reactions, Nat. Chem., 3(2):103-113, 2011.
Zhirnov et al., Nucleic acid memory. Nature Materials, 15:366, 2016.
PCT/US2016/028699 International Preliminary Report on Patentability dated Nov. 2, 2017.
PCT/US2017/045105 International Search Report and Written Opinion dated Oct. 20, 2017.
U.S. Appl. No. 14/885,962 Notice of Allowance dated Nov. 8, 2017 and Sep. 29, 2017.
U.S. Appl. No. 15/233,835 Notice of Allowance dated Oct. 4, 2017.
U.S. Appl. No. 15/602,991 Notice of Allowance dated Oct. 25, 2017.
U.S. Appl. No. 15/602,991 Office Action dated Sep. 21, 2017.
U.S. Appl. No. 15/603,013 Office Action dated Oct. 20, 2017.
U.S. Appl. No. 15/682,100 Restriction Requirement dated Nov. 8, 2017.

A)

10x magnification      50x magnification

B)

10x magnification      50x magnification

C)

10x magnification      50x magnification

FUNCTIONALIZED SURFACES AND PREPARATION THEREOF

CROSS-REFERENCE

This application claims the benefit of U.S. Provisional Application No. 62/261,753 filed on Dec. 1, 2015, which is incorporated herein by reference in its entirety.

BACKGROUND

The increasing miniaturization of biotechnology devices requires an increased resolution for deposition of materials on such devices. A variety of known techniques allow for medium to high resolution patterning on surfaces. However, such techniques present disadvantages such as material incompatibility or contamination.

BRIEF SUMMARY

Provided herein are methods for surface patterning, the methods comprising: applying a first set of molecules to a surface of a structure, wherein each of the first set of molecules binds to the surface and lacks a reactive group capable of binding to a nucleoside; applying electromagnetic radiation (EMR) to predetermined regions of the surface, wherein the EMR comprises a wavelength from about 100 nm to about 300 nm, wherein application of the EMR results in removal of the first set of molecules at the predetermined regions, thereby defining different loci for oligonucleic acid extension; and synthesizing a plurality of oligonucleic acids, wherein each oligonucleic acid extends from a different locus, and wherein the different loci are at least about 75% uniform when measured by calculating amplitude of signal variation for oligonucleic acids extending from each locus divided by total signal intensity following white light illumination using an optical microscope. Further provided are methods wherein greater than about 90% of the first set of molecules are removed at the predetermined regions of the surface following application of EMR. Further provided are methods wherein about 100% of the first set of molecules are removed at the predetermined regions of the surface following application of EMR. Further provided are methods wherein the predetermined regions have a width of about 1 to about 500 um. Further provided are methods wherein the predetermined regions have a width of about 1 to about 100 um. Further provided are methods wherein the predetermined regions have a width of about 3 um to about 60 um. Further provided are methods wherein the predetermined regions have a width of at least 3 um. Further provided are methods wherein the predetermined regions have a perimeter that is a circle or a rectangle in shape. Further provided are methods wherein the first set of molecules comprises a fluorosilane. Further provided are methods wherein the first set of molecules comprises perfluorooctyltrichlorosilane, (tridecafluoro-1,1,2,2-tetrahydrooctyl)trichlorosilane, or tridecafluoro-1,1,2,2-tetrahydrooctyl)trimethoxysilane. Further provided are methods further comprising applying a second set of molecules to the surface after application of the EMR, wherein each of the second set of molecules binds to the predetermined regions of the surface and comprises the reactive group capable of binding to a nucleoside. Further provided are methods wherein the second set of molecules comprises an aminosilane. Further provided are methods wherein the second set of molecules comprises N-(3-triethoxysilylpropyl)-4-hydroxybutyramide (HAPS), 11-acetoxyundecyltriethoxysilane, n-decyltriethoxysilane, (3-aminopropyl)trimethoxysilane, (3-aminopropyl)triethoxysilane, 3-glycidoxypropyltrimethoxysilane (GOPS), or 3-iodo-propyltrimethoxysilane. Further provided are methods wherein each of the oligonucleic acids comprises about 25 bases to about 2 kb in length. Further provided are methods wherein each of the oligonucleic acids comprises about 25 bases to about 150 bases in length. Further provided are methods wherein the oligonucleic acids extending from each locus are about 80% uniform when measured by calculating amplitude of signal variation for oligonucleic acids extending from each locus divided by total signal intensity following white light illumination using an optical microscope. Further provided are methods wherein the oligonucleic acids extending from the different loci collectively encode sequence for a preselected gene. Further provided are methods wherein the EMR comprises a wavelength from about 150 to about 200 nm. Further provided are methods wherein the EMR has a wavelength of about 172 nm. Further provided are methods wherein the surface is substantially planar. Further provided are methods wherein the surface comprises microstructures. Further provided are methods wherein the microstructures comprise channels or wells. Further provided are methods wherein the EMR is emitted from a lamp or a laser. Further provided are methods wherein the lamp comprises an emission source in the shape of a cylinder or a flat panel. Further provided are methods wherein the flat panel has a surface area that is at least 36 inches squared. Further provided are methods wherein the structure is a plate, tape, or belt.

Provided herein are methods for surface patterning, the methods comprising: applying a first set of molecules to a surface of a structure, wherein each of the first set of molecules comprises a reactive group capable of binding to a nucleoside; applying electromagnetic radiation (EMR) to predetermined regions of the surface, wherein the EMR comprises a wavelength from about 100 nm to about 300 nm, wherein application of the EMR results in removal of the first set of molecules at the predetermined regions, thereby defining different loci for oligonucleic acid extension; and synthesizing a plurality of oligonucleic acids, wherein each oligonucleic acid extends from a different locus, and wherein the different loci are at least about 75% uniform when measured by calculating amplitude of signal variation for oligonucleic acids extending from each locus divided by total signal intensity following white light illumination using an optical microscope. Further provided are methods wherein greater than about 90% of the first set of molecules are removed at the predetermined regions of the surface following application of EMR. Further provided are methods wherein about 100% of the first set of molecules are removed at the predetermined regions of the surface following application of EMR. Further provided are methods wherein the predetermined regions have a width of about 1 to about 500 um. Further provided are methods wherein the predetermined regions have a width of about 1 to about 100 um. Further provided are methods wherein the predetermined regions have a width of about 3 um to about 60 um. Further provided are methods wherein the predetermined regions have a width of at least 3 um. Further provided are methods wherein the predetermined regions have a perimeter that is a circle or a rectangle in shape. Further provided are methods wherein the structure is a plate, tape, or belt. Further provided are methods wherein the first set of molecules comprises an aminosilane. Further provided are methods wherein the first set of molecules comprises N-(3-triethoxysilylpropyl)-4-hydroxybutyramide (HAPS), 11-acetoxyundecyltriethoxysilane, n-decyltriethoxysilane, (3-aminopropyl)trimethoxysilane, (3-aminopropyl)triethoxysilane, 3-glycidoxypropyltrimethoxysilane (GOPS), or 3-iodo-propyltrimethoxysilane. Further provided are methods further comprising applying a second set of molecules to the surface after application of the EMR, wherein each of the second set of molecules binds to the predetermined regions of the surface and lacks the reactive group capable of binding to a nucleoside. Further provided are methods wherein the second set of molecules comprises a fluorosilane. Further provided are methods wherein the second set of molecules comprises perfluorooctyltrichlorosilane, octylchlorosilane, octadecyltrichlorosilane, (tridecafluoro-1,1,2,2-tetrahydrooctyl)trichlorosilane, or tridecafluoro-1,1,2,2-tetrahydrooctyl)trimethoxysilane. Further provided are methods wherein each of the oligonucleic acids comprises about 25 bases to about 2 kb in length. Further provided are methods wherein each of the oligonucleic acids comprises about 25 bases to about 150 bases in length. Further provided are methods wherein each locus comprises a population of oligonucleic acids about 80% uniform when measured by calculating amplitude of signal variation for oligonucleic acids extending from each locus divided by total signal intensity following white light illumination using an optical microscope. Further provided are methods wherein the oligonucleic acids extending from the different loci collectively encode sequence for a preselected gene. Further provided are methods wherein the EMR comprises a wavelength from about 150 to about 200 nm. Further provided are methods wherein the EMR has a wavelength of about 172 nm. Further provided are methods wherein the surface is substantially planar. Further provided are methods wherein the microstructures comprise channels or wells.

Provided herein are methods for surface patterning, the methods comprising: applying a first set of molecules to a surface of a structure, wherein each of the first set of molecules binds to the surface and comprises a reactive group capable of binding to a nucleoside; synthesizing a first layer of oligonucleic acids, wherein each oligonucleic acid in the first layer of oligonucleic acids comprises about 10 to about 100 bases in length and extends from the surface; applying electromagnetic radiation (EMR) to a predetermined region of the surface to selectively remove a portion of the layer of oligonucleic acids, wherein the EMR comprises a wavelength from about 100 nm to about 300 nm; and synthesizing a second layer of oligonucleic acids, wherein each oligonucleic acid in the second layer of oligonucleic extends acids from the remaining portion of the first layer of layer of oligonucleic acids. Further provided are methods wherein the first set of molecules comprises an aminosilane. Further provided are methods wherein the first set of molecules comprises N-(3-triethoxysilylpropyl)-4-hydroxybutyramide (HAPS), 11-acetoxyundecyltriethoxysilane, n-decyltriethoxysilane, (3-aminopropyl)trimethoxysilane, (3-aminopropyl)triethoxysilane, 3-glycidoxypropyltrimethoxysilane (GOPS), or 3-iodo-propyltrimethoxysilane. Further provided are methods further comprising applying a second set of molecules to the surface after application of the EMR, wherein each of the second set of molecules binds to the predetermined region of the surface and lacks the reactive group capable of binding to a nucleoside. Further provided are methods wherein the second set of molecules comprises a fluorosilane. Further provided are methods wherein the second set of molecules comprises perfluorooctyltrichlorosilane octylchlorosilane, octadecyltrichlorosilane, (tridecafluoro-1,1,2,2-tetrahydrooctyl)trichlorosilane, or tridecafluoro-1,1,2,2-tetrahydrooctyl)trimethoxysilane. Further provided are methods wherein the second layer of oligonucleic acids comprises about 25 bases to about 2 kb in length. Further provided are methods wherein the second layer of oligonucleic acids comprises about 25 bases to about 500 bases in length. Further provided are methods wherein the first layer of oligonucleic acids comprises a homopolymeric nucleic acid sequence. Further provided are methods wherein the homopolymeric nucleic acid sequence is about 50 bases in length. Further provided are methods wherein the EMR comprises a wavelength from about 150 to about 200 nm. Further provided are methods wherein the EMR comprises wavelength of about 172 nm. Further provided are methods wherein the EMR is emitted from a lamp or a laser. Further provided are methods wherein the lamp comprises an emission source in the shape of a cylinder or a flat panel. Further provided are methods wherein the flat panel has a surface area that is at least 36 inches squared. Further provided are methods wherein the structure is a plate, tape, or belt. Further provided are methods wherein the surface comprises a plurality of loci for oligonucleic acid extension, and wherein the loci are at least about 75% uniform when measured by calculating amplitude of signal variation for oligonucleic acids extending from each locus divided by total signal intensity following white light illumination using an optical microscope. Further provided are methods wherein the surface is substantially planar. Further provided are methods wherein the surface comprises microstructures. Further provided are methods wherein the microstructures comprise channels or wells. Further provided are methods further comprising releasing the plurality of oligonucleic acids and assembling a plurality of genes.

Provided herein is a library of synthesized oligonucleic acids, comprising a plurality of different oligonucleic acids, each different oligonucleic acid extending from a structure at a different loci, wherein the different loci are at least about 75% uniform when measured by calculating amplitude of signal variation for oligonucleic acids extending from each locus divided by total signal intensity following white light illumination using an optical microscope. Further provided is a library wherein the plurality of different oligonucleic acids comprises at least 20,000 different oligonucleic acids. Further provided is a library wherein the oligonucleic acids extending from each locus are about 80% uniform when measured by calculating amplitude of signal variation for oligonucleic acids extending from each locus divided by total signal intensity following white light illumination using an optical microscope.

Provided herein is are methods for gene synthesis, comprising providing predetermined sequences for a plurality of oligonucleic acids, wherein the plurality of oligonucleic acids collectively encode for a plurality of genes; providing a surface for oligonucleic acid synthesis; synthesizing the plurality of oligonucleic acids from the surface, wherein each oligonucleic acid extends from a different locus, and wherein the different loci are at least about 75% uniform when measured by calculating amplitude of signal variation for oligonucleic acids extending from each locus divided by total signal intensity following white light illumination using an optical microscope; and assembling the plurality of genes from the plurality of oligonucleic acids. Further provided herein are methods further comprising, prior to synthesizing: providing the surface for oligonucleic acid synthesis, wherein the surface comprises a first set of molecules, wherein each of the first set of molecules lacks a reactive group capable of binding to a nucleoside; applying electromagnetic radiation (EMR) to predetermined regions of the surface, wherein the EMR comprises a wavelength from about 100 nm to about 300 nm, wherein application of the EMR results in removal of the first set of molecules at the predetermined regions, thereby defining loci for oligonucleic acid extension. Provided herein are methods for gene synthesis, the methods comprising: providing predetermined sequences for a plurality of oligonucleic acids, wherein the plurality of oligonucleic acids collectively encode for a plurality of genes; providing a surface for oligonucleic acid synthesis, wherein the surface comprises a first set of molecules, wherein each of the first set of molecules lacks a reactive group capable of binding to a nucleoside; applying electromagnetic radiation (EMR) to predetermined regions of the surface, wherein the EMR comprises a wavelength from about 100 nm to about 300 nm, wherein application of the EMR results in removal of the first set of molecules at the predetermined regions, thereby defining loci for oligonucleic acid extension; synthesizing a plurality of oligonucleic acids from the surface, wherein each oligonucleic acid extends from a different locus, and wherein the different loci are at least about 75% uniform when measured by calculating amplitude of signal variation for oligonucleic acids extending from each locus divided by total signal intensity following white light illumination using an optical microscope; and assembling the plurality of genes from the plurality of oligonucleic acids. Further provided are methods wherein greater than about 90% of the first set of molecules are removed at the predetermined regions of the surface following application of EMR. Further provided are methods wherein about 100% of the first set of molecules are removed at the predetermined regions of the surface following application of EMR. Further provided are methods wherein the predetermined regions have a width of about 1 to about 500 um. Further provided are methods wherein the predetermined regions have a width of about 1 to about 100 um. Further provided are methods wherein the predetermined regions have a width of about 3 um to about 60 um. Further provided are methods wherein the predetermined regions have a width of at least 3 um. Further provided are methods wherein the predetermined regions have a perimeter that is a circle or a rectangle in shape. Further provided are methods wherein the first set of molecules comprises a fluorosilane. Further provided are methods wherein the first set of molecules comprises perfluorooctyltrichlorosilane, octylchlorosilane, octadecyltrichlorosilane, (tridecafluoro-1,1,2,2-tetrahydrooctyl) trichlorosilane, or tridecafluoro-1,1,2,2-tetrahydrooctyl) trimethoxysilane. Further provided are methods further comprising applying a second set of molecules to the surface after application of the EMR, wherein each of the second set of molecules binds to the predetermined regions of the surface and comprises a reactive group capable of binding to a nucleoside. Further provided are methods wherein the second set of molecules comprises an aminosilane. Further provided are methods wherein the second set of molecules comprises N-(3-triethoxysilylpropyl)-4-hydroxybutyramide (HAPS), 11-acetoxyundecyltriethoxysilane, n-decyltriethoxysilane, (3-aminopropyl)trimethoxysilane, (3-aminopropyl)triethoxysilane, 3-glycidoxypropyltrimethoxysilane (GOPS), or 3-iodo-propyltrimethoxysilane. Further provided are methods wherein each of the oligonucleic acids comprises about 25 bases to about 2 kb in length. Further provided are methods wherein each of the oligonucleic acids comprises about 25 bases to about 150 bases in length. Further provided are methods wherein each locus comprises a population of oligonucleic acids about 80% uniform when measured by calculating amplitude of signal variation for oligonucleic acids extending from each locus divided by total signal intensity following white light illumination using an optical microscope. Further provided are methods wherein the oligonucleic acids extending from the different loci collectively encode sequence for a preselected gene. Further provided are methods wherein the EMR comprises a wavelength from about 150 nm to about 200 nm. Further provided are methods wherein the EMR has a wavelength of about 172 nm. Further provided are methods wherein the surface is substantially planar. Further provided are methods wherein the surface comprises microstructures. Further provided are methods wherein the microstructures comprise channels or wells. Further provided are methods wherein the EMR is emitted from a lamp or a laser. Further provided are methods wherein the lamp comprises an emission source in the shape of a cylinder or a flat panel. Further provided are methods wherein the flat panel has a surface area that is at least 36 inches squared. Further provided are methods wherein the plurality of oligonucleic acids synthesized on the surface are arranged in clusters of the different loci, wherein each cluster comprises oligonucleic acids encoding sequence for a single gene. Further provided are methods wherein the plurality of genes comprises at least 50, 240, or 5000 genes.

INCORPORATION BY REFERENCE

All publications, patents, and patent applications disclosed herein are incorporated by reference to the same extent as if each individual publication, patent, or patent application was specifically and individually indicated to be incorporated by reference. In the event of a conflict between a term disclosed herein and a term in an incorporated reference, the term herein controls.

DETAILED DESCRIPTION

Figure 1:
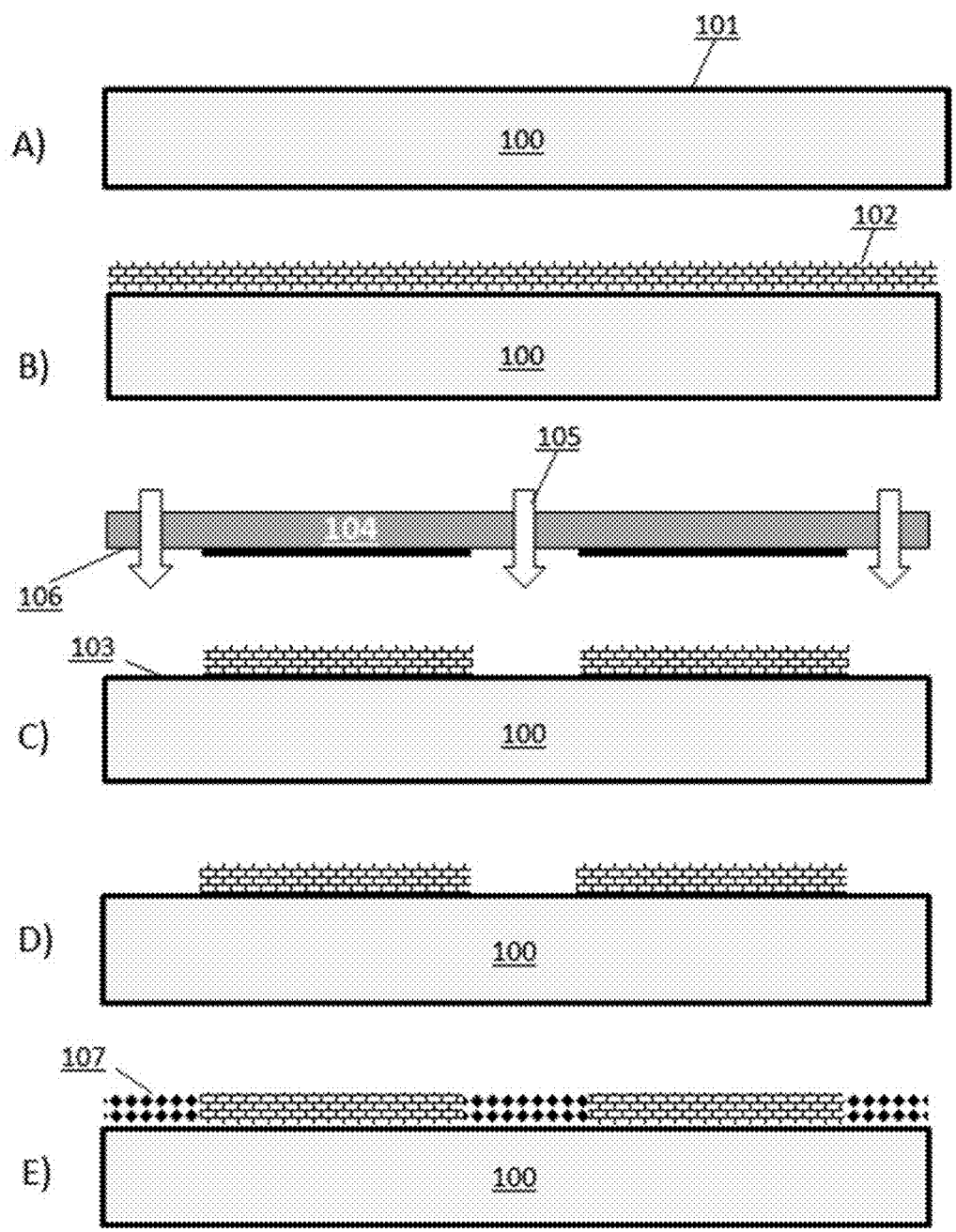
FIG. 1 depicts a schematic process flow for the functionalization of a surface with two different coating materials patterned using electromagnetic radiation (EMR).

The present disclosure provides for devices, compositions, methods and systems related the patterning of the surface of a structure utilizing electromagnetic radiation (EMR) to remove a material bound to a surface of the structure at select regions to generate a desired pattern of the material on the surface. Methods described herein provide for the generation of surfaces having differential chemical coatings in a timeframe that is faster than conventional methods. In addition, described herein are methods where the resultant populations extending from sites for nucleic acid extension (loci) provide for highly uniform nucleic acid populations. Methods described herein provide for the generation of a library of synthesized oligonucleic acids, comprising a plurality of different oligonucleic acids, each different oligonucleic acid extending from a structure at a different loci, wherein the different loci are at least about 75% uniform when measured by calculating amplitude of signal variation for oligonucleic acids extending from each locus divided by total signal intensity following white light illumination using an optical microscope. Synthesized nucleic acid populations synthesized by methods described herein can be used for downstream applications, such as gene assembly or PCR mutagenesis. For example, Further provided herein are methods for gene synthesis, the methods comprising providing predetermined sequences for a plurality of oligonucleic acids, wherein the plurality of oligonucleic acids collectively encode for a plurality of genes; synthesizing a plurality of oligonucleic acids from the surface, wherein each oligonucleic acid extends from a different locus, and wherein the different loci are at least about 75% uniform when measured by calculating amplitude of signal variation for oligonucleic acids extending from each locus divided by total signal intensity following white light illumination using an optical microscope; and assembling the plurality of genes from the plurality of oligonucleic acids.

Definitions

Throughout this disclosure, various embodiments are presented in a range format. It should be understood that the description in range format is merely for convenience and brevity and should not be construed as an inflexible limitation on the scope of any embodiments. Accordingly, the description of a range should be considered to have specifically disclosed all the possible subranges as well as individual numerical values within that range to the tenth of the unit of the lower limit unless the context clearly dictates otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual values within that range, for example, 1.1, 2, 2.3, 5, and 5.9. This applies regardless of the breadth of the range. The upper and lower limits of these intervening ranges may independently be included in the smaller ranges, and are also encompassed within the invention, subject to any specifically excluded limit in the stated range. Where the stated range includes one or both of the limits, ranges excluding either or both of those included limits are also included, unless the context clearly dictates otherwise.

The terminology used herein is for the purpose of describing particular instances only and is not intended to be limiting of any embodiment. As used herein, the singular forms "a," "an" and "the" are intended to include the plural forms as well, unless the context clearly indicates otherwise. As used herein, the term "and/or" includes any and all combinations of one or more of the associated listed items.

Unless specifically stated or obvious from context, as used herein, the term "about" in reference to a number or range of numbers is understood to mean the stated number and numbers +/−10% thereof, or 10% below the lower listed limit and 10% above the higher listed limit for the values listed for a range.

Surface Functionalization with EMR

Generally, patterned regions on the surface of a structure are prepared by exposing a coated region of the surface to EMR through a patterned shadow mask. In such cases, the material coated on the surface is removed in exposed areas and not removed in the mask-protected area. As a result, the pattern of the shadow mask is transferred onto the surface chemistry of the structure. In some instances, EMR removes a material coated on a surface by cleaving the chemical bonds between the surface and the bound coating material by photolysis. In some cases, EMR is deep UV light. Without wishing to be bound by theory, in some instances, for surfaces with organic molecules bound thereto, ozone generated from deep UV light in the presence of oxygen facilitates the removal of the organic molecules from the surface. Alternatively, patterned regions on the surface of a structure are prepared by exposing a coated surface to a laser beam. In such cases, the material coated on the surface is removed in the exposed areas and not removed in the non-exposed areas. As a result, the pattern as defined by the laser exposed areas is transferred onto the surface chemistry of the structure.

In some instances, patterning results in differential functionalization of a surface, where two or more different regions of the surface are functionalized to have a chemistry different from one another. In such cases, a surface is patterned by applying a first set of molecules having a first chemistry to the surface, followed by removal of select regions of the first set of molecules via exposure to EMR through a shadow mask. The surface is subsequently coated with a second set of molecules having a second chemistry at the select regions lacking the first set of molecules. The first and second set of molecules have different affinities for binding to biopolymers, and therefore provide for a surface with a patterned coating are predetermined regions for biopolymer extension. In some cases, the biopolymer is an oligonucleic acid.

In some instances, a surface is patterned so that one or more regions is coated with an active agent and one or more regions of its surface is coated with a passive agent, wherein the active agent comprises a functional group that binds to a target molecule and the passive agent lacks a functional group capable of binding to the target molecule. In the context of surfaces for biopolymer extension, a region comprising an active agent (i.e. an active functionalization area) is one that provides support for the coupling of a first monomer in an extension reaction. In some instances, the first monomer is a phosphoramidite nucleoside an oligonucleic acid extension reaction.

Provided herein are methods where a functionalized surface is patterned by application of EMR to specific regions of the surface to selectively remove bound functionalization agent via photolytic cleavage. Cleavage of a bound agent from a surface at specific regions is achieved, in some instances, by applying EMR to the surface through a shadow mask. A shadow mask protects areas of a surface from EMR so that bound agents at those areas are not subject to photolysis by EMR. Masks are comprised of any suitable material that does not transmit EMR. In some instances, a shadow mask comprises chrome on quartz. In some instances, a shadow mask comprises chrome on high UV transmission quartz. In some instances, a shadow mask comprises a dielectric layer on high UV transmission quartz. In some instances, a shadow mask comprises a dielectric layer on High UV transmission LiF or $MgF_2$. In some instances, a pattern of a functionalization agent on a surface is defined by a pattern of a shadow mask. For example, a shadow mask comprises a plurality of openings that correspond to desired features of a surface. In such instances, dimensions of a shadow mask openings used in the functionalization methods described herein correspond to dimensions of a surface feature as described elsewhere herein.

In some instances, patterning a surface bound with a functionalization agent comprises overlaying a shadow mask onto the surface and applying EMR through open regions of the mask. In some instances, a shadow mask is positioned directly on top of a surface for patterning, minimizing exposure of unintended surface regions to applied light. In some cases, the distance between an EMR source and a shadow mask is less than about 100 mm, 10 mm, 5 mm, 1 mm, or 0.5 mm.

In various aspects, a functionalized surface is patterned by application of EMR via a laser to specific regions of the surface to selectively remove bound functionalization agent via photolytic cleavage. Cleavage of a bound agent from a surface at specific regions is achieved by beam deflection and/or by moving the sample (e.g., with an X—Y or an X—Y—Z-stage, capable of moving in two or three dimensions, respectively) and use of the laser shutter to turn laser on and off using a specific exposure time or dose in a controlled environment along the optical path of the laser and around the substrate. In some instances a substrate is introduced into a guiding system which is contained within a controlled environment. In some instances, the substrate is aligned to a reference for exposure to the laser beam and a controlled atmosphere is created at the substrate to be exposed and in the laser path. In some instances, the substrate is moved in a synchronized way with laser pulses and deflection and a pattern is thereby created on the substrate.

In some instances, exposure of a surface to EMR is performed in an oxygen controlled environment. In some cases, the environment is devoid of oxygen. Ozone generated from oxygen during EMR exposure assists with photolysis of bound agents. However, oxygen also absorbs light and therefore also reduces cleavage efficiency. Therefore, in some instances, oxygen is maintained at a controlled level, or removed, during surface patterning with EMR exposure. In some cases, oxygen is removed in the area located between the EMR source and the shadow mask.

In some instances, EMR is applied towards a surface at a wavelength from about 100 nm to about 400 nm, from about 100 nm to about 300 nm, or from about 100 nm to about 200 nm. For example, EMR is applied at an ultraviolet (UV) wavelength, or a deep UV wavelength. In some instances, deep UV light is applied to a surface at a wavelength of about 172 nm to cleave a bound agent from the surface. In some instances, EMR is applied with a xenon lamp. Exposure distance is a measurement between the lamp and the surface. In some instances, the exposure distance is about 0.1 to 5 cm. In some instances, the exposure distance is about 0.5 to 2 cm. In some instances, the exposure distance is about 0.5, 1, 2, 3, 4, or 5 cm. In some instances, EMR is applied with a laser. Exemplary lasers and their wavelengths include but are not limited to $Ar_2$ (126 nm), $Kr_2$ (146 nm), $F_2$ (157 nm), $Xe_2$ (172 and 175 nm), ArF (193 nm).

In some instances, processes described herein provide for generation of patterned surfaces with loci (sites for oligonucleic acid extension) providing a support for synthesis of oligonucleic acid populations, wherein a measurement across multiple loci show that the oligonucleic acid populations have at least about 70, 71, 72, 73, 74, 75, 76, 77, 78, 79, 80, 81, 82, 83, 84, 85, 86, 87, 88, 90, 95 or greater percent (%) uniformity, when measured by calculating amplitude of signal variation for oligonucleic acids extending from each locus divided by total signal intensity following white light illumination using an optical microscope. In some instances, uniformity is measured using a camera capable of recording white light emissions, e.g., a Nikon DS Fi2 camera. White light illumination may fall in the range of about 400 nm to about 700 nm. In some instances, the camera has sensitivity for wavelengths in the range of about 450 nm to about 620 nm. In some instances, the camera has sensitivity for wavelengths in the range of about 480 nm to about 550 nm. In some instances, the camera has sensitivity for wavelengths in the range of about 500 nm to about 530 nm. In some instances, the percent uniformity is about 77%. In some instances, the percent uniformity is at least about 75%. In some instances, the percent uniformity is about 80%. In some instances, processes described herein provide for light-based removal of at least about 80, 81, 82, 83, 84, 85, 86, 87, 88, 90, 91, 92, 93, 94, 95 or greater percent (%) of functionalization agent deposited at a preselected region following exposure to EMR.

In some instances, photolysis by EMR removes at least about 50%, 60%, 70%, 80%, 90%, 95%, 98%, 99% or virtually all of a bound agent exposed to the EMR during a surface patterning process described herein. In some instances, photolysis by EMR removes at least about 90% of a bound agent exposed to the EMR during the surface patterning process. In some instances, photolysis by EMR removes about 100% of a bound agent exposed to the EMR during the surface patterning process. Different parameters of an EMR application method are adjustable according to the requirements for cleaving the bond between a functionalization agent and a reactive group of a surface. In some instances, EMR is applied as deep UV light at an intensity between 10 and 200 mW/cm$^2$, 10 and 100 mW/cm$^2$, 10 and 50 mW/cm$^2$, or 10 and 50 mW/cm$^2$. In some instances, EMR is applied to a surface between 30 seconds and 300 seconds, 30 seconds and 240 seconds, 30 seconds and 180 seconds, 30 seconds and 120 seconds, or 30 seconds and 60 seconds.

Lamps

Provided herein are methods for functionalizing a surface with one or more chemistries in a desired pattern using electromagnetic radiation (EMR). Exemplary workflows for differentially functionalizing surfaces on structures described herein a described in the following paragraphs. A first process workflow provides for functionalization of a surface with two coating materials having different chemistries (FIG. 1). This first workflow is divided generally into the following process steps: (A) surface preparation; (B) deposition of a first set of molecules on the surface; (C) patterning by cleaving the first set of molecules from the surface at regions exposed to EMR applied by a lamp through a shadow mask; (D) removal of the cleaved first set of molecules; and (E) deposition of a second set of molecules to the regions where the first set of molecules was removed.

In the first stage of the first process workflow, a structure 100 is provided having a surface 101 comprising a layer of reactive functional groups that bind with a subsequently applied coating material. In this case, a surface 101 comprises a layer of silicon dioxide that is reactive with both a first and a second set of molecules. The surface 101 is optionally cleaned in a wet and/or dry process to remove organic contaminants. In some instances, the surface is cleaned with plasma, wherein oxygen plasma is applied to the surface. In some instances, the surface is cleaned by applying an oxidizing agent to the surface to both clean and hydroxylate the surface. An exemplary oxidizing agent is a piranha solution comprising a mixture of sulfuric acid and hydrogen peroxide.

The prepared surface 100 is deposited with a first set of molecules 102 comprising an agent reactive with the functional groups of surface 101, generating a surface bound with a layer of the first set of molecules (FIG. 1, part B). The surface is subsequently patterned by removing the first set of molecules from defined regions 103 of the surface by exposing said regions to EMR 105 (FIG. 1, part C). In some cases, the EMR is deep UV light. A shadow mask 104 is positioned over the surface so that only defined regions 103 are exposed to the EMR 105 through openings 106 in the shadow mask. The layer of first set of molecules bound to the exposed regions of the surface is cleaved from the surface and washed away with an appropriate wash solution (FIG. 1, part D). The surface is then dried in preparation for a subsequent process step.

After the surface 101 is patterned with a first set of molecules via EMR, functional groups of the surface exposed distinct regions 103 lacking the first set of molecules are reacted with a second set of molecules 107 deposited onto the surface (FIG. 1, part E). In some instances, the second set of molecules comprises an active agent having a functional group that is reactive with a nucleoside while the first set of molecules comprises a passive agent that lacks a functional group reactive with a nucleoside. Therefore, in some instances, the first process workflow exemplifies a method for patterning distinct regions of a surface for nucleoside attachment and subsequent oligonucleic acid extension from the attached nucleoside. In some instances, a distinct region of a surface comprising an active agent is a locus of the surface.

Figure 2A:
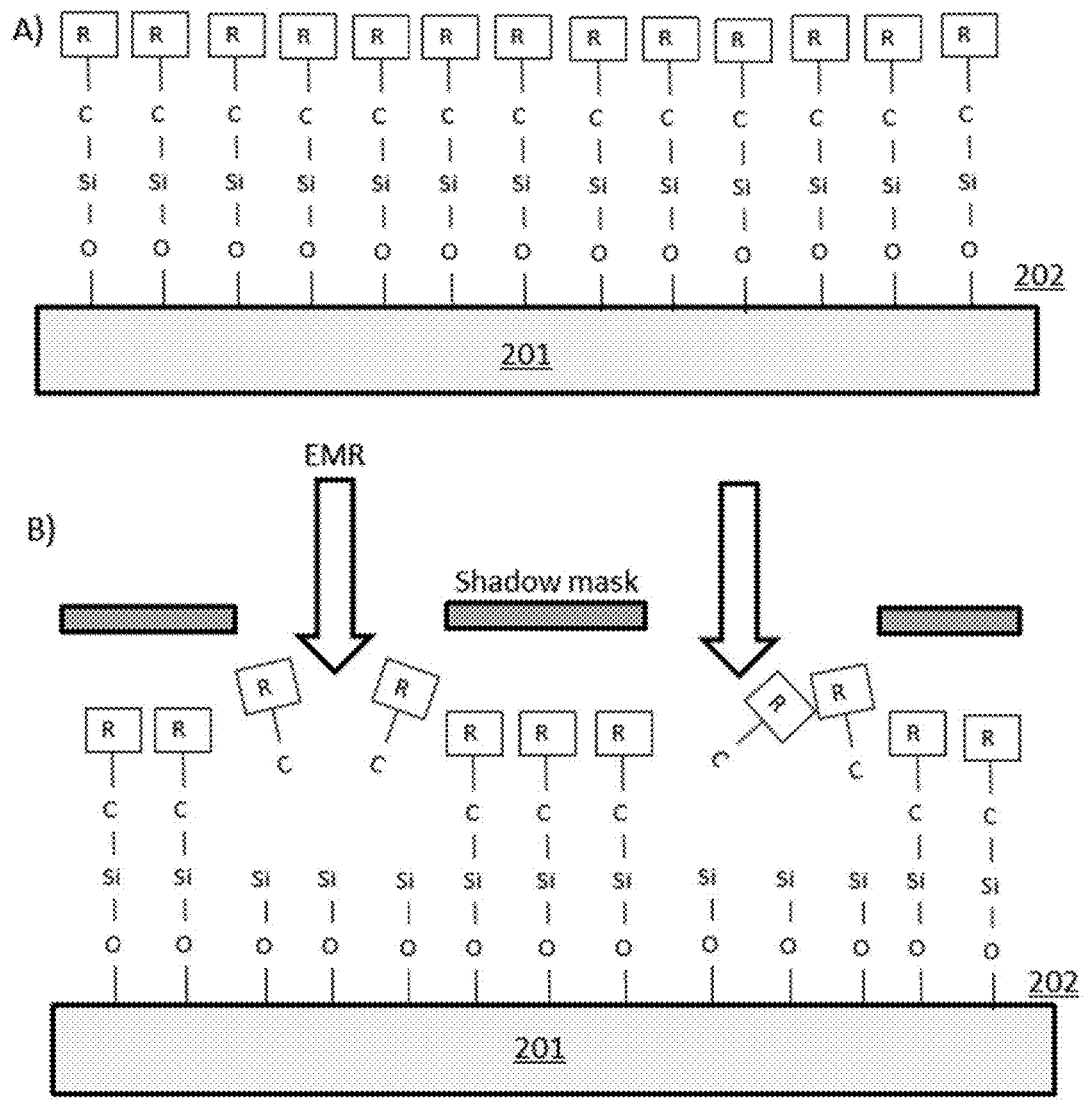
FIG. 2A depicts a detailed view of part of the process flow illustrated in FIG. 1.
Figure 2B:
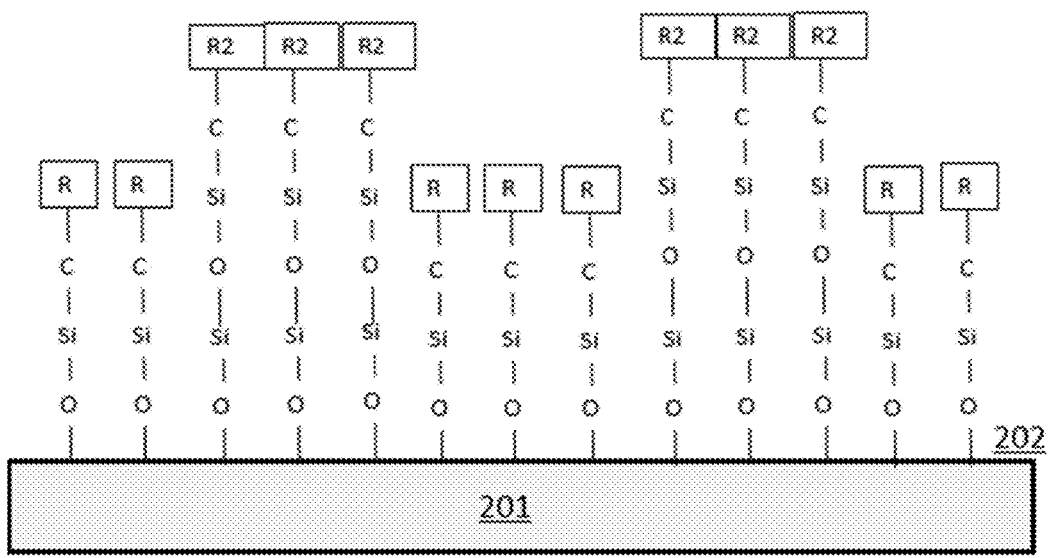
FIG. 2B depicts a detailed view of part of the process flow illustrated in FIG. 1.

In a second process workflow, a structure 201 having a surface 202 comprising a reactive layer of organo-silane (—O—Si—C) is coated with a layer of a first set of molecules, R (FIG. 2A, part A). Upon application of EMR through a patterned shadow mask, exposed first set of molecules is cleaved from the surface, as shown by the free C—R groups of FIG. 2, part B. The cleaved first set of molecules is washed away to reveal a patterned surface having functionalized regions comprising a first set of molecules (—O—Si—C—R) and exposed silicon oxide regions (—O—Si). The exposed silicon oxide regions are re-oxidized in preparation for a reaction with a second set of molecules. A layer of a second set of molecules, R2, is deposited onto the surface 201 of the structure 201 to generate regions functionalized with the second set of molecules (—O—Si—O—Si—C—R2) (FIG. 2B). In some instances, a Si—O bond is cleaved, in addition to or as an alternative to cleavage of the C—R group, and the second set of molecules is deposited onto an original reactive group of the surface (e.g., a hydroxyl, thiol, or amine group). In some instances, the first set of molecules comprises a passive agent non-reactive with a biomolecule. In some instances, the second set of molecules comprises an active agent reactive with a biomolecule.

Surfaces illustrated in FIG. 1 and FIGS. 2A-2B comprise substantially planar surfaces. In some instances, differential functionalization methods described herein are applied to surfaces comprising three-dimensional elements. Three-dimensional elements include both features raised and recessed. Example three-dimensional elements include, without limitation, wells, channels/pores, and posts. Example three-dimensional shapes include, without limitation, circles, squares, rectangles, ovals, and triangles that have a depth or a height. Example two-dimensional (or substantially planar shapes), include, without limitation, circles, squares, rectangles, ovals, and triangles.

In a third process workflow (FIG. 3), a differential functionalization method is performed on a structure comprising three-dimensional features 301. In this case, a surface comprising wells 303 layered with a first set of molecules 302, wherein the first set of molecules 304 comprises an agent that binds to reactive functional groups on the surface. A shadow mask 305 comprising openings in a pattern defining the wells of the surface is positioned over the top surface of the surface and EMR is applied through the mask 306. EMR treatment results in cleavage of the first set of molecules from the wells and the residual material is washed away to generate a surface comprising a surface coated with a layer of the first set of molecules and wells having surfaces that lack a layer of the first set of molecules 307. A second set of molecules 308 is deposited onto the surface where the material chemically reacts with the exposed reactive functional groups on the well surfaces to form a layer of the second set of molecules along the well surfaces 309. In some instances, the first set of molecules comprises a passive agent non-reactive with a biomolecule. In some instances, the second set of molecules comprises an active agent reactive with a biomolecule. In some instances, a three-dimensional surface comprises regions of active functionalization confined to the surface of the wells. In some cases, the actively functionalized wells are reactive to a nucleoside and support the attachment and synthesis of an oligonucleic acid.

Figure 3:
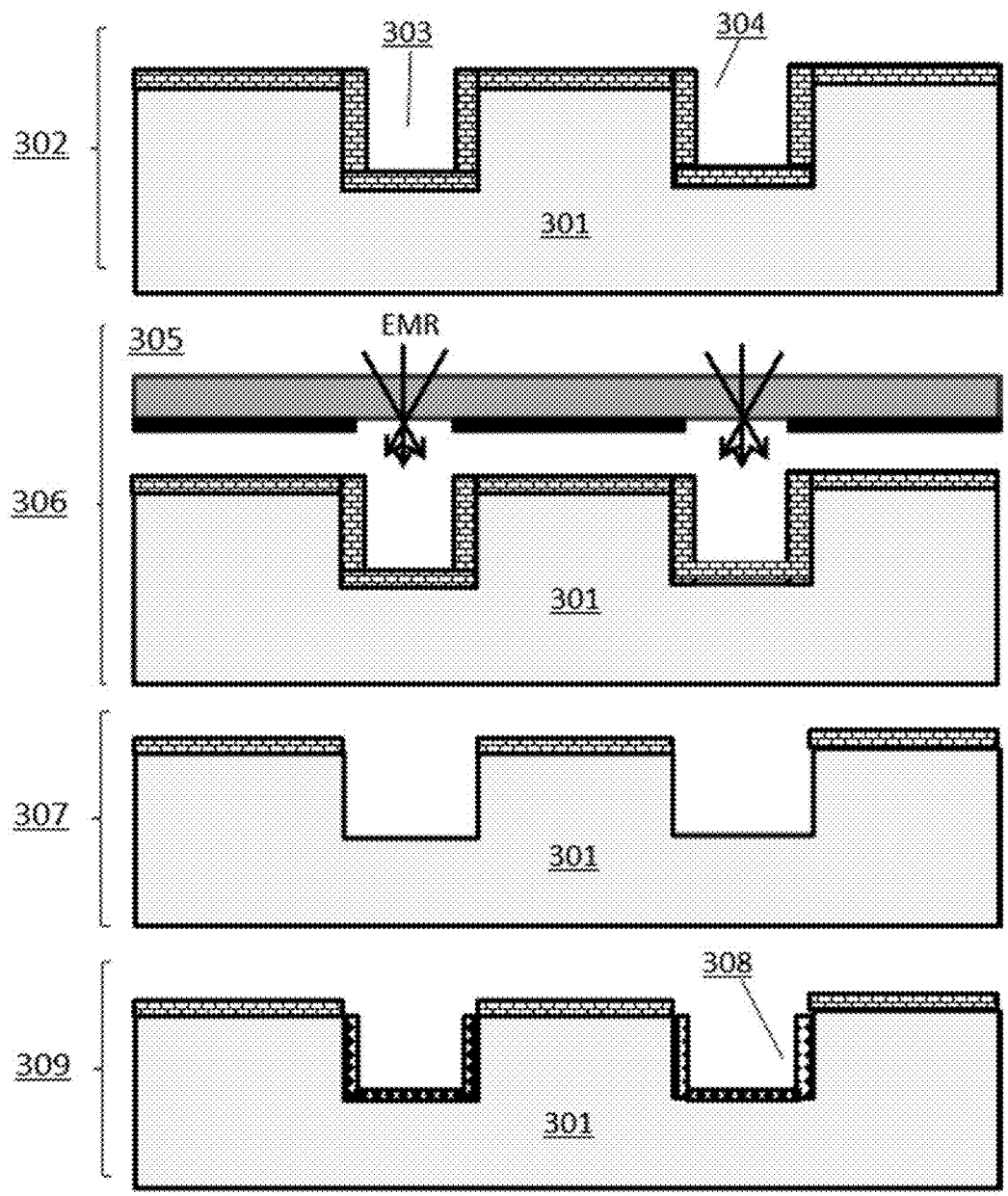
FIG. 3 depicts the process flow illustrated in FIG. 1 performed on a surface comprising wells.

In some instances, a patterning process disclosed herein comprises sequentially applying a first material comprising a passive agent to a surface, and applying a second set of molecules comprising an active agent to a surface. In some instances, a patterning process exemplified by any of FIGS. 1-3 comprises sequentially applying a first material comprising an active agent to a surface, and applying a second material comprising a passive agent to a surface. In some instances, a patterning process, as illustrated by any of FIGS. 1-3, is modified to omit application of a first or second material to a surface. For example, a first material is patterned on a surface with EMR and regions of the surface lacking the first material are modified by a chemical reaction that does not comprise deposition of a material.

In some cases, a material deposited on the surface comprises both an active and a passive agent. In some cases, both a first material and a second material comprise an active agent. In some cases, both a first material and a second material comprise a passive agent. In some instances, a material deposited on the surface comprises an active agent that is deactivated or not reactive to chemistries with a biomolecule (i.e. a non-activated, active agent).

Figure 4:
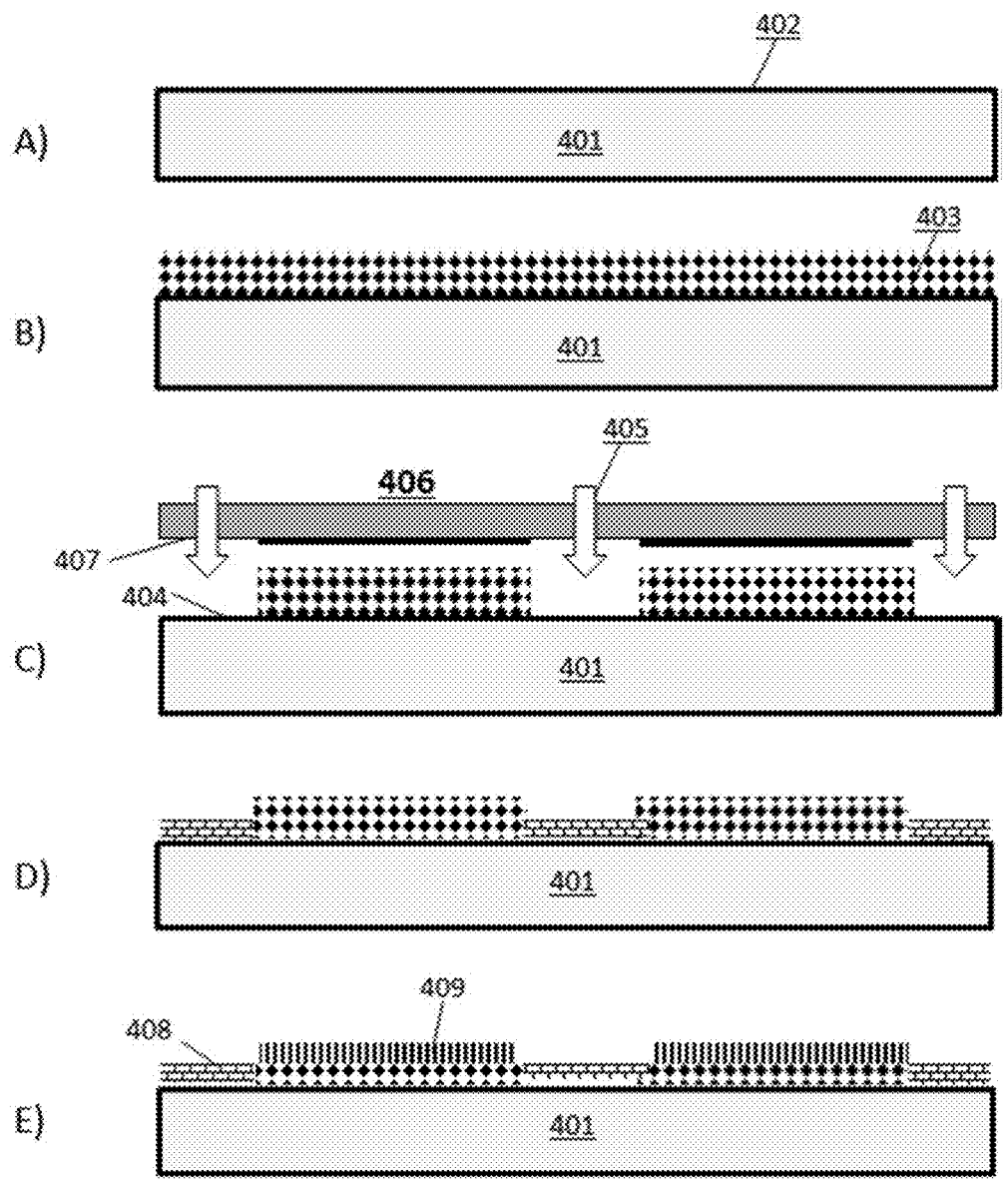
FIG. 4 depicts a schematic process flow for the functionalization of a surface with two different coating materials patterned using EMR.

In a fourth process workflow, a surface is patterned with regions of active functionalization in a method that comprises: depositing a non-activated, active agent to a surface, patterning with EMR, and activating the active agent (FIG. 4). This workflow is divided generally into the following processes: (A) surface preparation; (B) reacting a non-activated, active agent of a first set of molecules with a reactive functional group of the surface; (C) patterning the surface by cleaving the first set of molecules from the surface at regions exposed to EMR applied through a shadow mask; (D) deposition of a second set of molecules to the regions where the first set of molecules was removed; and (E) activation of the non-activated, active agent. In some implementations, one or more of the workflow processes are optional and/or modified according to the requirements of the treated surface.

In this workflow, a structure 401 comprises a surface 402. The surface 402 is optionally cleaned in a wet and/or dry process to remove organic contaminants. A first set of molecules 403 comprising a non-activated, active agent is deposited onto surface 402, where it binds with the reactive functional groups of the surface to produce a non-activated, active layer across the surface (FIG. 4, part B). The non-activated, active layer is subsequently patterned (FIG. 4, part C) by cleaving the non-activated, active layer from defined regions 404 of the surface during exposure of said regions to EMR 405. A shadow mask 406 is positioned over the surface so that the defined regions 404 are exposed to EMR 405 through openings 407 in the shadow mask. The cleaved, non-activated, active material is removed from the surface by washing, followed by a drying step (not shown). A second set of molecules 408 is deposited onto the surface to react with surface functional groups at exposed defined regions 404 to form a patterned layer of second set of molecules (FIG. 4, part D). The non-active, active agent is activated by application of an activating reagent 409 to the surface (FIG. 4, part E). In some instances, activated regions of the functionalized surface support the attachment of a nucleic acid monomer, while the remaining regions are non-reactive to nucleic acid monomer.

Figure 5:
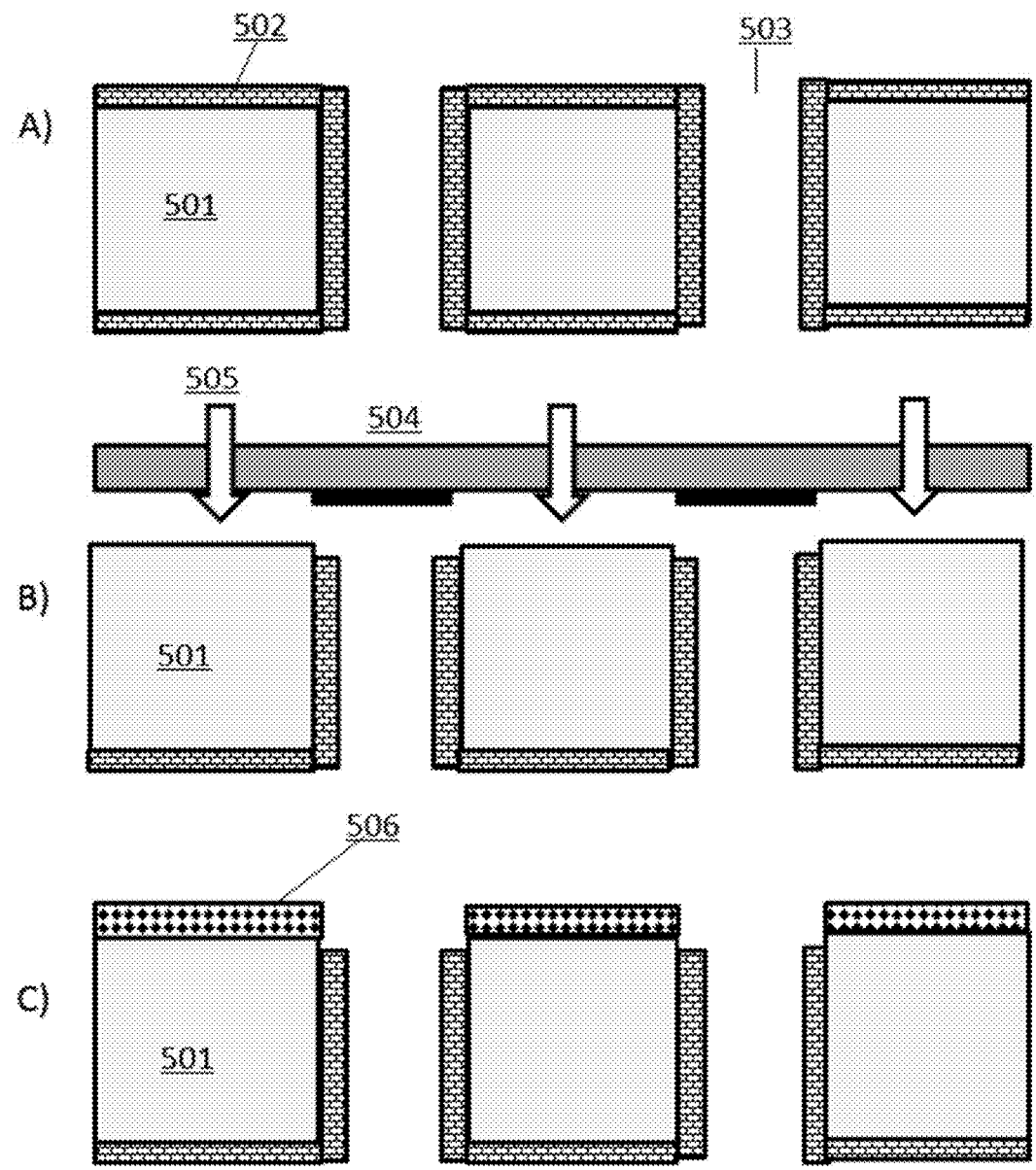
FIG. 5 depicts the process flow illustrated in FIG. 4 performed on a surface comprising channels.

In some instances, the fourth process workflow for a patterning method is applied to a surface comprising three-dimensional features. In some cases, three-dimensional features include channels 503 providing fluid communication between two or more surfaces of a structure 501. In a first step, a surface is bound with a layer of a first set of molecules 502 comprising a non-activated, active agent (FIG. 5, part A). A shadow mask 504 comprising openings in a pattern defining the features of the surface is positioned over the surface and EMR 505 is applied the mask (FIG. 5, part B). After EMR cleavage of layer of the non-activated active agent from exposed regions of the channels, the residual agent is washed away. A second set of molecules 506 is deposited onto the surface, chemically reacting with the exposed surfaces of the channels to generate a differentially functionalized surface (FIG. 5, part C). In some instances, the non-active, active agent is activated. In some instances, activated regions of the functionalized surface prepared in the manner described above support the attachment of a nucleic acid monomer to its surface, while the remaining regions are non-reactive to the nucleic acid monomers.

Figure 6:
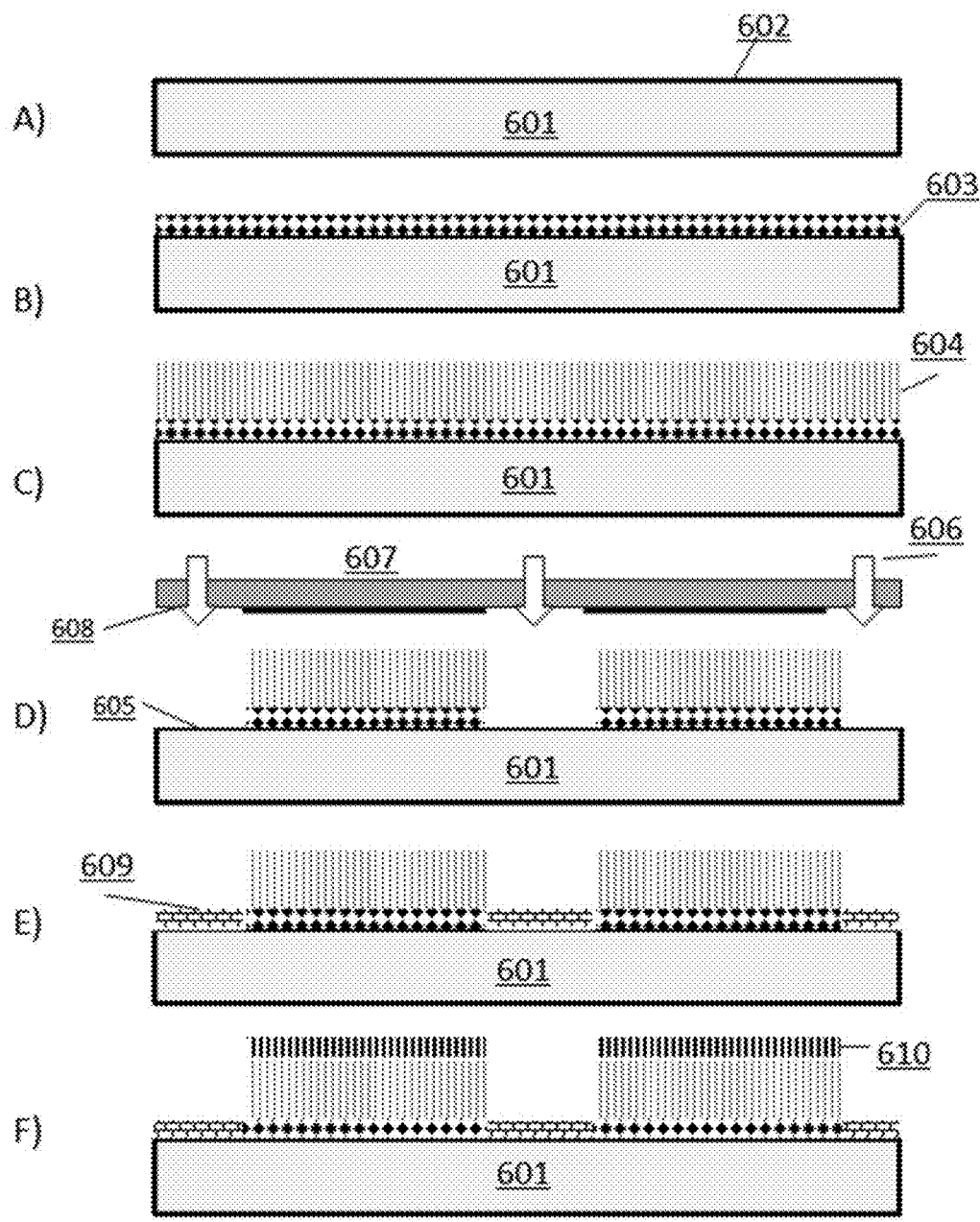
FIG. 6 depicts a schematic process flow for the functionalization of a surface with a passive and an active agent, wherein a layer of oligonucleic acids is extended from the actively functionalized surface.

In a fifth process workflow, a surface of a structure is patterned to comprise region(s) functionalized with an active agent and different region(s) functionalized with a passive agent, wherein an actively functionalized region is bound to an oligonucleic acid layer. In some cases, this oligonucleic acid layer is a platform onto which an oligonucleic acid of predetermined sequence is extended from during an oligonucleic acid synthesis reaction. In some cases, oligonucleic acids of the platform comprise from about 10 to about 100 nucleobases having a shared oligonucleic acid sequence or a plurality of different sequences. The length and identity of the oligonucleic acid platform is tunable depending on the needs of the surface and/or identity of the oligonucleic acids to be extended from said platform. This workflow is divided generally into the following processes: (A) surface preparation; (B) deposition of a first set of molecules comprising an active agent to the surface to bind with the surface; (C) extension of an oligonucleic acid platform from a layer of bound active agent; (D) patterning the surface by cleaving the active agent and oligonucleic acid platform layers from the surface at regions exposed to EMR applied through a shadow mask; (E) deposition of a second set of molecules to the regions where the active layer was removed; and (F) extension of a predetermined oligonucleic acid sequence from the platform oligonucleic acid (FIG. 6). In some implementations, one or more of the workflow processes are optional and/or modified according to the requirements of the treated surface.

Referring to FIG. 6, a structure 601 is provided comprising a surface 602. In some instances, surface 602 is prepared prior to application of a coating material by a wet or dry cleaning process. In some cases, the surface 602 is deposited with a first set of molecules comprising an active agent 603 that is reactive both with the functional groups of the surface 602 and a nucleoside. The bound active agent is reacted with a nucleobase and an oligonucleic acid layer is extended from the active agent surface to generate an oligonucleic acid platform 604. A protecting group is applied to the terminal end of the oligonucleic acid platform (not shown). The layers of active agent and oligonucleic acid platform are subsequently patterned by removing said layers from defined regions 605 of the surface via exposure to EMR 606. A shadow mask 607 is positioned over the surface so that only the defined regions 605 are exposed to EMR 606 through openings 608 in the shadow mask. The layers of active agent and platform oligonucleic acids coated on the exposed regions of the surface are cleaved from the surface and washed away with an appropriate wash solution. After the surface is patterned, surface functional groups of exposed regions 605 are reacted with a second set of molecules 609 deposited onto the surface 602, resulting in a differentially functionalized surface comprising actively functionalized regions having an oligonucleic acid platform extended therefrom. The platform oligonucleic acids are de-protected and extension of a predetermined sequence of oligonucleic acids 610 from the platform is performed.

Lasers

Provided herein are methods for surface functionalization where EMR is provided by a laser, which does not require use of a shadow mask. Generally the process steps comprise: (A) surface preparation; (B) deposition of a first set of molecules on the surface; (C) patterning by cleaving the first set of molecules from the surface at regions exposed to EMR applied by a laser; (D) removal of the cleaved first set of molecules; and, optionally, (E) deposition of a second set of molecules to the regions where the first set of molecules was removed.

A benefit of using a laser is that EMR is applied to the surface at specific locations and does not require a shadow mask. In contrast to a lamp, a shutter is used to regulate ERM exposure while the substrate structure (e.g., a plate or flexible surface) moves. In this arrangement, the speed and direction of movement for the substrate structure, in combination with the angle and position of the laser, are factors in determining surface patterning.

Figure 7A:
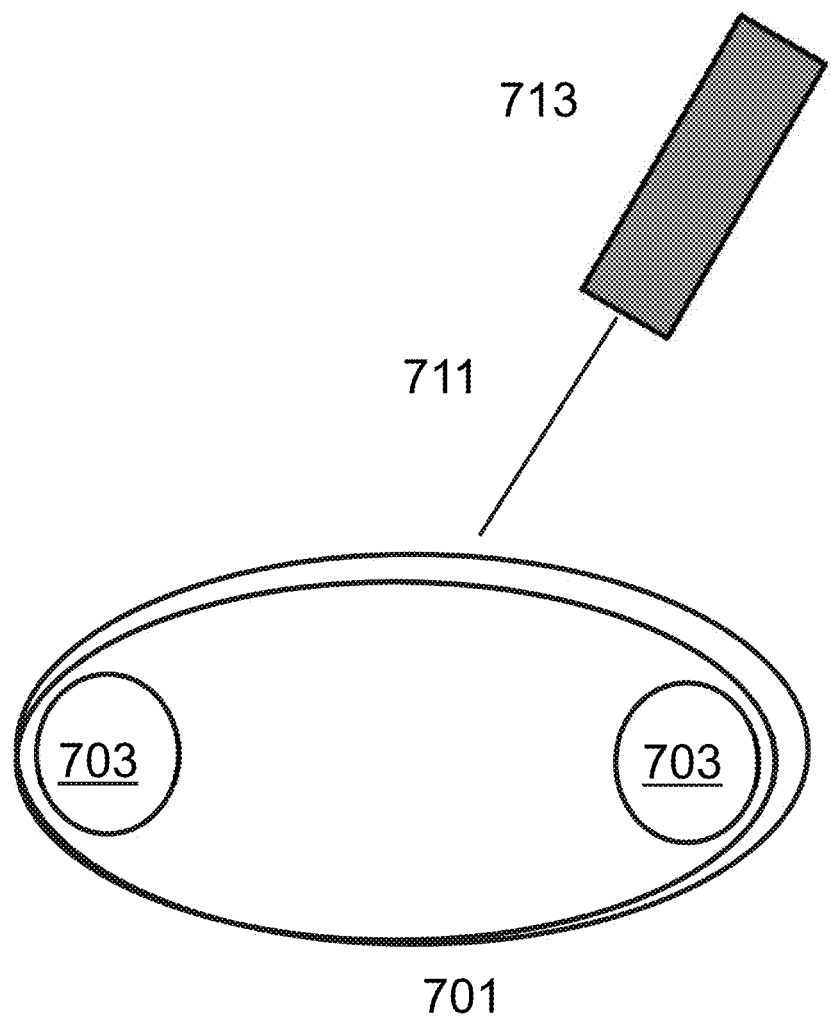
FIG. 7A shows an exemplary laser set up using a conveyer belt to move the belt for exposure to the laser in the desired regions.
Figure 7B:
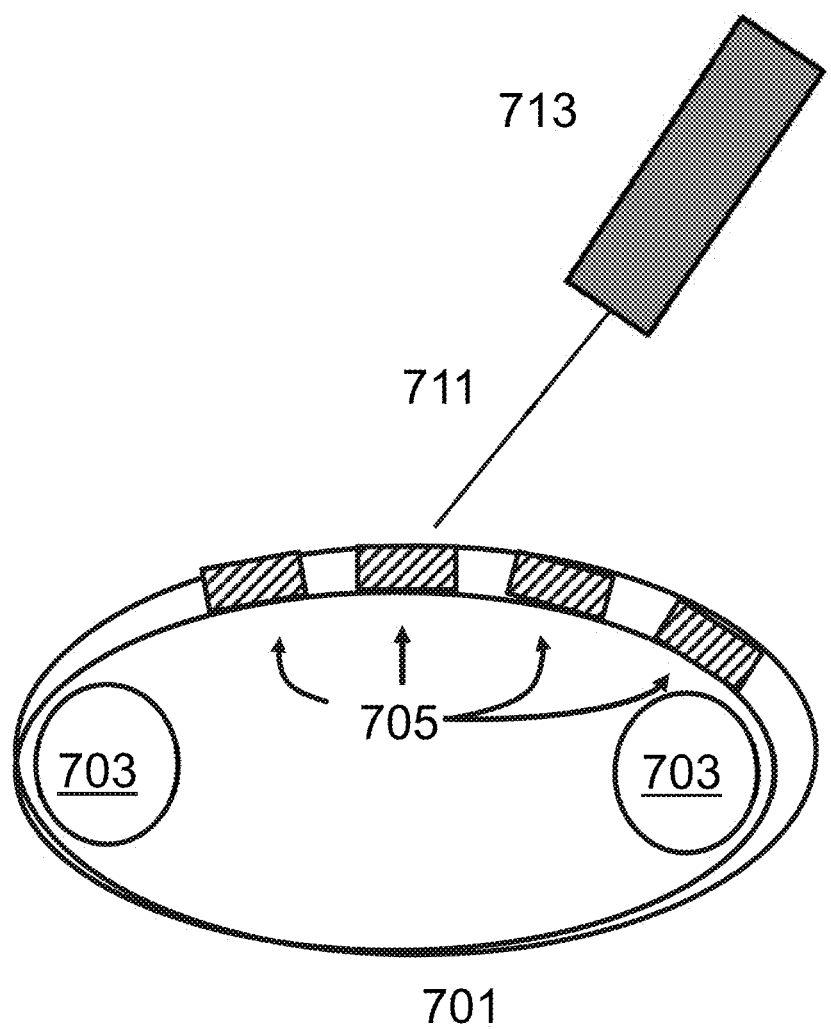
FIG. 7B shows an exemplary laser set up using a conveyer belt to move the plates for exposure to the laser in the desired regions.
Figure 7C:
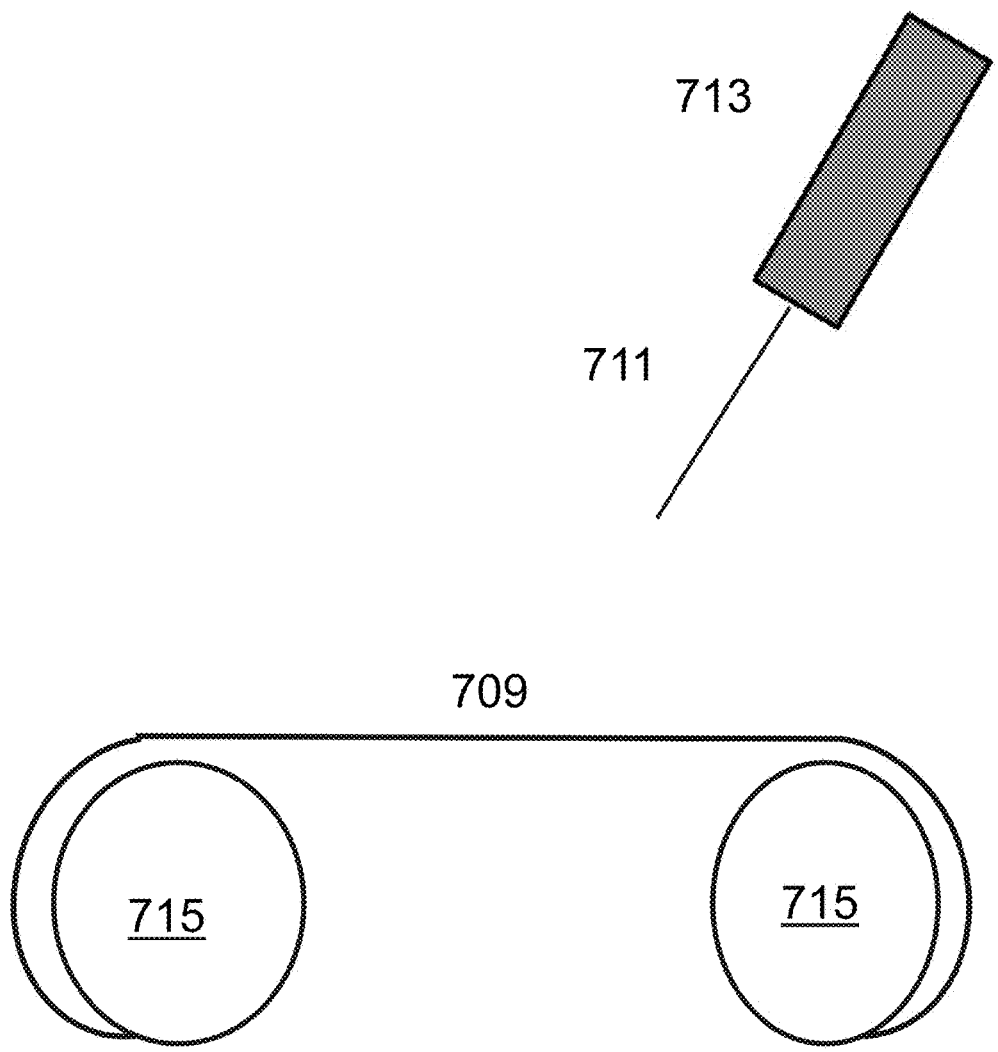
FIG. 7C shows an exemplary laser set up using a reel to reel mechanism to move the chip for exposure to the laser in the desired regions.
Figure 7D:
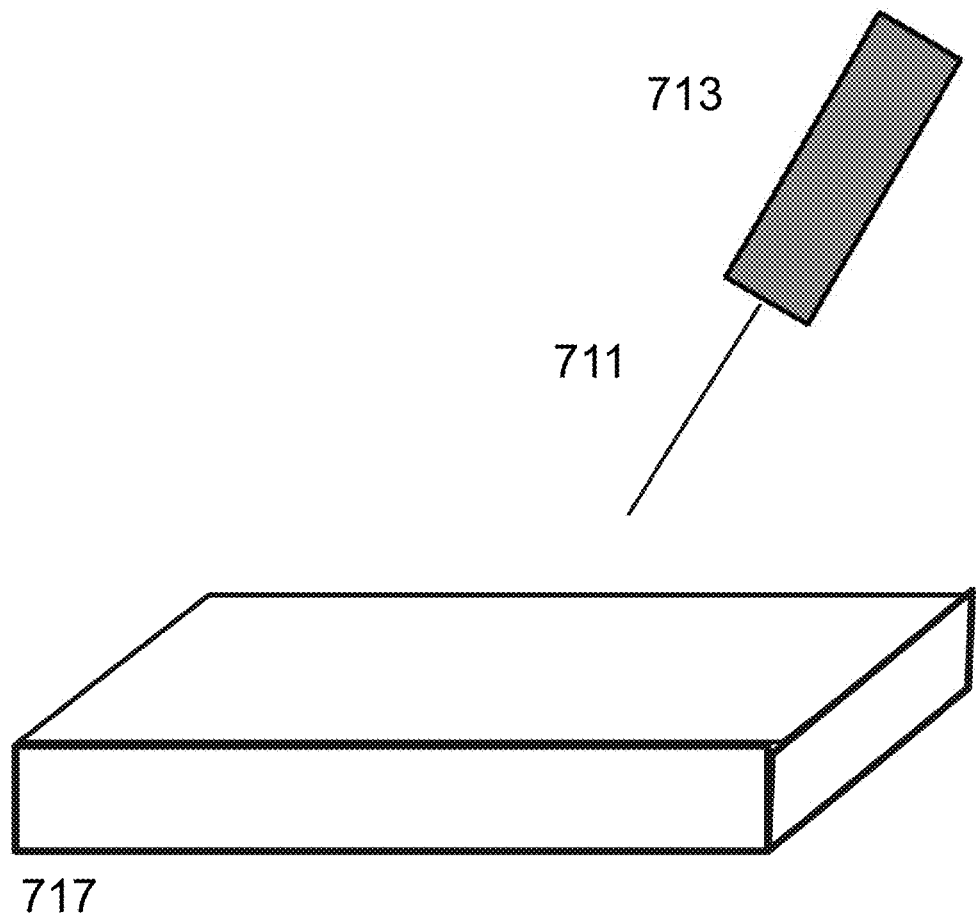
FIG. 7D shows an exemplary laser set up using a flat plate to hold the chip for exposure to the laser.

Referring to FIG. 7A, a conveyer belt 701 is provided. The conveyer belt 701 is moved using two rollers 703 at either end of the conveyer belt 701 in order to move the conveyer belt 701. The belt, or a material on the belt, has regions selected for surface patterning by light emission methods described herein. In some instances, the conveyor belt comprises nylon, or a separate layer on top of the belt comprising nylon. In some instances, a layer of passive functionalization agent described herein is first deposited on the surface of the belt. The movement of the conveyer belt 701 is coordinated with timing of a shutter in the laser emitting device 713, such that the substrate material is exposed to the laser beam 711 in the specific areas of that require EMR exposure. The cleaved molecules are removed from the surface by washing, followed by a drying step. A second set of molecules is deposited onto the surface to react with surface functional groups at exposed defined regions to form a patterned layer of second set of molecules. The second set of molecules are active functionalization agents which comprises a reactive groups capable of binding the surface and also coupling to nucleosides. In an alternative arrangement (FIG. 7B), the conveyer belt 701 comprises a rigid material, such as small plates 705, which regions preselected for surface patterning. In some instances, rigid plates are silicon. Referring to FIG. 7C, a tape 709 is moved using a reel-to-reel controller 715. In some cases, the tape is exposed to the light source in a similar manner, resulting in the tape having a chemically patterned surface. Referring to FIG. 7D, a flat surface 717 is provided (e.g., a silicon plate) for exposure to a laser beam 711 controlled by a laser emitting device 713. The laser emitting device 713 is moved in coordination with a shutter in the laser emitting device 713 such that the plate is exposed to the laser beam 711 in the specific areas of the plate. In alternative methods, a surface described herein is first treated with an active functionalization layer, followed by light based cleavage, and treatment with a passive functionalization agent. In some arrangements, to expose different locations of the plate, the laser source is either deflected or the chip is moved along X—Y or X—Y—Z axis. In some instances, the third, fourth, or fifth patterning process workflow comprises sequentially applying a first set of molecules comprising an active agent to a surface, patterning with EMR, and applying a second set of molecules comprising a passive agent to a surface. In some instances, the third, fourth, or fifth patterning process workflow comprises sequentially applying a first set of molecules comprising a passive agent to a surface, patterning with EMR, and applying a second set of molecules comprising an active agent to a surface. In some instances, the third, fourth, or fifth patterning process workflow is modified to omit application of a first or second set of molecules to a surface. In some cases, a first set of molecules and/or a second set of molecules comprise both an active and a passive agent. In some cases, both a first set of molecules and a second set of molecules comprise an active agent. In some cases, both a first set of molecules and a second set of molecules comprise a passive agent.

Exemplary active agents for inclusion in a set of molecules described herein include, without limitation, N-(3-triethoxysilylpropyl)-4-hydroxybutyramide (HAPS), 11-acetoxyundecyltriethoxysilane, n-decyltriethoxysilane, (3-aminopropyl)trimethoxysilane, (3-aminopropyl)triethoxysilane, 3-glycidoxypropyltrimethoxysilane (GOPS), 3-iodo-propyltrimethoxysilane, butyl-aldehydr-trimethoxysilane, dimeric secondary aminoalkyl siloxanes, (3-aminopropyl)-diethoxy-methylsilane, (3-aminopropyl)-dimethylethoxysilane, and (3-aminopropyl)-trimethoxysilane, (3-glycidoxypropyl)-dimethyl-ethoxysilane, glycidoxy-trimethoxysilane, (3-mercaptopropyl)-trimethoxysilane, 3-4 epoxycyclohexyl-ethyltrimethoxysilane, and (3-mercaptopropyl)-methyl-dimethoxysilane, allyl trichlorochlorosilane, 7-oct-1-enyl trichlorochlorosilane, or bis (3-trimethoxysilyl-propyl) amine. A passive agent for inclusion in a set of molecules described herein includes, without limitation, perfluorooctyltrichlorosilane; tridecafluoro-1,1,2,2-tetrahydrooctyl)trichlorosilane; tridecafluoro-1,1,2,2-tetrahydrooctyl)trimethoxysilane; 1H, 1H, 2H, 2H-fluorooctyltriethoxysilane (FOS); trichloro(1H, 1H, 2H, 2H-perfluorooctyl) silane; tert-butyl-[5-fluoro-4-(4,4,5,5-tetramethyl-1,3,2-dioxaborolan-2-yl)indol-1-yl]-dimethyl-silane; CYTOP™; Fluorinert™; perfluoroctyltrichlorosilane (PFOTCS); perfluorooctyldimethylchlorosilane (PFODCS); perfluorodecyltriethoxysilane (PFDTES); pentafluorophenyl-dimethyl-propylchloro-silane (PFPTES); perfluorooctyltriethoxysilane; perfluorooctyltrimethoxysilane; octylchlorosilane; dimethylchloro-octodecyl-silane; methyldichloro-octodecyl-silane; trichloro-octodecyl-silane; trimethyl-octodecyl-silane; triethyl-octodecyl-silane; or octadecyltrichlorosilane.

In some instances, a region of active functionalization comprises a combination of active and passive agents so that the actively functionalized region comprises a lower density of active functionalization agent than a region reacted with just an active agent. Similarly, in some instances, two or more active agents are combined to modulate the surface properties of the actively functionalized area. In some instances, an actively functionalized surface is prepared for oligonucleic acid synthesis, and by modulating the density of the active agents on a surface of a structure, the density of oligonucleic acids extending from said surface is modulated.

In any of the surfaces disclosed here, oligonucleic acid extension steps include extension of at least about 10, 25, 50, 75, 100, 125, 150, 200, 500, 1000, 2000 or more bases in length. In some instances, oligonucleic acid of about 25 bases to 2 kb, 25 bases to 150 bases, or 25 bases to 500 bases, in length are synthesized.

Microcontact Printing

Provided herein are methods for surface functionalization to directly apply an active agent and/or a passive agent to a selected surface using microcontact printing of an active agent and/or a passive agent onto the selected surface, such as a plate (e.g., a silicon plate), at the specific areas of the surface that require the active agent and/or the passive agent. Active functionalization of a surface involves microcontact printing of an active functionalization agent, or active agent, to the surface, where the agent binds to a functional group of the surface. Passive functionalization of a surface involves microcontact printing of a passive functionalization agent, or passive agent, to the surface, where the agent binds to a functional group of the surface. In some instances, an active functionalization agent binds to a reactive group on a surface and comprises a functional group that is reactive with a specific biomolecule, thereby supporting a coupling reaction to the surface. As used herein, "inking" a stamp for microcontact printing refers to depositing on a stamp an agent to be applied to a surface, such as an active agent or a passive agent as described herein. In an alternative arrangement, a similar method of microcontact printing is performed on a flexible surface, e.g., a tape or conveyor belt.

In an exemplary workflow of patterning a passive agent on a plate (e.g., a silicon plate), polydimethylsiloxane (PDMS) stamps are made using a UV photolithography process. A silicon wafer coated with photoresist is exposed to UV light through a mask, creating a pattern on the silicon wafer. The exposed wafer is then exposed to a solution of developer creating a master which is used to cast the PDMS stamp. The PDMS prepolymer is mixed with a curing agent and poured onto the prepared master. The cured stamp is then peeled from the template and is ready for inking. The finished stamp is about 100 μm to about 1 cm thick and the raised portions of the stamp range from about 1 μm to about 500 μm. In an alternative arrangement, a similar method of microcontact printing is performed on a flexible surface, e.g., a tape or conveyor belt.

Stamps are inked with a solution containing a passive agent, for example, tridecafluoro-1, 1, 2, 2-tetrahydrooctyl) trichlorosilane, or tridecafluoro-1, 1, 2, 2-tetrahydrooctyl) trimethoxysilane. After inking, the passive agent solution is transferred to a plate. Care is taken to not deform the stamp while stamping the microchip. Each inked stamp is used to pattern three microchips before reloading the stamp. Alternatively, ink is continuously applied to a patterned roller stamp and the ink is transferred from the roller to a moving belt. In an alternative arrangement, a similar method of microcontact printing is performed on a flexible surface, e.g., a tape or conveyor belt. The active agent is then deposited on the non-treated areas using CVD.

In an alternative workflow of patterning an active agent onto a silicon plate, polydimethylsiloxane (PDMS) stamps are made using a UV photolithography process. A silicon wafer coated with photoresist is exposed to UV light through a mask, creating a pattern on the silicon wafer. The exposed wafer is then exposed to a solution of developer creating a master which is used to cast the PDMS stamp. The PDMS prepolymer is mixed with a curing agent and poured onto the prepared master. The cured stamp is then peeled from the template and is ready for inking. The finished stamp is about 100 μm to about 1 cm thick and the raised portions of the stamp range from about 1 μm to about 500 μm. In an alternative arrangement, a similar method of microcontact printing is performed on a flexible surface, e.g., a tape or conveyor belt.

Stamps are inked with a solution containing an active agent, for example, 3-glycidoxypropyltrimethoxysilane (GOPS). After inking, the active agent solution is transferred to the surface of a structure. Care is taken to not deform the stamp while stamping the microchip. Each inked stamp is used to pattern three microchips before reloading the stamp. The active agent is then deposited on the non-treated areas using CVD In another workflow of patterning an active agent and a passive agent onto a silicon plate, polydimethylsiloxane (PDMS) stamps are made using a UV photolithography process. Two silicon wafers coated with photoresist are exposed to UV light through complementary masks, creating complementary patterns on each silicon wafer. The exposed wafers are then exposed to a solution of developer creating a master which is used to cast the PDMS stamps. The PDMS prepolymer is mixed with a curing agent and poured onto the prepared masters. The cured stamps are then peeled from the template and are ready for inking. The finished stamp is about 100 µm to about 1 cm thick and the raised portions of the stamp range from about 1 µm to about 500 µm.

The first stamp is inked with a solution containing an active agent, such as 3-glycidoxypropyltrimethoxysilane (GOPS). After inking, the active agent solution is transferred to a silicon plate. The second stamp is inked with a solution containing a passive agent, such as tridecafluoro-1, 1, 2, 2-tetrahydrooctyl)trichlorosilane. After inking, the passive agent solution is transferred to a silicon plate that has been printed with the active agent. Care is taken to not deform the stamps while stamping the microchip. Each inked stamp is used to pattern three microchips before reloading the stamp. In an alternative arrangement, a similar method of microcontact printing is performed on a flexible surface, e.g., a tape or conveyor belt.

Structural and Materials

Methods for controlled chemical surface patterning described herein may be applied to a variety of structures. In some instances, the structure is about the size of a standard 96 well plate, for example between about 100 and 200 mm by between about 50 and 150 mm. In some instances, a substrate has a diameter less than or equal to about 1000 mm, 500 mm, 450 mm, 400 mm, 300 mm, 250 nm, 200 mm, 150 mm, 100 mm or 50 mm. In some instances, the diameter of a structure is between about 25 mm and 1000 mm, between about 25 mm and about 800 mm, between about 25 mm and about 600 mm, between about 25 mm and about 500 mm, between about 25 mm and about 400 mm, between about 25 mm and about 300 mm, or between about 25 mm and about 200. Non-limiting examples of structure size include about 300 mm, 200 mm, 150 mm, 130 mm, 100 mm, 76 mm, 51 mm and 25 mm. In some instances, a substrate has a planar surface area of at least about 100 $mm^2$; 200 $mm^2$; 500 $mm^2$; 1,000 $mm^2$; 2,000 $mm^2$; 5,000 $mm^2$; 10,000 $mm^2$; 12,000 $mm^2$; 15,000 $mm^2$; 20,000 $mm^2$; 30,000 $mm^2$; 40,000 $mm^2$; 50,000 $mm^2$ or more. In some cases, the structure is at least about 0.1, 0.2, 0.3, 0.4, 0.5, 1, 2, 3, 4, 6, 8, 10, 16, 24, 39, 50, 100 or more feet in length in a first dimension, and at least about 0.1, 0.2, 0.3, 0.4, 0.5, 1, 2, 3, 4, 6, 8, 10, 16, 24, 39, 50, 100 or more feet in length in a second dimension. For larger structures, a material such as glass, metal or plastic may be used. In some instances, the structure for chemical surface patterning is a flexible material, such as a tape or belt.

In some instances, the thickness of a structure is between about 50 mm and about 2000 mm, between about 50 mm and about 1000 mm, between about 100 mm and about 1000 mm, between about 200 mm and about 1000 mm, or between about 250 mm and about 1000 mm. Non-limiting examples of structure thickness include about 0.1 mm, 0.2, 0.3 mm, 0.4 mm, 0.5 mm, 1 mm, 5 mm, 10 mm, 50 mm, 100 mm, 200 mm, 250 mm, 275 mm, 375 mm, 525 mm, 625 mm, 675 mm, 725 mm, 775 mm and 925 mm. In some cases, the thickness of a substrate varies with diameter and depends on the composition of the substrate. For example, a structure comprising materials other than silicon may have a different thickness than a silicon substrate of the same diameter. Structure thickness may be determined by the mechanical strength of the material used and the substrate must be thick enough to support its own weight without cracking during handling.

In some instances, a structure described herein comprises a plurality of smaller regions, for example, at least about 2, 4, 6, 8, 10, 16, 24, 39, 50, 100, 200, 250, 500, 1000, 5000, 6000, 7500, 9000, 10000, 20000, 30000, 50000, 100000, 500000, 1000000, or more regions, wherein each region may be used independently from another region. In some cases, regions of a structure are sub-fields or chips of a substrate. In some instances, reference to a substrate includes a region of a substrate.

Surfaces for patterning on a structure described herein using methods and systems described herein are fabricated from any material suitable for downstream applications of a patterned surface. As an example, a surface comprises a material resistant to chemicals and/or heat applied to the surface during a chemical reaction, for instance, an oligonucleic acid synthesis reaction. In some instances, a surface comprises a material transparent to visible and/or UV light. In some instances, a surface comprises a conductive material. In some instances, a surface comprises a flexible and/or rigid material. A rigid material includes, without limitation, glass; fused silica; silicon such as silicon dioxide or silicon nitride; metals such as gold or platinum; plastics such as polytetrafluoroethylene, polypropylene, polystyrene, polycarbonate, and any combination thereof. A rigid surface can be fabricated from a material selected from the group consisting of silicon, polystyrene, agarose, dextran, cellulosic polymers, polyacrylamides, polydimethylsiloxane (PDMS), and glass. The substrates/solid supports or the microstructures, reactors therein may be manufactured with a combination of materials listed herein or any other suitable material known in the art.

The term "flexible" is used herein to refer to a structure that is capable of being bent, folded or similarly manipulated without breakage. In some cases, a flexible surface is bent at least 30 degrees around a roller. In some cases, a flexible surface is bent at least 180 degrees around a roller. In some cases, a flexible surface is bent at least 270 degrees around a roller. In some instances, a flexible surface is bent about 360 degrees around a roller. In some cases, the roller is less than about 10 cm, 5 cm, 3 cm, 2 cm or 1 cm in radius. In some instances, the flexible surface is bent and straightened repeatedly in either direction at least 100 times without failure (for example, cracking) or deformation at 20° C. In some instances, a flexible surface described herein has a thickness that is amenable to rolling. In some cases, the thickness of the flexible surface described herein is less than about 50 mm, 10 mm, 1 mm, or 0.5 mm.

Exemplary flexible materials include, without limitation, nylon (unmodified nylon, modified nylon, clear nylon), nitrocellulose, polypropylene, polycarbonate, polyethylene, polyurethane, polystyrene, acetal, acrylic, acrylonitrile, butadiene styrene (ABS), polyester films such as polyethylene terephthalate, polymethyl methacrylate or other acrylics, polyvinyl chloride or other vinyl resin, transparent PVC foil, transparent foil for printers, Poly(methyl methacrylate) (PMMA), methacrylate copolymers, styrenic polymers, high refractive index polymers, fluorine-containing polymers, polyethersulfone, polyimides containing an alicyclic structure, rubber, fabric, metal foils, and any combination thereof. Nylon and PMAA surfaces herein, in some instances, are provided as a sheet or alternatively provided as a layer that is coated over another material, such as silicon. Various plasticizers and modifiers may be used with polymeric substrate materials to achieve selected flexibility characteristics.

Surfaces described herein may comprise a plurality of loci, discrete predetermined locations for oligonucleic acid extension. In some instances, a locus of a surface physically defines an area of the surface as a region for functionalization. In some instances, a functionalized region of a surface defines a locus of the surface. For example, regions of a surface bound with an active functionalization agent are loci of the surface. In some instances, a surface described herein comprises a plurality of clusters, wherein each cluster optionally comprises a plurality of loci. In some instances, a surface comprises a plurality of three-dimensional raised and/or lowered features, wherein a raised and/or lowered feature optionally corresponds to a cluster and/or a locus. A three-dimension feature includes, without limitation, a well, nanowell, channel, and post. In some instances, a three-dimensional feature corresponds to a cluster, wherein the three-dimensional feature optionally comprises a plurality of loci. In some instances, a surface comprises a plurality of channels corresponding to a plurality of loci within a well.

In some cases, a surface described herein is patterned by binding a functionalization agent of a set of molecules to one or more defined regions of the surface. In some cases, the surface is differentially functionalized by binding a functionalization agent of a different set of molecules to one or more regions outside of the defined regions. In some instances, an active functionalization agent is bound to and/or defines a feature of a surface, wherein the active agent is chemically reactive with a biomolecule. In some cases, the biomolecule is a nucleic acid monomer and the actively functionalized area supports nucleic acid monomer attachment and synthesis. In some cases, the reactive agent is an adhesion promoter that binds to both surface and functionalization agent. In some instances, a surface comprises a layer of a reactive agent at a thickness of at least or at least about 0.1 nm, 0.5 nm, 1 nm, 2 nm, 5 nm, 10 nm, or 25 nm. In some instances, an adhesion promoter is a chemical with a high surface energy. In some instances, a surface comprises a surface having a high surface energy and a surface having a low surface energy at different regions or features of the surface. In such instances, the proximity of features and/or area of fluid contact at a feature is controlled by the patterning arrangement of the high and low energy regions.

In some instances, a surface is functionalized by binding a functionalization agent to a reactive agent of a surface. In some instances, a surface is differentially functionalized by binding different functionalization agents to different areas of a surface. Differential functionalization refers to a process that produces two or more distinct areas on a surface, wherein at least one area has a different surface or chemical property than another area of the same surface. Such properties include, without limitation, surface energy, chemical termination, hydrophilicity, hydrophobicity, and surface concentration of a chemical moiety.

Surface functionalization is achieved by any suitable process that results in a change in a chemical property of a surface. In some instances, functionalization comprises application (e.g., deposition) of a functionalization agent to a surface, where the functionalization agent binds to a functional group on the surface. Typically, this results in the deposition of a self-assembled monolayer (SAM) of the functionalization agent. In some instances, a functionalization agent is bound to a structure at a thickness greater than about 0.5 nm, 1 nm, 2 nm, 3 nm, 5 nm, 10 nm, 20 nm, or 50 nm. In some instances, functionalization comprises deposition of a functionalization agent to a structure by any deposition technique, including, but not limiting to, chemical vapor deposition (CVD), atomic layer deposition (ALD), plasma enhanced CVD (PECVD), plasma enhanced ALD (PEALD), metal organic CVD (MOCVD), hot wire CVD (HWCVD), initiated CVD (iCVD), modified CVD (MCVD), vapor axial deposition (VAD), outside vapor deposition (OVD), physical vapor deposition (e.g., sputter deposition, evaporative deposition), and molecular layer deposition (MLD).

In some instances, a surface is functionalized at a region to be more hydrophilic or hydrophobic as compared to the region prior to functionalization or as compared to other regions of the surface. In some cases, a surface is modified to have a difference in water contact angle of greater than 90°, 85°, 80°, 75°, 70°, 65°, 60°, 55°, 50°, 45°, 40°, 35°, 30°, 25°, 20°, 15° or 10° as measured on one or more uncurved, smooth or planar equivalent surfaces. In some cases, a three-dimensional feature is modified to have a differential hydrophobicity corresponding to a difference in water contact angle that is greater than 90°, 85°, 80°, 75°, 70°, 65°, 60°, 55°, 50°, 45°, 40°, 35°, 30°, 25°, 20°, 15° or 10° as measured on uncurved, smooth or planar equivalent surfaces. Unless otherwise stated, water contact angles mentioned herein correspond to measurements performed on uncurved, smooth or planar equivalents of the surfaces in question. In some instances, a surface is differentially functionalized with a hydrophilic region and a hydrophobic region. In some cases, a hydrophilic surface is functionalized with a pattern of a hydrophobic agent. In some cases, a hydrophobic surface is functionalized with a pattern of a hydrophilic agent.

In some instances, a surface is prepared for functionalization by cleaning it to remove particulates that could interfere with surface binding to a functionalization agent. Surface cleaning includes wet and/or dry processes. In some instances, a surface is wet cleaned with a piranha solution (90% $H_2SO_4$, 10% $H_2O_2$) at an elevated temperature (e.g., 120° C.). The surface is then washed with a suitable solvent such as water, and dried (e.g., nitrogen gas). A post piranha treatment is optional, which comprises soaking the piranha treated surface in a basic solution (e.g., $NH_4OH$) followed by an aqueous wash (e.g., water). In some instances, a surface is plasma cleaned, optionally following a piranha wash and optional post piranha treatment. An example of a plasma cleaning process comprises an oxygen plasma etch.

In some instances, a surface is functionalized with an active and/or passive agent. Active functionalization of a surface involves deposition of an active functionalization agent, or active agent, to the surface, where the agent binds to a functional group of the surface. Passive functionalization of a surface involves deposition of a passive functionalization agent, or passive agent, to the surface, where the agent binds to a functional group of the surface. In some instances, an active functionalization agent binds to a reactive group on a surface and comprises a functional group that is reactive with a specific biomolecule, thereby supporting a coupling reaction to the surface. In some cases, an active functionalization agent comprises a carboxyl, thiol, or hydroxyl functional group capable of binding to a nucleoside in a coupling reaction. In some instances, a passive agent is bound at a region of a surface having high surface energy. In some instances, a passive functionalization agent binds to a reactive group on a surface, but lacks an available functional group to bind to a specific biomolecule. In cases wherein the biomolecule is a nucleoside, a passive agent does not efficiently bind to a nucleoside, thereby preventing nucleic acid attachment and synthesis. In some instances, both active and passive functionalization agents are mixed and bound to a particular region of a surface. Such a mixture provides a diluted region of active functionalization agent and therefore lowers the density of any biomolecules bound to the active agent at that particular region. In some instances, functionalization of certain surfaces, such as nylon and PMMA, allows for a one step process, which eliminates the need for deposition of a layer of active agent.

In some instances, functionalization of a surface comprises deposition of a functionalization agent to the surface, where the agent self-assembles as a layer on the surface. Non-limiting examples of self-assembly agents include n-octadecyltrichlorosilane, 11-bromo undecyltrichlorosilane, 1H,1H,2H,2H-perfluoro-decyltrichlorosilane, N-[3-(trimethoxysilyl)propyl]-ethylenediamine, (3-aminopropyl)trimethoxy-silane, (3-aminopropyl)triethoxysilane, (3-mercaptpropyl)trimethoxysilane, PEG silanes (having a trichlorosiloxane, trimethoxysiloxane, or triethoxysiloxane functional group), N-(6-aminohexyl)-3-aminopropyltrimethoxysilane, phenyltrichlorosilane, benzyltrichlorosilane, n-octadecyltrimethoxysilane, heptadecafluoro-1,1,2,2-tetrahydro-decyl-1-trimethoxy-silane, 3,3,3-trifluoropropyltrimethoxysilane, (4-chloromethyl)phenyltrimethoxysilane, 18-nonadecenyltrichlorosilane, and 2,2,2-trifluoroethyl undec-10-enoate.

In some instances, an active functionalization agent comprises a silane group that binds to a surface of a structure, while the rest of the molecule provides a distance from the surface and a free hydroxyl group at the end to which a biomolecule attaches. Non-limiting examples of silanes include N-(3-triethoxysilylpropyl)-4-hydroxybutyramide (HAPS), 11-acetoxyundecyltriethoxysilane, n-decyltriethoxysilane, (3-aminopropyl)trimethoxysilane, (3-aminopropyl)triethoxysilane, 3-glycidoxypropyltrimethoxysilane (GOPS), 3-iodo-propyltrimethoxysilane. In some instances, a silane is an amino silane. In some instances, a silane is an organofunctional alkoxysilane molecule. Non-limiting examples of organofunctional alkoxysilane molecules include butyl-aldehydr-trimethoxysilane; dimeric secondary aminoalkyl siloxanes; aminosilanes such as (3-aminopropyl)-triethoxysilane, (3-aminopropyl)-diethoxy-methylsilane, (3-aminopropyl)-dimethyl-ethoxysilane, and (3-aminopropyl)-trimethoxysilane; glycidoxysilanes such as (3-glycidoxypropyl)-dimethyl-ethoxysilane and glycidoxytrimethoxysilane; and mercaptosilanes such as (3-mercaptopropyl)-trimethoxysilane, 3-4 epoxycyclohexyl-ethyltrimethoxysilane and (3-mercaptopropyl)-methyl-dimethoxysilane. Organofunctional silanes include siloxanes such as hydroxyalkyl siloxanes, including allyl trichlorochlorosilane as a precursor for 3-hydroxypropyl and 7-oct-1-enyl trichlorochlorosilane as a precursor for 8-hydroxyoctyl; diol (dihydroxyalkyl) siloxanes including glycidyl trimethoxysilane-derived (2,3-dihydroxypropyloxy) propyl (GOPS); aminoalkyl siloxanes, including 3-aminopropyl trimethoxysilane; and dimeric secondary aminoalkyl siloxanes, including bis (3-trimethoxysilylpropyl) amine as a precursor for bis(silyloxylpropyl)amine.

In some instances, a passive functionalization agent comprises a silane group, for example, perfluorooctyltrichlorosilane, (tridecafluoro-1,1,2,2-tetrahydrooctyl)trichlorosilane, or tridecafluoro-1,1,2,2-tetrahydrooctyl)trimethoxysilane. In some instances, a passive functionalization agent comprises perfluorooctyltriethoxysilane. In some instances, a passive functionalization agent comprises perfluorooctyltrimethoxysilane. In some instances, a passive functionalization agent comprises a hydrocarbon silane, such as octadecyltrichlorosilane or similar. In some instances, a passive functionalization agent comprises a fluorosilane. In some cases, a passive functionalization agent comprises a mixture of a hydrocarbon silane and a fluorosilane. Non-limiting examples of fluorosilanes include 1H, 1H, 2H, 2H-fluorooctyltriethoxysilane (FOS), trichloro(1H, 1H, 2H, 2H-perfluorooctyl)silane, tert-Butyl-[5-fluoro-4-(4,4,5,5-tetramethyl-1,3,2-dioxaborolan-2-yl)indol-1-yl]-dimethyl-silane, CYTOP™, Fluorinert™, and precursors perfluoroctyltrichlorosilane (PFOTCS), perfluorooctyldimethylchlorosilane (PFODCS), perfluorodecyltriethoxysilane (PFDTES), and pentafluorophenyl-dimethylpropylchloro-silane (PFPTES). In some instances, a passive functionalization agent comprises an organofunctional alkoxysilane molecule. Non-limiting examples of an organofunctional alkoxysilane molecule include dimethylchloro-octodecyl-silane; methyldichloro-octodecyl-silane; trichloro-octodecyl-silane; trimethyl-octodecyl-silane; and triethyl-octodecyl-silane.

In some instances, surface functionalization molecules described herein include a cross-linking agent to allow for the coupling f two different molecular entities. Exemplary cross-linking agents include, N-hydroxysuccinimide esters (NHS esters) which react with primary amines to yield stable amide bonds, sulfo-NHS esters (which additionally contain a sulfonate (—SO3) group on the N-hydroxysuccinimide ring), imidoesters, and sulfhydryl reactive cross linkers (e.g., maleimides, haloacetyls, and pyridyl disulfides).

Surface described herein are, in some instances, patterned with a mixture of agents. In some instances, a mixture comprises at least 2, 3, 4, 5 or more different types of functionalization agents. In some cases, the ratio of the at least two types of surface functionalization agents in a mixture is about 1:1, 1:2, 1:5, 1:9, 1:10, 2:10, 3:10, 4:10, 5:10, 6:10, 7:10, 8:10, 9:10, 5:95, 1:100, 1:150, 1:200, or any other ratio to achieve a desired surface representation of two groups. In some instances, desired surface tensions, wettabilities, water contact angles, and/or contact angles for other suitable solvents are achieved by providing a surface with a suitable ratio of functionalization agents. In some instances, the agents in a mixture are chosen from suitable reactive and inert moieties, thus diluting the surface density of reactive groups to a desired level for downstream reactions. In some instances, the mixture of functionalization reagents comprises one or more reagents that bind to a biomolecule and one or more reagents that do not bind to a biomolecule. Therefore, modulation of the reagents allows for the control of the amount of biomolecule binding that occurs at a distinct area of functionalization.

In some instances, a surface is functionalized with a set of molecules comprising a mixture of silanes, under reaction conditions effective to couple the silanes to the surface, typically via reactive hydrophilic moieties present on the surface. In some instances, active functionalization areas comprise one or more different species of silanes, for example, 1, 2, 3, 4, 5, 6, 7, 8, 9, 10 or more silanes. In some cases, one of the one or more silanes is present in the functionalization composition in an amount greater than another silane. For example, a mixed silane solution having two silanes comprises a 99:1, 98:2, 97:3, 96:4, 95:5, 94:6, 93:7, 92:8, 91:9, 90:10, 89:11, 88:12, 87:13, 86:14, 85:15, 84:16, 83:17, 82:18, 81:19, 80:20, 75:25, 70:30, 65:35, 60:40, 55:45 ratio of one silane to another silane. In some instances, an active functionalization agent comprises 11-acetoxyundecyltriethoxysilane and n-decyltriethoxysilane. In some instances, an active functionalization agent comprises 11-acetoxyundecyltriethoxysilane and n-decyltriethoxysilane in a ratio from about 20:80 to about 1:99, or about 10:90 to about 2:98, or about 5:95.

In some instances, a functionalization agent is modified with a protecting group that protects the agent during a process step of a functionalization method. For example, an active agent is bound to a surface, where an oligonucleic acid platform is grown. The oligonucleic acids of the platform are protected with a trityl protecting group, rendering the oligonucleic acids unreactive during subsequent patterning process steps. The protecting group is then removed, or deprotected, to allow for continued oligonucleic acid synthesis. Exemplary protecting groups include, without limitation, acetyl, benzoyl, benzyl, β-methoxyethoxymethyl ether, dimethoxytrityl, [bis-(4-methoxyphenyl)phenylmethyl], methoxymethyl ether, methoxytrityl [(4-methoxyphenyl)diphenylmethyl, p-methoxybenzyl ether, methylthiomethyl ether, pivaloyl, tetrahydropyranyl (removed by acid), tetrahydrofuran, trityl (triphenylmethyl, removed by acid and hydrogenolysis), silyl ether (trimethylsilyl, tert-butyldimethylsilyl, tri-iso-propylsilyloxymethyl, and triisopropylsilyl ethers, methyl ethers, and ethoxyethyl ethers. Exemplary agents for removing such protecting groups are known by one of skill in the art.

In some instances, a surface described herein comprises a plurality of clusters, wells, or clusters and wells, wherein a well optionally corresponds to one or more clusters. In some instances, the diameter or width of a cluster is from about 0.05 mm to about 10 mm, from about 0.1 mm to about 10 mm, from about 0.5 mm to about 10 mm, from about 0.5 mm to about 5 mm, from about 0.5 mm to about 2 mm, from about 0.8 mm to about 2 mm, from about 1 mm to about 2 mm, from about 1 mm to about 1.5 mm, or from about 0.8 mm to about 1.5 mm. In some instances, the diameter of a cluster and/or well is about 0.5, 0.6, 0.7, 0.8, 0.9, 1, 1.1, 1.15, 1.2, 1.3, 1.4, 1.5, 1.6, 1.7, 1.8, or 2.0 mm. In some instances, the diameter or width of a cluster is less than or about 5 mm, 2, 1.5, 1 mm, 0.5 mm, 0.1 mm, or 0.05 mm. In some instances, a surface comprises a three-dimensional feature, such as a well or post, having a height from about 20 um to about 1,000 um; from about 100 um to about 1,000 um; or from about 500 um to about 1,000 um. In some cases, the height of a three-dimensional feature is less than about 1,000 um; less than about 800 um; or less than about 600 um. In some instances, the cluster is within a well. In some instances, a surface comprises a textured surface. Exemplary textured surfaces include an array of recesses (e.g., wells) or protrusions (e.g., posts) having a height or depth from the surface of about 1 to about 1000 nm, about 250 to about 1000 nm, about 250 to about 750 nm, or about 100 to about 500 nm. In some instances, each feature of the textures surface has a pitch that is about 0.5 to about 5 times the distance of the height or depth from the surface. In some instances, each feature of the textures surface has a pitch that is about 0.5 times to about twice the distance of the height or depth from the surface.

In some instances, a surface comprises a plurality of loci. The loci may correspond to defined planar areas on the surface (e.g., a circle or square), channels, or microwells. In some cases, the height or depth of a channel and/or microwell is from about 5 um to about 500 um, from about 5 um to about 200 um, from about 5 um to about 50 um, or from about 10 um to about 50 um. In some cases, the height of a channel and/or microwell is less than 100 um, less than 50 um, less than 30 um or less than 20 um. In some instances, the height or depth of a channel and/or microwell is about 1, 5, 10, 20, 30, 40, 50, 60, 70, 80, 90, 100 or more um. In some instances, the width of a locus, channel, and/or microwell is from about 1 um to about 1000 um, or about 0.1 um to about 500 um. In some instances, the width of a locus, channel, and/or microwell from about 0.5 um to about 500 um, from about 3 um to about 60 um, or from about 1 um to about 100 um. In some instances, the width of a locus is about 100 um, 80 um, 60 um, 40 um, 20 um, 10 um, 5 um, 1 um, or 0.5 um. In some instances, the width of a locus is about 0.5 to about 60 um. In some instances, the width of a locus is about 0.5 to about 20 um. In some instances, the diameter of a locus is about 0.5 to about 10 um. In some instances, the width of a locus is about 0.1, 0.5, 1, 2, 3, 4, 5, 6, 7, 8, 9, 10, 15, 20, 25, 30, or 40 um. In some instances, the width of a locus, channel, and/or microwell is less than about 100 um, 80 um, 50 um, 20 um or 10 um, or 1 um. In some instances, the distance between the center of two adjacent loci, channels, and/or microwells is from about 0.1 um to about 50 um, from about 0.1 um to about 10 um, from about 1 um to about 500 um, from about 1 um to about 100 um, or from about 5 um to about 50 um, for example, about 20 um. In some instances, the width of a locus, channel, and/or microwell is about 10 um, 20 um, 30 um, 40 um, 50 um, 60 um, 70 um, 80 um, 90 um, or 100 um. Loci described herein may be in a shape that includes, without limitation, circles, squares, rectangles, ovals, and triangles. The term "microwell" as used herein refers to a feature that holds a liquid. The predetermined regions which are exposed to a light source form areas defining a locus for nucleic acid extension. In some instances, the predetermined regions for nucleic acid extension have a perimeter that is, without limitation, a circle, oval, rectangle, a rectangle in shape.

The microchannels or microwells can have an aspect ratio of less than 1. As used herein, the term "aspect ratio," refers to the ratio of a channel's width to that channel's depth. Thus, a channel having an aspect ratio of less than 1, is deeper than it is wide, while a channel having an aspect ratio greater than 1 is wider than it is deep. In some aspects, the aspect ratio of the microchannels or microwells can be less than or equal to about 0.5, about 0.2, about 0.1, about 0.05 or less. In some instances, the aspect ratio of the microchannels or microwells can be about 0.1. In some instances, the aspect ratio of the microchannels or channels can be about 0.05. The microstructures described herein, e.g., microchannels or microwells having aspect ratios less than 1, 0.1 or 0.05, may include channels having one, two, three, four, five, six or more corners, turns, and the like. The microstructures described herein may include the aspect ratios described, e.g., less than 1, 0.1 or 0.05, with respect to all microchannels or microwells contained within a particular resolved locus, e.g., one or more intersecting channels, some of these channels, a single channel and even a portion or portions of one or more microchannels or microwells. In some instances the wells have an aspect ratio of about 1:1 to 1:15. In some instances the wells have an aspect ratio of about 1:10. In some instances the microchannels have an aspect ratio of about 1:1 to 1:15. In some instances the microchannels have an aspect ratio of about 1:10.

In some instances, a surface comprises more than about 500; 2,000; 20,000; 100,000; 4000,000; 500,000; 8,000,000; 1,000,000; 3,000,000; 5,000,000; or 10,000,000 features. In some cases, a surface comprises features at a density of at least about 1, 5, 10, 20, 50, 100, 150, 200, 300, 400 or 500 features per $mm^2$. In some instances, a surface comprises at least about 10; 500; 1,000; 5,000; 6,000; 8,000; 10,000; 15,000; 20,000; 30,000; 50,000 or more clusters. In some cases, a cluster comprises from about 1 to about 10,000 loci. In some instances, a surface comprises more than about 500;

2,000; 20,000; 100,000; 4000,000; 500,000; 8,000,000; 1,000,000; 3,000,000; 5,000,000; or 10,000,000 loci.

In various aspects, a surface comprises one or more clusters, wherein a cluster comprises a plurality of loci. In some instances, the density of loci within a cluster of a surface is at least or about 1 locus per $mm^2$, 10 loci per $mm^2$, 100 loci per $mm^2$, 500 loci per $mm^2$, 1,000 loci per $mm^2$ or more. In some cases, a surface comprises from about 10 loci per $mm^2$ to about 500 $mm^2$ or from about 50 loci per $mm^2$ to about 200 $mm^2$. In some instances, the distance between the centers of two adjacent loci within a cluster is from about 10 um to about 500 um, from about 10 um to about 200 um, or from about 10 um to about 100 um. In some cases, the distance between the centers of two adjacent loci within a cluster is less than about 200 um, 150 um, 100 um, 50 um, 20 um or 10 um. In some cases, about 40, 50, 60, 70, 80, 90, 100, 110, 120, 130, 140, 150, 160, 170, 180, 190, 200, 300, 400, 500 or more loci are located within a single cluster. In some cases, about 50 to about 500 loci are located within a single cluster. In some cases, about 100 to about 150 loci are located within a single cluster. In some cases, about 100, 110, 115, 120, 125, 130, 135, or 140 loci are located within a single cluster. In some cases, about 40, 50, 60, 70, 80, 90, 100, 110, 120, 130, 140, 150, 160, 170, 180, 190, 200, 300, 400, 500 or more channels are located within a single well. In some cases, about 50 to about 500 loci are channels are located within a single well. In some cases, about 100 to about 150 loci are channels are located within a single well. In some cases, about 100, 110, 115, 120, 125, 130, 135, or 140 channels are located within a single well.

In some instances, the density of clusters within a surface is at least or about 1 cluster per 100 $mm^2$, 1 cluster per 10 $mm^2$, 1 cluster per 1 $mm^2$, 10 clusters per 1 $mm^2$, 50 clusters per 1 $mm^2$ or more. In some instances, a surface comprises from about 1 cluster per 10 $mm^2$ to about 10 clusters per 1 $mm^2$. In some instances, the distance between the centers of two adjacent clusters is less than about 50 um, 100 um, 200 um, 500 um, 1000 um, or 2000 um or 5000 um. In some cases, the distance between the centers of two adjacent clusters is between about 50 um and about 100 um, between about 50 um and about 500 um, or between about 100 um to about 2000 um.

In some instances, a structure is about the size of a standard 96 well plate, for example, between about 100 and 200 mm by between about 50 and 150 mm. In some instances, the surface is about 140 mm by about 90 mm. In some instances, structures described herein are e over 1, 2, 5, 10, 30, 50 or more feet long in any dimension. In the case of a flexible structure, the flexible structure is optionally stored in a wound state, e.g., in a reel. In the case of a large rigid structure, e.g., greater than 1 foot in length, the rigid structure can be functionalized and stored while in a vertical or horizontal orientation.

In some instances, the surface comprises an array of wells or cluster that are in a 96 by 64 arrangement. In some instances, the pitch is about 1.125 mm in the printing direction. In some instances, a single cluster comprises about 50 to about 500 loci. In some instances, a single cluster comprises about 100 to about 200 loci. In some instances, a single cluster comprises about 100 to about 150 loci. In some instances, a single cluster comprises about 120 to 140 loci. In some instances, a single cluster comprises about 120, 121, 122, 123, 124, 125, 126, 127, 128, 129, 130, 131, 132, 133, 134, 135, 136, 137, 138, 139, or 140 loci. In some instances, a surface comprises at least 500000, 600000, 700000, 800000, 900000, or 1000000 loci.

In some instances, a structure comprises a plurality of smaller regions, for example, at least about 2, 4, 6, 8, 10, 16, 24, 39, 50, 100 or more regions, wherein each region is optionally configured for use independent of another region. In some cases, regions of a surface are sub-fields or chips of a structure. In some instances, reference to a surface includes a region of a surface. In some instances, the structure is 140 mm×90 mm.

In some instances, a surface has a planar surface area of less than about 100 $mm^2$; 200 $mm^2$; 500 $mm^2$; 1,000 $mm^2$; 5,000 $mm^2$; 10,000 $mm^2$; 20,000 $mm^2$; or 50,000 $mm^2$. In some instances, the thickness of a structure is between about 50 mm and about 2000 mm, between about 100 mm and about 1000 mm, or between about 250 mm and about 1000 mm. Non-limiting examples of structure thickness include 275 mm, 375 mm, 525 mm, 625 mm, 675 mm, 725 mm, 775 mm and 925 mm. In some cases, the thickness of a structure varies with diameter and depends on the composition of the structure. In some cases, structure thickness is determined by the mechanical strength of the material used, wherein the structure must be thick enough to support its own weight without cracking during handling.

In some instances, a surface comprises a structure to align the surface with a device during surface modification. For example, dicing marks, shadow mask alignment marks, fiducials or a combination thereof. In some instances, a surface is labeled. In some cases, a surface comprises a structure to facilitate alignment with a reagent deposition device.

In various aspects, a structure described herein comprises a three-dimensional feature prepared by an etching method. An exemplary etching method comprises: (1) oxidizing a silicon structure on a surface that will be designed with a three-dimensional feature; (2) application of photolithography to the oxidized surface to create a mask of photoresist; (3) etching at locations of the structure devoid of photoresist, in many cases, beyond the oxidized layer, to create a feature; and (4) photoresist is stripping. In some examples, deep reactive-ion etching (DRIE) is used to etch vertical side walls to a prescribed depth to generate a well. In some instances, only one side of a structure is etched to create a three-dimensional feature. In some instances, two sides, e.g., device and handle sides, of a structure is etched to create three-dimensional features. In some processes, as an alternative or supplement to etching by DRIE, a SOI structure (silicon on insulator silicon wafer) is used and the handle layer is etched down to the buried oxide, where the buried oxide serves as an etch stop. Following photolithography on a second side of a structure, the photoresist is stripped to generate a desired three-dimensional pattern.

Light Sources

Light sources described herein provide EMR for the purpose of creating a functionalized, patterned surface via photolytic cleavage. EMR emitting lamps and lasers are known by those of skill in the art and include commercially available lamps and lasers as well as custom built lamps and lasers that provide DUV light at the various wavelengths.

Lamps

Lamps described herein include those having various light source arrangements, such as cylindrical lamps, flat lamps emitting light, and flat lamps with a large plane emitting light. In some instances, cylindrical lamps have a variable distance between areas of the lamp surface and the chip surface, which in some instances, results in decreased uniformity of the DUV exposure to the chip. Cylindrical lamps disclosed herein may be mounted in a rectangular shiny (reflective) housing. In some instances, lamps disclosed herein include excimer lamps. Lamps disclosed herein emit a DUV light at wavelengths including but not limited to 126 nm, 152 nm, and 172 nm. In some instances lamps herein emit a DUV light at 172 nm.

In some instances, lamps disclosed herein comprise flat light emitting panel portion that provides an even exposure of DUV light to the target surface. In some instances, even exposure of DUV provides for a more uniform surface exposure over the chip than lamps that are not flat. In some instances, lamps disclosed herein comprise flat lamps capable of providing DUV exposure to a larger work surface, providing for larger chips or a greater number of chips to be processed simultaneously. For example, the lamp may comprise a flat light emitting surface that is 6 inches×6 inches or more. In some instances, the flat light emitting surface has a surface areas of at least 4, 16, 36, 64, 144, or more inches squared.

Lasers

Lasers described herein provide ERM via a process of optical amplification providing light having a focused light emission, allowing precise application of EMR to the functionalized surface. Useful wavelengths for lasers herein include but are not limited to 152 nm, 172 nm, and 193 nm. Exemplary lasers and their wavelengths include but are not limited to $Ar_2$ (126 nm), $Kr_2$ (146 nm), $F_2$ (157 nm), $Xe_2$ (172 and 175 nm), ArF (193 nm). Lasers used in methods described herein include excimer lasers and liquid immersion techniques. Excimer lasers herein include an $F_2$ excimer laser having a wavelength of 157 nm. In some instances, excimer lasers provide higher resolution, which is beneficial to certain applications. Liquid immersion techniques, also termed immersion lithography, enables use of optics with numerical apertures exceeding 1.0, and uses a liquid, such as ultra-pure, deionized water, to provide a refractive index above that of air.

Systems

Provided herein, in some instances, are systems for performing a surface functionalization method as described herein. In some instances, a surface functionalization system comprises a deposition device for application of one or more reagents to a surface. In some instances, a surface functionalization system comprises a device for treating a surface with a fluid, for example, a flow cell. In some instances, surface functionalization system comprises a device for moving a surface between a deposition device and a treatment device. In some instances, a surface functionalization system comprises a cleavage device comprising a source of EMR for cleaving a chemical bond at a surface and a shadow mask for positioning between the EMR source and a surface.

In some instances, surface functionalization methods described herein employ a system comprising a deposition device that deposits reagents necessary for surface functionalization. For example, active agents, passive agents, and/or wash solutions. In some instances, wherein a functionalized surface product provides a surface for oligonucleic acid synthesis, a deposition device deposits synthesis reagents. In some instances, a deposition device moves in the X—Y direction to align with a location of a surface and optionally moves in the Z direction to seal with a surface, forming a resolved reactor.

In some instances, a deposition device comprises a plurality of deposition heads, for example, from about 1 to about 50 deposition heads. In some instances, a deposition head deposits a reagent component that is different from another reagent deposited by another deposition head. In some cases, a deposition head comprises a plurality of nozzles, wherein each nozzle is optionally configured to correspond to a cluster on a surface. For example, for a surface having 256 clusters, a deposition head comprises 256 nozzles. In some cases, a nozzle deposits a reagent component that is different from another nozzle.

Further provided herein is an automated system for use with a functionalization method described herein that is capable of functionalizing one or more surfaces, comprising: a deposition device for spraying a microdroplet comprising a functionalization agent on a surface; a scanning transport for scanning the surface adjacent to the deposition device to selectively deposit the microdroplet at specified sites; a flow cell for treating the surface on which the microdroplet is deposited by exposing the surface to one or more selected fluids; a cleavage device comprising a source of EMR for cleaving a chemical bond at a surface and a shadow mask for positioning between the EMR source and a surface; and an alignment unit for aligning the surface correctly relative to the deposition device and cleavage device. In some instances, the source of EMR comprises a laser which does not require use of a shadow mask. In some instances, the system optionally comprises a treating transport for moving the surface between the deposition device and the flow cell for treatment in the flow cell, where the treating transport and said scanning transport are different elements. In other instances, the system does not comprise a treating transport.

In some instances, a deposition device deposits a functionalization agent onto a surface of a structure. In some instances, a deposition device deposits a functionalization agent to a resolved cluster, locus, well, post, and/or channel of a surface. In some cases, a deposition device deposits a drop having a diameter less than about 200 um, 100 um, or 50 um in a volume less than about 1000, 500, 100, 50, 40 or 20 pl. In some cases, a deposition device deposits between about 1 and 10000, 1 and 5000, 100 and 5000, or 1000 and 5000 droplets per second.

In some instances, during a functionalization method, a surface is positioned within or sealed within a flow cell. In some instances, a flow cell provides continuous or discontinuous flow of liquids such as those comprising reagents necessary for reactions within the surface, for example, wash solutions. In some instances, a flow cell provides continuous or discontinuous flow of a gas, such as nitrogen, for drying a surface typically through enhanced evaporation of a volatile substance. A variety of auxiliary devices are useful to improve drying and reduce residual moisture on a surface. Examples of such auxiliary drying devices include, without limitation, a vacuum source, depressurizing pump and a vacuum tank. In some cases, a surface functionalization system comprises one or more flow cells, such as 2, 3, 4, 5, 6, 7, 8, 9, 10, or 20 and one or more surfaces, such as 2, 3, 4, 5, 6, 7, 8, 9, 10 or 20. In some cases, a flow cell is configured to hold and provide reagents to a surface during one or more steps in a functionalization reaction. In some instances, a flowcell comprises a lid that slides over the top of a surface and is clamped into place to form a pressure tight seal around the edge of the surface. An adequate seal includes, without limitation, a seal that allows for about 1, 2, 3, 4, 5, 6, 7, 8, 9 or 10 atmospheres of pressure. In some cases, a flow cell lid is opened to allow for access to an application device such as a deposition device. In some cases, one or more steps of surface functionalization method are performed on a surface within a flow cell, without the transport of the surface.

In some instances, a surface functionalization system comprises one or more elements useful for downstream application of a functionalized surface. As an example, wherein a functionalized surface is prepared for oligonucleic acid synthesis support, a deposition device is configured to deposit oligonucleic acid reagents such as, nucleobases and coupling reagents.

Gene Synthesis

Figure 8:
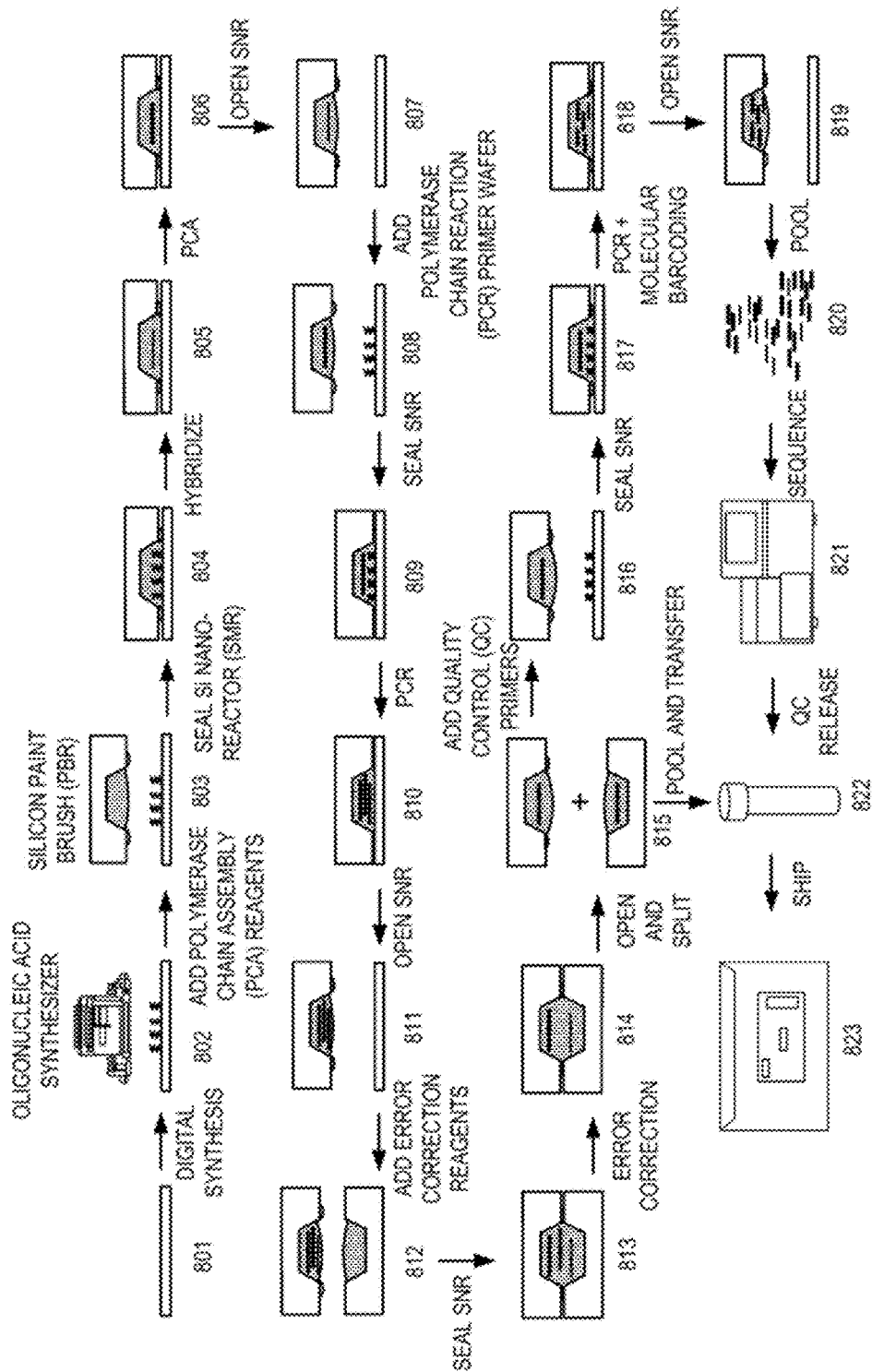
FIG. 8 illustrates a process workflow for gene synthesis on a patterned surface comprising distinct regions of active and passive functionalization. Oligonucleic acids are synthesized on actively functionalized regions of the surface, removed from the surface, assembled into a gene using polymerase chain assembly (PCA), and the assembled gene product is amplified. Errors in the gene product sequence are corrected and the corrected products amplified and processed. Amplified, corrected gene products are sequenced and released for shipment.

Provided herein are differentially functionalized surfaces configured to support the attachment and synthesis of oligonucleic acids. An example workflow is shown in FIG. 8. The workflow is divided generally into the following processes: (1) de novo synthesis of a single stranded oligonucleic acid library, (2) joining oligonucleic acids to form larger fragments, (3) error correction, (4) quality control, and (5) shipment. Prior to de novo synthesis, an intended nucleic acid sequence or group of nucleic acid sequences is preselected. For example, a group of genes is preselected for generation.

In an example workflow, a structure comprising a surface layer 801 is provided (FIG. 8). In the example, chemistry of the surface is functionalized in order to improve the oligonucleic acid synthesis process. The surface itself may be in the form of a planar surface or contain variations in shape, such as protrusions or nanowells which increase surface area. In the workflow example, high surface energy molecules selected support oligonucleic acid attachment and synthesis.

In first step of the workflow example, a device, such as an oligonucleic acid synthesizer, is designed to release reagents in a step wise fashion such that multiple oligonucleic acids extend from an actively functionalized surface region, in parallel, one residue at a time to generate oligomers with a predetermined nucleic acid sequence. In some cases, oligonucleic acids are cleaved from the surface at this stage. Cleavage includes gas cleavage, e.g., with ammonia or methylamine.

The generated oligonucleic acid libraries are placed in a reaction chamber. In this exemplary workflow, the reaction chamber (also referred to as "nanoreactor") is a silicon coated well containing PCR reagents lowered onto the oligonucleic acid library 803. Prior to or after the sealing 804 of the oligonucleic acids, a reagent is added to release the oligonucleic acids from the surface. In the exemplary workflow, the oligonucleic acids are released subsequent to sealing of the nanoreactor 805. Once released, fragments of single-stranded oligonucleic acids hybridize in order to span an entire long range sequence of DNA. Partial hybridization 805 is possible because each synthesized oligonucleic acid is designed to have a small portion overlapping with at least one other oligonucleic acid in the pool.

After hybridization, oligonucleic acids are assembled in a PCA reaction. During the polymerase cycles of the PCA reaction, the oligonucleic acids anneal to complementary fragments and gaps are filled in by a polymerase. Each cycle increases the length of various fragments randomly depending on which oligonucleic acids find each other. Complementarity amongst the fragments allows for forming a complete large span of double-stranded DNA 806.

After PCA is complete, the nanoreactor is separated from the surface 807 and positioned for interaction with a surface having primers for PCR 808. After sealing, the nanoreactor is subject to PCR 809 and the larger nucleic acids are amplified. After PCR 810, the nanochamber is opened 811, error correction reagents are added 812, the chamber is sealed 813 and an error correction reaction occurs to remove mismatched base pairs and/or strands with poor complementarity from the double-stranded PCR amplification products 814. The nanoreactor is opened and separated 815. Error corrected product is next subject to additional processing steps, such as PCR, nucleic acid sorting, and/or molecular bar coding, and then packaged 822 for shipment 823.

In some cases, quality control measures are taken. After error correction, quality control steps include, for example, interaction with a wafer having sequencing primers for amplification of the error corrected product 816, sealing the wafer to a chamber containing error corrected amplification product 817, and performing an additional round of amplification 818. The nanoreactor is opened 819 and the products are pooled 820 and sequenced 821. In some cases, nucleic acid sorting is performed prior to sequencing. After an acceptable quality control determination is made, the packaged product 822 is approved for shipment 823.

In some instances, polymerase chain reaction (PCR)-based and non-polymerase-cycling-assembly (PCA)-based strategies can be used for chemical gene synthesis. In addition, non-PCA-based chemical gene synthesis using different strategies and methods, including enzymatic gene synthesis, annealing and ligation reaction, simultaneous synthesis of two genes via a hybrid gene, shotgun ligation and co-ligation, insertion gene synthesis, gene synthesis via one strand of DNA, template-directed ligation, ligase chain reaction, microarray-mediated gene synthesis, Blue Heron solid support technology, Sloning building block technology, RNA-mediated gene assembly, the PCR-based thermodynamically balanced inside-out (TBIO), two-step total gene synthesis method that combines dual asymmetrical PCR (DA-PCR), overlap extension PCR, PCR-based two-step DNA synthesis (PTDS), successive PCR method, or any other suitable method known in the art can be used in connection with the methods and compositions described herein, for the assembly of longer polynucleotides from shorter oligonucleotides.

In some instances, methods for the synthesis of oligonucleic acids on the surfaces described herein involve an iterative sequence of the following steps: application of a protected monomer to an actively functionalized surface of a surface feature to link with either the surface, a linker or with a previously deprotected monomer; deprotection of the applied monomer so that it can react with a subsequently applied protected monomer; and application of another protected monomer for linking. One or more intermediate steps include oxidation and/or sulfurization. In some cases, one or more wash steps precede or follow one or all of the steps. In particular, a method for oligonucleic acid synthesis on a functionalized surface of this disclosure is a phosphoramidite method comprising the controlled addition of a phosphoramidite building block, i.e. nucleoside phosphoramidite, to a growing oligonucleic acid chain in a coupling step that forms a phosphite triester linkage between the phosphoramidite building block and a nucleoside bound to the surface. In some instances, the nucleoside phosphoramidite is provided to the surface activated or with an activator. In some instances, nucleoside phosphoramidites are provided to the surface in a 1.5, 2, 3, 4, 5, 6, 7, 8, 9, 10, 11, 12, 13, 14, 15, 16, 17, 18, 19, 20, 25, 30, 35, 40, 50, 60, 70, 80, 90, 100-fold excess or more over the surface-bound nucleosides. In some instances, the addition of nucleoside phosphoramidite is performed in an anhydrous environment, for example, in anhydrous acetonitrile. Following addition and linkage of a nucleoside phosphoramidite in the coupling step, the surface is optionally washed. In some instances, the coupling step is repeated one or more additional times, optionally with a wash step between nucleoside phosphoramidite additions to the surface. In some instances, an oligonucleic acid synthesis method used herein comprises 1, 2, 3 or more sequential coupling steps. Prior to coupling, in many cases, the nucleoside bound to the surface is deprotected by removal of a protecting group, where the protecting group functions to prevent polymerization. A common protecting group is 4,4'-dimethoxytrityl (DMT).

Following coupling, phosphoramidite oligonucleic acid synthesis methods optionally comprise a capping step. In a capping step, a growing oligonucleic acid is treated with a capping agent. A capping step generally serves to block unreacted surface-bound 5'-OH groups after coupling from further chain elongation, preventing the formation of oligonucleic acids with internal base deletions. In some instances, inclusion of a capping step during oligonucleic acid synthesis decreases the error rate as compared to synthesis without capping. As an example, the capping step comprises treating the surface-bound oligonucleic acid with a mixture of acetic anhydride and 1-methylimidazole. Following a capping step, the surface is optionally washed.

In one aspect, systems and methods described herein are configured to synthesize a high density of oligonucleic acids on a substrate with a low error rate. In some cases, these bases are synthesized with a total average error rate of less than about 1 in 100; 200; 300; 400; 500; 1000; 1500; 2000; 5000; 10000; 15000; 20000 bases. In some instances, these error rates are for at least 50%, 60%, 70%, 80%, 90%, 95%, 98%, 99%, 99.5%, or more of the oligonucleic acids synthesized. In some instances, these at least 90%, 95%, 98%, 99%, 99.5%, or more of the oligonucleic acids synthesized do not differ from a predetermined sequence for which they encode. In some instances, the error rate for synthesized oligonucleic acids on a substrate using the methods and systems described herein is less than about 1 in 200. In some instances, the error rate for synthesized oligonucleic acids on a substrate using the methods and systems described herein is less than about 1 in 500. In some instances, the error rate for synthesized oligonucleic acids on a substrate using the methods and systems described herein is less than about 1 in 1,000. In some instances, the error rate for synthesized oligonucleic acids on a substrate using the methods and systems described herein is less than about 1 in 1,500. In some instances, the error rate for synthesized oligonucleic acids on a substrate using the methods and systems described herein is less than about 1 in 2,000. In some instances, the error rate for synthesized oligonucleic acids on a substrate using the methods and systems described herein is less than about 1 in 3,000. In some instances, the error rate for synthesized oligonucleic acids on a substrate using the methods and systems described herein is less than about 1 in 5,000. Individual types of error rates include mismatches, deletions, insertions, and/or substitutions for the oligonucleic acids synthesized on the substrate. The term "error rate" refers to a comparison of the collective amount of synthesized oligonucleic acid to an aggregate of predetermined oligonucleic acid sequences. In some cases, synthesized oligonucleic acids disclosed herein comprise a tether of 12 to 25 bases. In some instances, the tether comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more bases.

Oligonucleic acid libraries synthesized by methods described herein may comprise at least about 100, 121, 200, 300, 400, 500, 600, 750, 1000, 5000, 6000, 15000, 20000, 30000, 40000, 50000, 60000, 75000, 100000, 200000, 300000, 400000, 500000, 600000, 700000, 750000, 1000000, 2000000, 3000000, 4000000, 5000000, or more different oligonucleic acids. The different oligonucleic acids or may be related to predetermined/preselected sequences. It is understood that the library may comprise of a plurality of different subsections, such as about 2, 3, 4, 5, 6, 7, 8, 9, 10, 12, 24 subsections or more. Compositions and methods of the invention further allow construction of the above mentioned large synthetic libraries of oligonucleic acids with low error rates described above in short time frames, such us in less than three months, two months, one month, three weeks, 15, 14, 13, 12, 11, 10, 9, 8, 7, 6, 5, 4, 3, 2 days or less. In some instances, oligonucleic acid libraries synthesized by methods described herein comprise loci, each having different oligonucleic acids than another loci, wherein each locus has a population at least about 75% uniform when measured by calculating amplitude of signal variation for oligonucleic acids extending from each locus divided by total signal intensity following white light illumination using an optical microscope.

Gene libraries synthesized by methods described herein may comprise at least about 50, 100, 200, 250, 300, 400, 500, 600, 750, 1000, 5000, 6000, 15000, 20000, 30000, 40000, 50000, 60000, 75000, 100000, 200000, 300000, 400000, 500000, 600000, 750000, 1000000, 2000000, 3000000, 4000000, 5000000, or more different genes. Compositions and methods of the invention further allow construction of the above mentioned large libraries of genes with low error rates described above in short time frames, such us in less than three months, two months, one month, three weeks, 15, 14, 13, 12, 11, 10, 9, 8, 7, 6, 5, 4, 3, 2 days or less. Genes of the above mentioned libraries may be synthesized by assembling de novo synthesized oligonucleic acids by suitable gene assembly methods further described in detail elsewhere herein or otherwise known in the art.

In some instances, following addition of a nucleoside phosphoramidite, and optionally after capping and one or more wash steps, the surface bound growing nucleic acid is oxidized. The oxidation step comprises oxidizing the phosphite triester into a tetracoordinated phosphate triester, a protected precursor of the naturally occurring phosphate diester internucleoside linkage. In some cases, oxidation of the growing oligonucleic acid is achieved by treatment with iodine and water, optionally in the presence of a weak base such as a pyridine, lutidine, or collidine. In some instances, oxidation is done under anhydrous conditions using tert-Butyl hydroperoxide or (1S)-(+)-(10-camphorsulfonyl)-oxaziridine (CSO). In some methods, a capping step is performed following oxidation. A second capping step allows for surface drying, as residual water from oxidation that may persist can inhibit subsequent coupling. Following oxidation, the surface and growing oligonucleic acid is optionally washed. In some instances, the oxidation step is substituted with a sulfurization step to obtain oligonucleotide phosphorothioates, wherein any capping steps can be performed after the sulfurization. Many reagents are capable of the efficient sulfur transfer, including, but not limited to, 3-(Dimethylaminomethylidene)amino)-3H-1,2,4-dithiazole-3-thione, DDTT, 3H-1,2-benzodithiol-3-one 1,1-dioxide, also known as Beaucage reagent, and N,N,N'N'-Tetraethylthiuram disulfide (TETD).

In order for a subsequent cycle of nucleoside incorporation to occur through coupling, a protected 5' end of the surface bound growing oligonucleic acid must be removed so that the primary hydroxyl group can react with a next nucleoside phosphoramidite. In some instances, the protecting group is DMT and deblocking occurs with trichloroacetic acid in dichloromethane.

In some cases, following oligonucleic acid synthesis, oligonucleic acids are released from their bound surface and pooled. In some instances, the pooled oligonucleic acids are assembled into a larger nucleic acid, such as a gene. In some instances, larger oligonucleic acids are generated through ligation reactions to join the synthesized oligonucleic acids. One example of a ligation reaction is polymerase chain assembly (PCA).

In some instances, a surface is functionalized with a hydrophobic set of molecules, where the hydrophobic set of molecules is configured to hold an extracted oligonucleic acid molecule. In some cases, a hydrophobic feature corresponds to a well, and an oligonucleic acid molecule is held in the feature during an assembly process, for example, during PCA. In some cases, a hydrophobic feature corresponds to a well and an assembled oligonucleic acid is stored within the well.

In some instances, error correction is performed on synthesized oligonucleic acids and/or assembled products. An example strategy for error correction involves site-directed mutagenesis by overlap extension PCR to correct errors, which is optionally coupled with two or more rounds of cloning and sequencing. In certain instances, double-stranded nucleic acids with mismatches, bulges and small loops, chemically altered bases and/or other heteroduplexes are selectively removed from populations of correctly synthesized nucleic acids. In some instances, error correction is performed using proteins/enzymes that recognize and bind to or next to mismatched or unpaired bases within double-stranded nucleic acids to create a single or double-strand break or to initiate a strand transfer transposition event. Non-limiting examples of proteins/enzymes for error correction include endonucleases (T7 Endonuclease I, *E. coli* Endonuclease V, T4 Endonuclease VII, mung bean nuclease, Cell, *E. coli* Endonuclease IV, UVDE), restriction enzymes, glycosylases, ribonucleases, mismatch repair enzymes, resolvases, helicases, ligases, antibodies specific for mismatches, and their variants. Examples of specific error correction enzymes include T4 endonuclease 7, T7 endonuclease 1, S1, mung bean endonuclease, MutY, MutS, MutH, MutL, cleavase, CELI, and HINF1. In some cases, DNA mismatch-binding protein MutS (*Thermus aquaticus*) is used to remove failure products from a population of synthesized products. In some instances, error correction is performed using the enzyme Correctase. In some cases, error correction is performed using SURVEYOR endonuclease (Transgenomic), a mismatch-specific DNA endonuclease that scans for known and unknown mutations and polymorphisms for heteroduplex DNA.

Computer Systems

In various aspects, any of the systems described herein are operably linked to a computer and are optionally automated through a computer either locally or remotely. In various instances, the methods and systems of the invention further comprise software programs on computer systems and use thereof. Accordingly, computerized control for the synchronization of the dispense/vacuum/refill functions such as orchestrating and synchronizing the material deposition device movement, dispense action and vacuum actuation are within the bounds of the invention. In some instances, the computer systems are programmed to interface between the user specified base sequence and the position of a material deposition device to deliver the correct reagents to specified regions of the surface.

Figure 9:
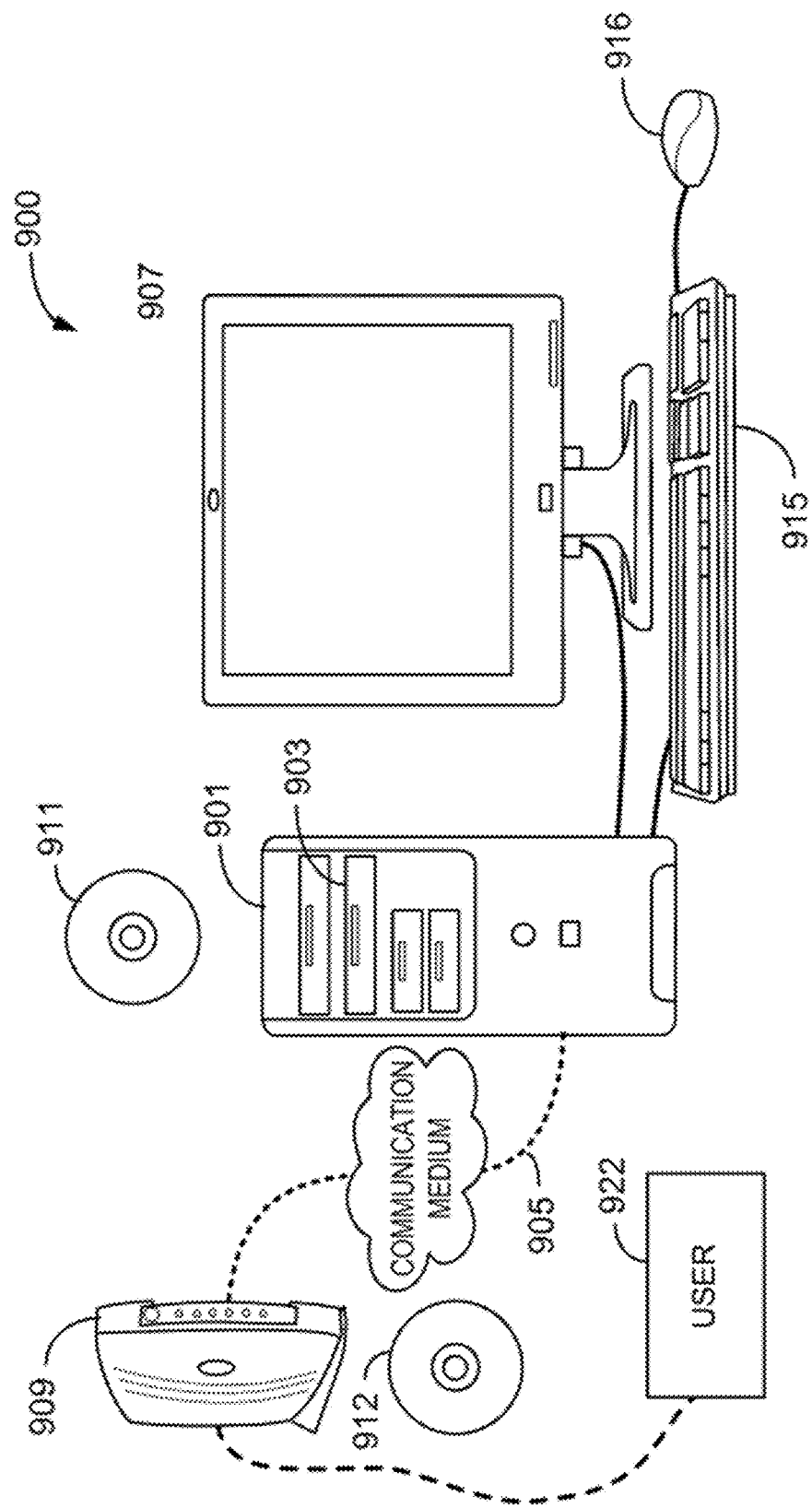
FIG. 9 illustrates a computer system.

The computer system 900 illustrated in FIG. 9 may be understood as a logical apparatus that can read instructions from media 911 and/or a network port 905, which can optionally be connected to server 909 having fixed media 912. The system, such as shown in FIG. 9 can include a CPU 901, disk drives 903, optional input devices such as keyboard 915 and/or mouse 916 and optional monitor 907. Data communication can be achieved through the indicated communication medium to a server at a local or a remote location. The communication medium can include any means of transmitting and/or receiving data. For example, the communication medium can be a network connection, a wireless connection or an internet connection. Such a connection can provide for communication over the World Wide Web. It is envisioned that data relating to the present disclosure can be transmitted over such networks or connections for reception and/or review by a party 922 as illustrated in FIG. 9.

Figure 10:
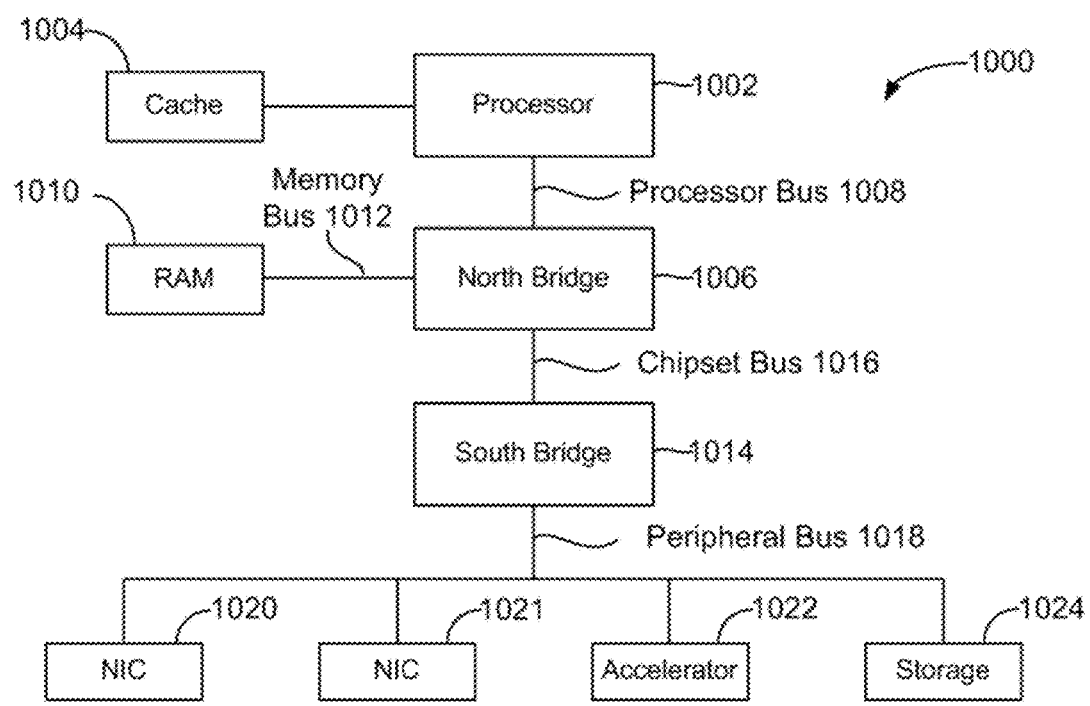
FIG. 10 illustrates is a block diagram for architecture of a computer system.

FIG. 10 is a block diagram illustrating a first example architecture of a computer system 1000 that can be used in connection with example instances of the present invention. As depicted in FIG. 10, the example computer system can include a processor 1002 for processing instructions. Non-limiting examples of processors include: Intel Xeon™ processor, AMD Opteron™ processor, Samsung 32-bit RISC ARM 1176JZ(F)-S v1.0™ processor, ARM Cortex-A8 Samsung S5PC100™ processor, ARM Cortex-A8 Apple A4™ processor, Marvell PXA 930™ processor, or a functionally-equivalent processor. Multiple threads of execution can be used for parallel processing. In some instances, multiple processors or processors with multiple cores can also be used, whether in a single computer system, in a cluster, or distributed across systems over a network comprising a plurality of computers, cell phones, and/or personal data assistant devices.

As illustrated in FIG. 10, a high speed cache 1004 can be connected to, or incorporated in, the processor 1002 to provide a high speed memory for instructions or data that have been recently, or are frequently, used by processor 1002. The processor 1002 is connected to a north bridge 1006 by a processor bus 1008. The north bridge 906 is connected to random access memory (RAM) 1010 by a memory bus 1012 and manages access to the RAM 1010 by the processor 902. The north bridge 1006 is also connected to a south bridge 1014 by a chipset bus 1016. The south bridge 1014 is, in turn, connected to a peripheral bus 1018. The peripheral bus can be, for example, PCI, PCI-X, PCI Express, or other peripheral bus. The north bridge and south bridge are often referred to as a processor chipset and manage data transfer between the processor, RAM, and peripheral components on the peripheral bus 1018. In some alternative architectures, the functionality of the north bridge can be incorporated into the processor instead of using a separate north bridge chip.

In some instances, the system 1000 includes an accelerator card 1022 attached to the peripheral bus 1018. The accelerator can include field programmable gate arrays (FPGAs) or other hardware for accelerating certain processing. For example, an accelerator can be used for adaptive data restructuring or to evaluate algebraic expressions used in extended set processing.

Software and data are stored in external storage 1024 and can be loaded into RAM 1010 and/or cache 1004 for use by the processor. The system 1000 includes an operating system for managing system resources; non-limiting examples of operating systems include: Linux, Windows™, MACOS™, BlackBerry OS™, iOS™, and other functionally-equivalent operating systems, as well as application software running on top of the operating system for managing data storage and optimization in accordance with example instances of the present invention.

In this example, the system 1000 also includes network interface cards (NICs) 1020 and 921 connected to the peripheral bus for providing network interfaces to external storage, such as Network Attached Storage (NAS) and other computer systems that can be used for distributed parallel processing.

Figure 11:
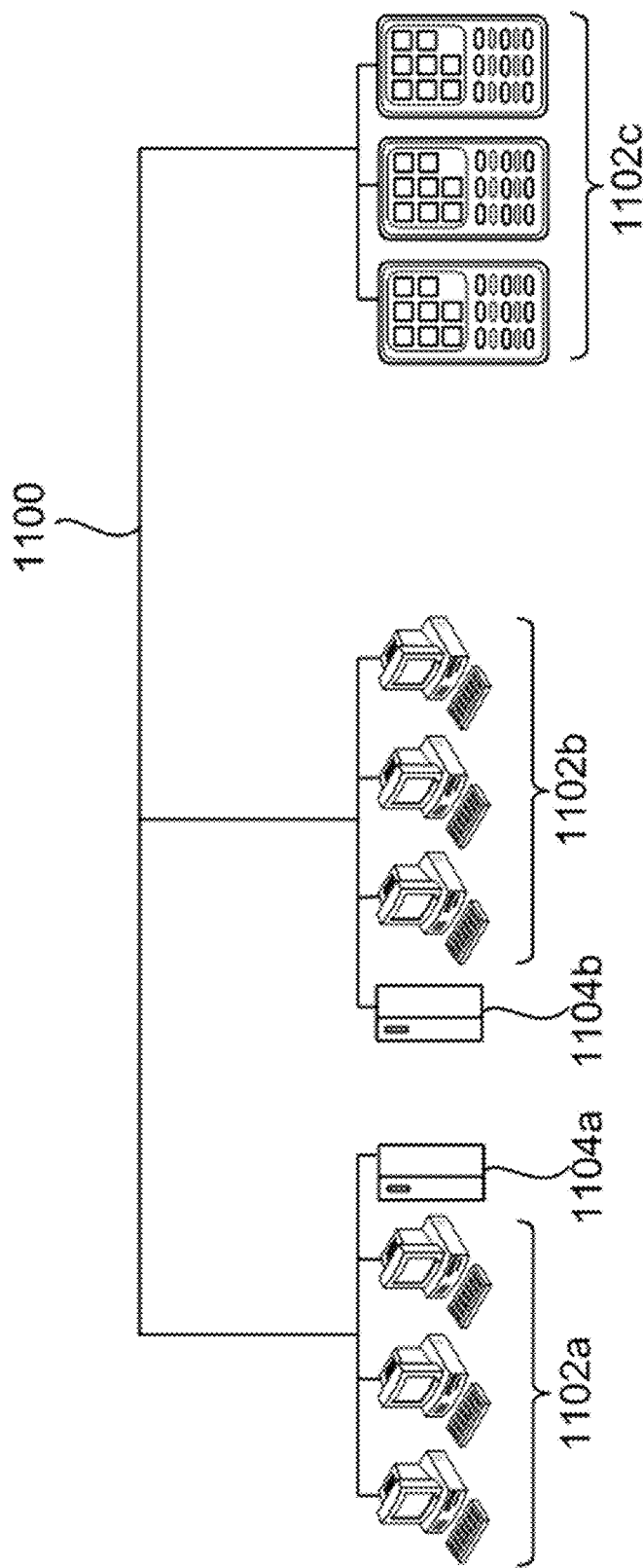
FIG. 11 is a diagram demonstrating a network configured to incorporate a plurality of computer systems, a plurality of cell phones and personal data assistants, and Network Attached Storage (NAS).

FIG. 11 is a diagram showing a network 1100 with a plurality of computer systems 1102a, and 1102b, a plurality of cell phones and personal data assistants 1102c, and Network Attached Storage (NAS) 1104a, and 1104b. In example instances, systems 1102a, 1102b, and 1102c can manage data storage and optimize data access for data stored in Network Attached Storage (NAS) 1104a and 1104b. A mathematical model can be used for the data and be evaluated using distributed parallel processing across computer systems 1102a, and 1102b, and cell phone and personal data assistant systems 1102c. Computer systems 1102a, and 1102b, and cell phone and personal data assistant systems 1102c can also provide parallel processing for adaptive data restructuring of the data stored in Network Attached Storage (NAS) 1104a and 1104b. FIG. 11 illustrates an example only, and a wide variety of other computer architectures and systems can be used in conjunction with the various instances of the present invention. For example, a blade server can be used to provide parallel processing. Processor blades can be connected through a back plane to provide parallel processing. Storage can also be connected to the back plane or as Network Attached Storage (NAS) through a separate network interface.

In some example instances, processors can maintain separate memory spaces and transmit data through network interfaces, back plane or other connectors for parallel processing by other processors. In other instances, some or all of the processors can use a shared virtual address memory space.

Figure 12:
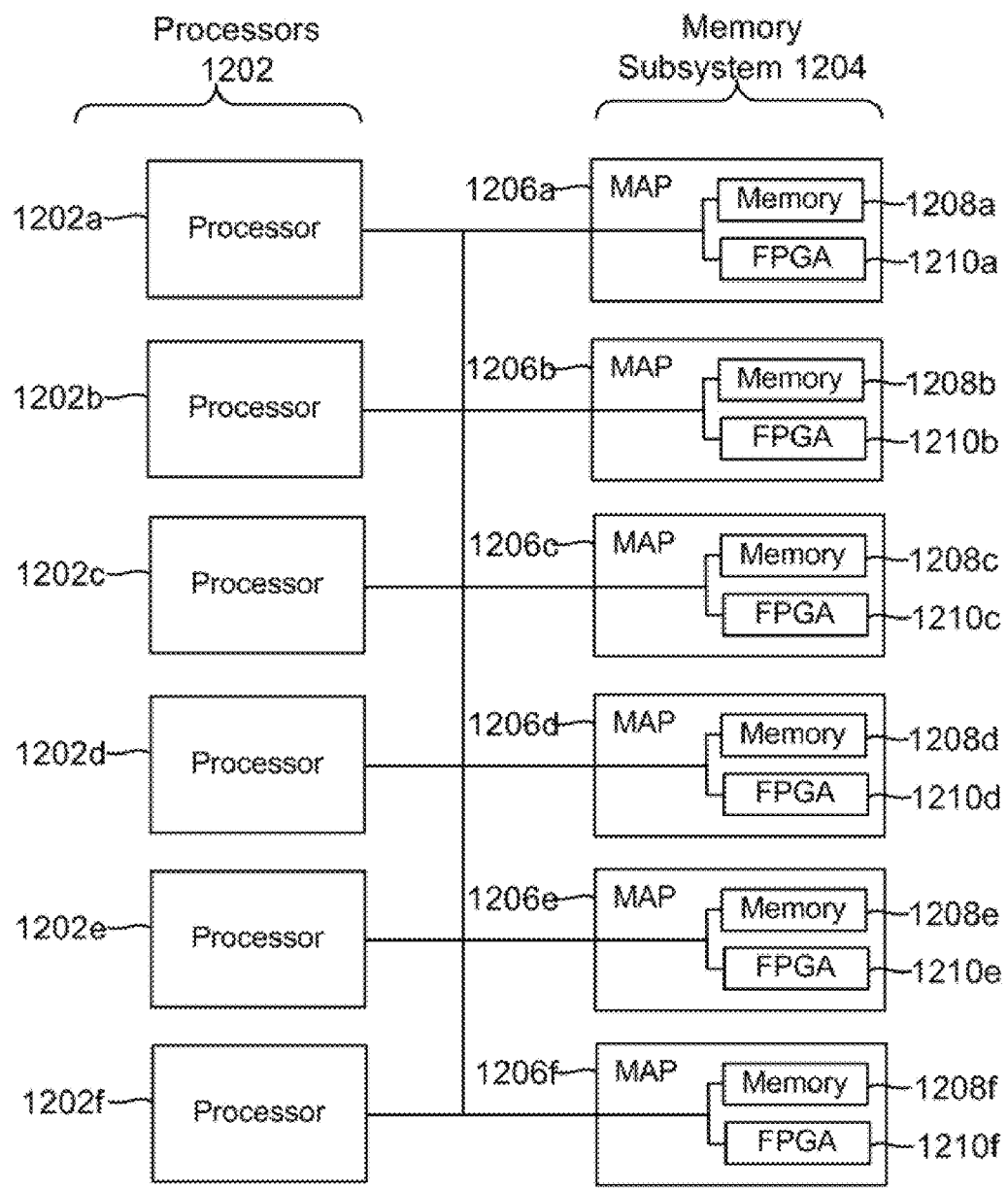
FIG. 12 is a block diagram of a multiprocessor computer system using a shared virtual address memory space.

FIG. 12 is a block diagram of a multiprocessor computer system 1200 using a shared virtual address memory space in accordance with an example embodiment. The system includes a plurality of processors 1202a-f that can access a shared memory subsystem 1204. The system incorporates a plurality of programmable hardware memory algorithm processors (MAPs) 1206a-f in the memory subsystem 1204. Each MAP 1206a-f can comprise a memory 1208a-f and one or more field programmable gate arrays (FPGAs) 1210a-f. The MAP provides a configurable functional unit and particular algorithms or portions of algorithms can be provided to the FPGAs 1210a-f for processing in close coordination with a respective processor. For example, the MAPs can be used to evaluate algebraic expressions regarding the data model and to perform adaptive data restructuring in example instances. In this example, each MAP is globally accessible by all of the processors for these purposes. In one configuration, each MAP can use Direct Memory Access (DMA) to access an associated memory 1208a-f, allowing it to execute tasks independently of, and asynchronously from, the respective microprocessor 1202a-1202f. In this configuration, a MAP can feed results directly to another MAP for pipelining and parallel execution of algorithms.

The above computer architectures and systems are examples only, and a wide variety of other computer, cell phone, and personal data assistant architectures and systems can be used in connection with example instances, including systems using any combination of general processors, co-processors, FPGAs and other programmable logic devices, system on chips (SOCs), application specific integrated circuits (ASICs), and other processing and logic elements. In some instances, all or part of the computer system can be implemented in software or hardware. Any variety of data storage media can be used in connection with example instances, including random access memory, hard drives, flash memory, tape drives, disk arrays, Network Attached Storage (NAS) and other local or distributed data storage devices and systems.

In example instances, the computer system can be implemented using software modules executing on any of the above or other computer architectures and systems. In other instances, the functions of the system can be implemented partially or completely in firmware, programmable logic devices such as field programmable gate arrays (FPGAs) as referenced in FIG. 12, system on chips (SOCs), application specific integrated circuits (ASICs), or other processing and logic elements. For example, the Set Processor and Optimizer can be implemented with hardware acceleration through the use of a hardware accelerator card, such as accelerator card 922 illustrated in FIG. 9.

The following examples are set forth to illustrate more clearly the principle and practice of instances disclosed herein to those skilled in the art and are not to be construed as limiting the scope of any claimed instances. Unless otherwise stated, all parts and percentages are on a weight basis.

EXAMPLES

Example 1: Differential Functionalization of a Surface

A structure comprising a 1000 Å layer of silicon dioxide on its top surface was differentially functionalized using a first set of molecules comprising a passive agent (an agent that lacks a reactive group for nucleoside coupling) and a second set of molecules comprising an active agent (an agent that includes an reactive group for nucleoside coupling). The top surface of the structure was coated with the first set of molecules comprising (tridecafluoro-1, 1, 2, 2-tetrahydrooctyl)trichlorosilane using a YES-1224P vapor deposition oven system (Yield Engineering Systems) with the following parameters: 1 torr, 60 min, 70° C. vaporizer. The thickness of the first coated layer was measured using an ellipsometer (J. A. Woollam) to be about 8 Å. The contact angle was measured to be about 115 degrees using a Kruss GmbH instrument.

The passively coated surface was patterned by application of deep ultraviolet (DUV) light to the top surface of the surface through a quartz mask with chrome patterns, where the mask was positioned on top of the structure so that only distinct regions of the top surface of the surface were exposed to the DUV light. DUV light was applied using a Hamamatsu L12530 EX-mini Compact Excimer Lamp Light Source for a total of 60 seconds. The excimer lamp delivers 50 mW/cm$^2$ power at 172 nm wavelength sufficient to cleave the fluoro-silane passive layer from the exposed region of the silicon surface. The contact angle was measured as before and was less than 10 degrees. Water was applied to the structure and only exposed areas were wetted, while the original fluoropolymer areas not exposed to deep UV light repelled the water.

Figure 13:
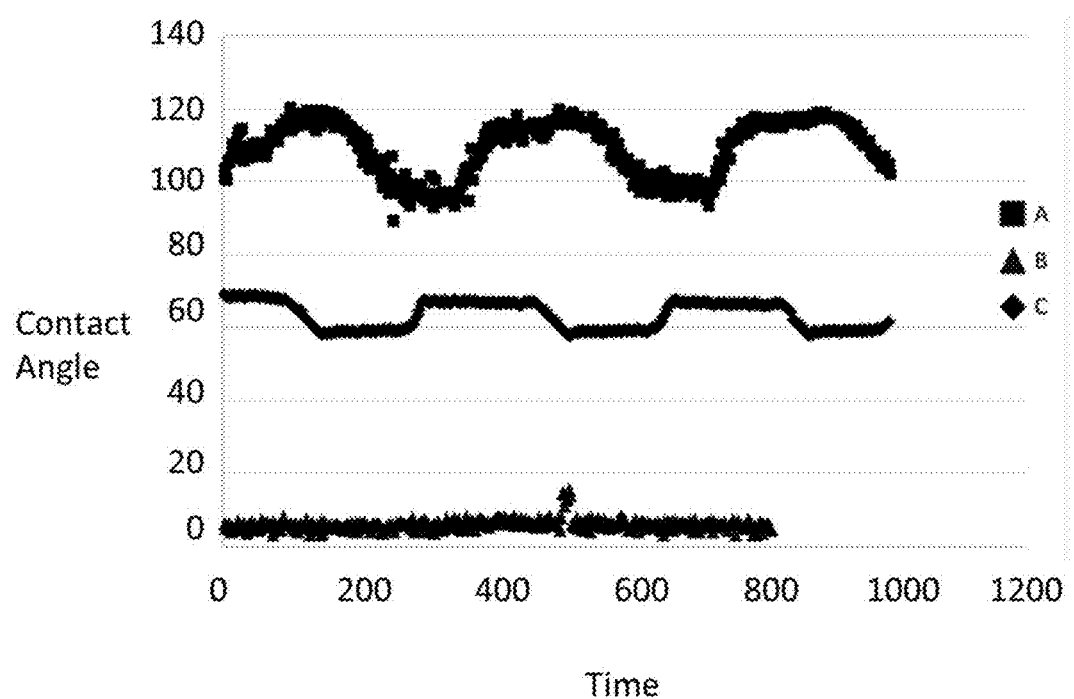
FIG. 13 is a graph of contact angles measured from the surface of a silicon dioxide surface after various steps of a differential functionalization process, the process comprising: coating the surface with a fluorosilane passive layer, patterning by selective exposure to deep UV light, and coating with a GOPS active layer. Trace A corresponds to contact angles measured after the surface was coated with a layer of fluorosilanes. Trace B corresponds to contact angles measured after the surface was exposed to deep UV light through a shadow mask. Trace C corresponds to contact angles measured after the surface was coated with GOPS.

The passively patterned surface was rinsed with water and subsequently coated with 3-glycidoxypropyltrimethoxysilane (GOPS) by vapor deposition as before (YES). The contact angle was measured at around 65 degrees. FIG. 13 is a graphical representation of the contact angles measured on the same areas of the surface after fluoro-silane coating (trace A; about 115 degrees), DUV light exposure (trace B; less than about 10 degrees) and after GOPS deposition (trace C; about 65 degrees).

Example 2: Oligonucleic Acid Synthesis Using a Differentially Functionalized Surface The structure having a differentially functionalized surface of Example 1 was used as a support for the synthesis of 50-mer oligonucleic acids. The structure was assembled into a flow cell and connected to an Applied Biosystems ABI394 DNA Synthesizer. Synthesis of the 50-mer oligonucleic acids was performed using the methods of Table 2.

TABLE 2

| General DNA Synthesis Process Name | New Process step | Time | Step # |
|---|---|---|---|
| WASH (Acetonitrile Wash Flow) | Acetonitrile System Flush | 4 | 1 |
| | Acetonitrile to Flowcell | 23 | 2 |
| | N2 System Flush | 4 | 3 |
| DNA BASE ADDITION (Phosphoramidite + Activator Flow) | Activator Manifold Flush | 1.7 | 4 |
| | Activator to Flowcell | 6 | 5 |
| | Incubate | 1 | 6 |
| | Activator + Phosphoramidite to Flowcell | 6 | 7 |
| | Activator to Flowcell | 0.5 | 8 |
| | Activator + Phosphoramidite to Flowcell | 2.5 | 9 |
| | Activator to Flowcell | 0.5 | 10 |
| | Activator + Phosphoramidite to Flowcell | 2.5 | 11 |
| | Activator to Flowcell | 0.5 | 12 |
| | Activator + Phosphoramidite to Flowcell | 2.5 | 13 |
| | Incubate for 25 sec | 25 | 14 |
| WASH (Acetonitrile Wash Flow) | Acetonitrile System Flush | 4 | 15 |
| | Acetonitrile to Flowcell | 15 | 16 |
| | N2 System Flush | 4 | 17 |
| DNA BASE ADDITION (Phosphoramidite + Activator Flow) | Activator Manifold Flush | 1.7 | 18 |
| | Activator to Flowcell | 5 | 19 |
| | Activator + Phosphoramidite to Flowcell | 12 | 20 |
| | Incubate for 25 sec | 25 | 21 |
| WASH (Acetonitrile Wash Flow) | Acetonitrile System Flush | 4 | 22 |
| | Acetonitrile to Flowcell | 15 | 23 |
| | N2 System Flush | 4 | 24 |
| | Acetonitrile System Flush | 4 | 25 |
| OXIDATION (Oxidizer Flow) | Oxidizer to Flowcell | 12 | 26 |
| WASH (Acetonitrile Wash Flow) | Acetonitrile System Flush | 4 | 27 |
| | N2 System Flush | 4 | 28 |
| | Acetonitrile System Flush | 4 | 29 |
| | Acetonitrile to Flowcell | 10 | 30 |
| | Acetonitrile System Flush | 4 | 31 |
| | Acetonitrile to Flowcell | 10 | 32 |
| | N2 System Flush | 4 | 33 |
| | Acetonitrile System Flush | 4 | 34 |
| | Acetonitrile to Flowcell | 23 | 35 |
| | N2 System Flush | 4 | 36 |
| DEBLOCKING (Deblock Flow) | Deblock to Flowcell | 30 | 37 |
| WASH (Acetonitrile Wash Flow) | Acetonitrile System Flush | 4 | 38 |
| | N2 System Flush | 4 | 39 |
| | Acetonitrile System Flush | 4 | 40 |
| | Acetonitrile to Flowcell | 12 | 41 |
| | N2 System Flush | 4 | 42 |
| | Acetonitrile System Flush | 5 | 43 |
| | Acetonitrile to Flowcell | 12 | 44 |

Figure 14:
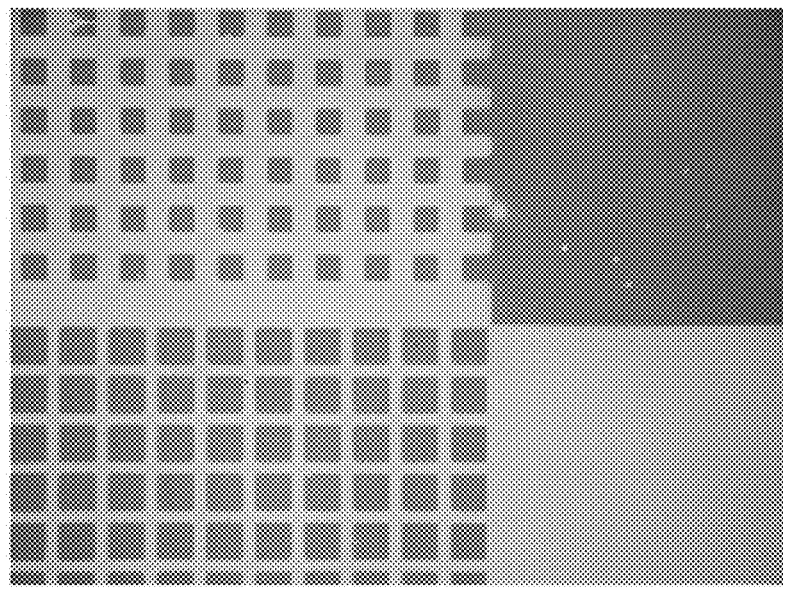
FIG. 14 is an image capture of a surface differentially functionalized with an active and a passive layer, wherein the active layer is a support for synthesized oligonucleic acids. The areas of the surface comprising synthesized oligonucleic acids appear clear while areas of the surface which are dark correspond to the passive layer.
Figure 14:
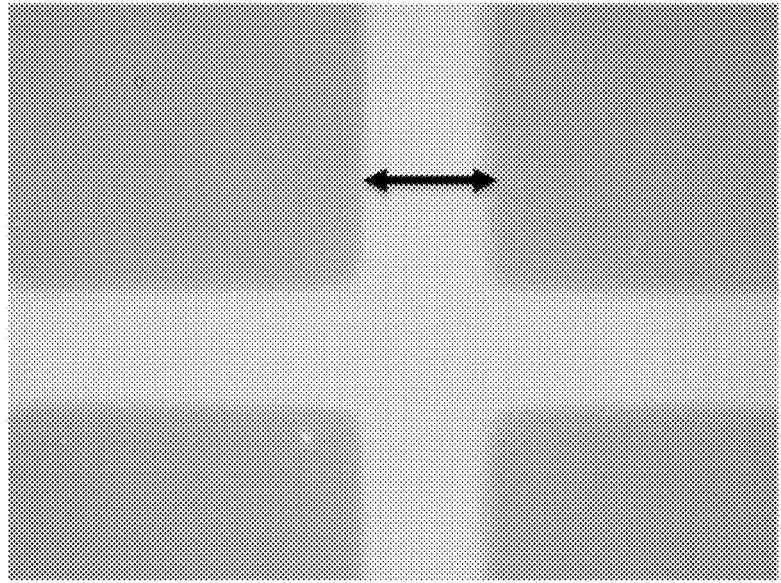

Synthesized oligonucleic acids were extracted from the surface and analyzed on a BioAnalyzer chip. Oligonucleic acid products were PCR amplified, cloned and Sanger sequenced. FIG. 14 is a digital image capture of the surface of the structure after oligonucleic acid synthesis, where the oligonucleic acid synthesis extends from layers coated with active agent. The areas of the surface comprising synthesized oligonucleic acids appear clear (oligonucleic acid synthesis occurred only on GOPS covered areas and not on fluorosilane covered areas). The areas of the surface which are dark correspond to the fluoro-silane layer that was not exposed to DUV light. FIG. 14 (part A) is a digital image capture of the surface at a 5× objective and FIG. 14 (part B) is a digital image capture of the surface at a 50× objective. The arrow in FIG. 14 (part B) indicates the width of the band at 50 um.

Example 3: Differential Functionalization of a Surface to Generate a Pattern of Distinct Loci within Clusters A structure comprising a 1000 Å layer of silicon dioxide on its top surface was differentially functionalized using a first set of molecules comprising a passive agent (an agent that lacks a reactive group for nucleoside coupling) and a second set of molecules comprising an active agent (an agent that includes an reactive group for nucleoside coupling). The top surface of the silicon surface was coated with the first set of molecules comprising (tridecafluoro-1, 1, 2, 2-tetrahydrooctyl)trichlorosilane as described in Example 1. The passively coated surface was patterned by application of DUV light to the top surface of the structure through a quartz mask with chrome patterns, where the mask was positioned on top of the structure so that only distinct regions of the top surface of the structure were exposed to the DUV light. DUV light was applied using a Hamamatsu L12530 EX-mini Compact Excimer Lamp Light Source for a total of 60 seconds at about 1 cm distance with an nitrogen gas backfill. The surface was patterned to have a plurality of clusters, with each cluster having 121 reaction sites or loci for oligonucleic acid synthesis. The passively patterned surface was rinsed with water and subsequently deposited with 3-glycidoxypropyltrimethoxysilane (GOPS) by vapor deposition as before (YES) to coat each of the loci.

Example 4: Oligonucleic Acid Synthesis on Distinct Loci of a Differentially Functionalized Surface The differentially functionalized surface of Example 3 was used as a support for the synthesis of 50-mer oligonucleic acids. The structure was assembled into a flow cell and connected to an Applied Biosystems AB1394 DNA Synthesizer. Synthesis of the 50-mer oligonucleic acids was performed using the methods of Table 2. Synthesized oligonucleic acids were extracted from the surface and analyzed on a BioAnalyzer chip. Oligonucleic acid products were PCR amplified, cloned and Sanger sequenced.

Figure 15:
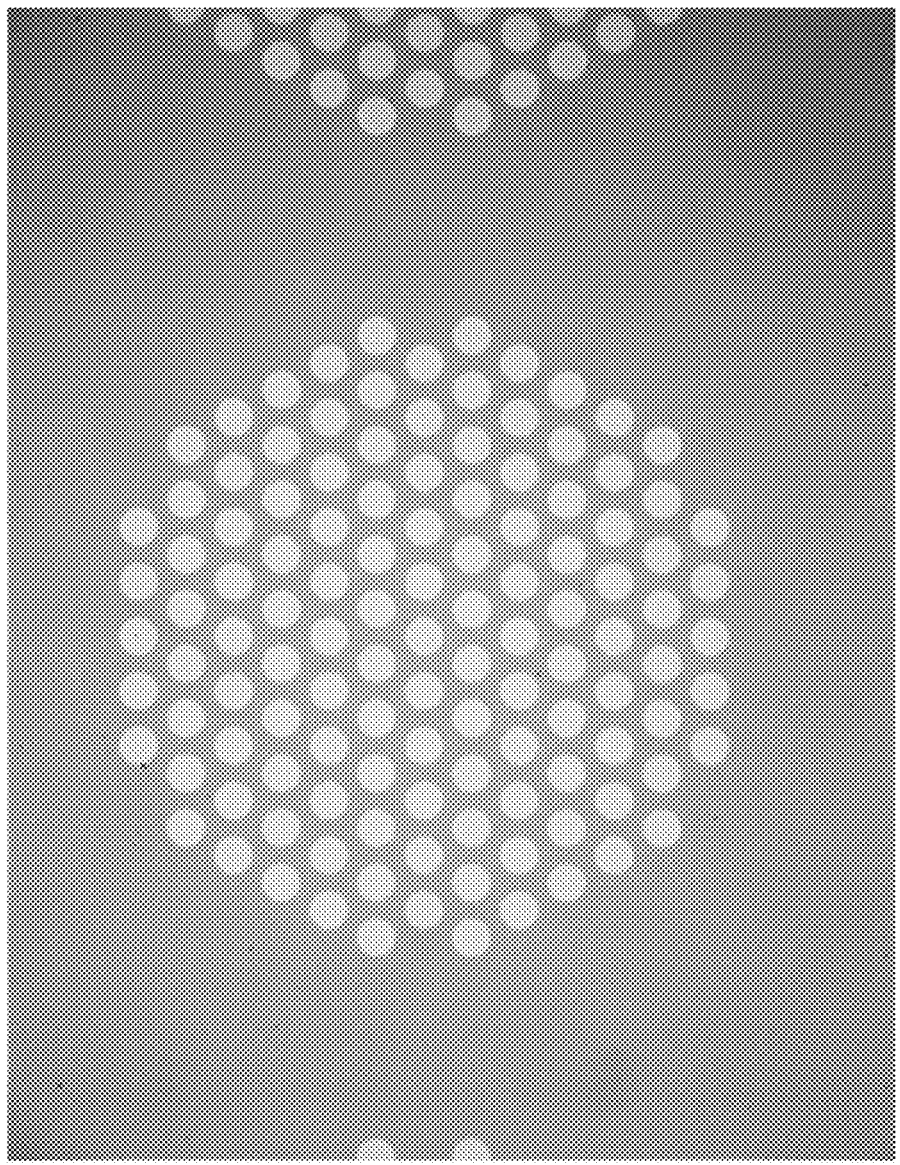
FIG. 15 is an image capture of a differentially functionalized surface after oligonucleic acid synthesis, wherein an active layer of the surface is a support for the synthesized oligonucleic acids. The areas of the surface comprising synthesized oligonucleic acids appear clear while areas of the surface which are coated with a passive layer appear dark.

FIG. 15 is a digital image capture of the surface of the structure after oligonucleic acid synthesis. The areas of the surface comprising synthesized oligonucleic acids appear clear. The areas of the surface which are dark correspond to the fluorosilane layer that was not exposed to DUV light.

Example 5: Comparison of Surface Functionalization Methods

Surfaces were differentially functionalized with an active and passive layer using a reverse photoresist process, a forward photoresist process, and a process employing deep UV light. The steps of each surface preparation method are listed in Table 3. For each method, the passive and active layers were deposited by chemical vapor deposition. Each prepared surface was used as a support for the synthesis of oligonucleic acids on areas of active functionalization.

effective contrast for measuring the sample oligonucleotides on the surface. White light was generated using a Nikon Eclipse L200 microscope.

Figure 17A:
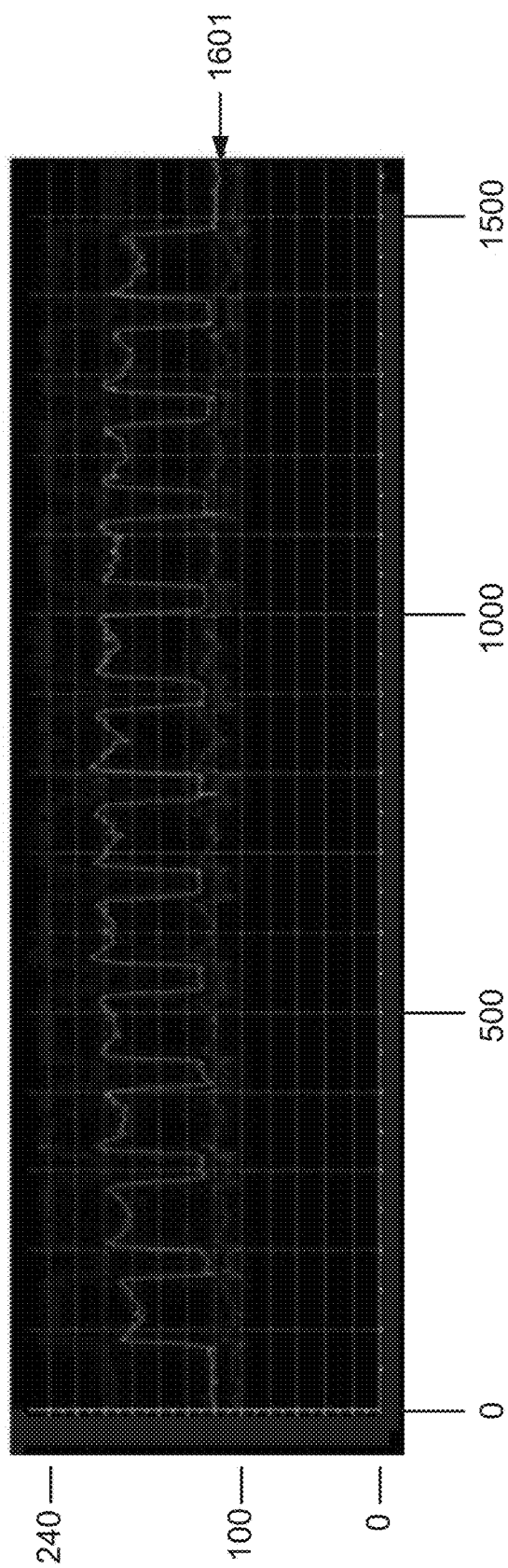
FIG. 17A is a plot of DNA intensity profiles for oligonucleic acids synthesized on a surface functionalized using a forward photoresist process as described in Example 5. The plot has a top line, a middle line, and a bottom line. Each line represents an intensity signal obtained from a different light sensor on a camera after exposure to white light. The center line corresponds to the sensor with the most effective contrast for the sample oligonucleotides on the chip.
Figure 17B:
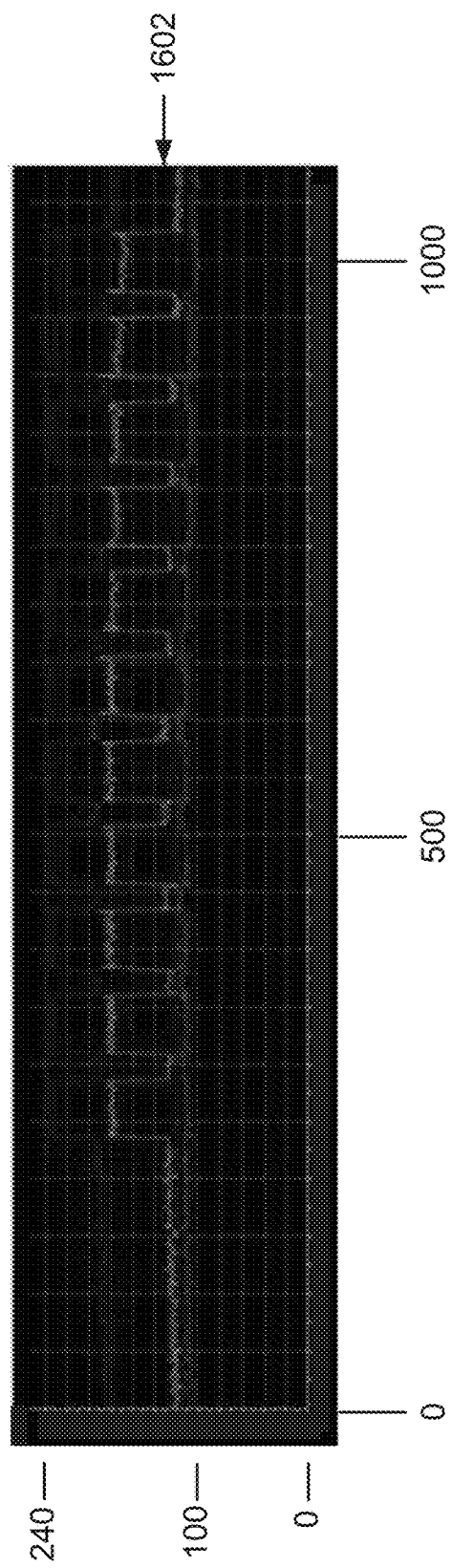
FIG. 17B is a plot of DNA intensity profiles for oligonucleic acids synthesized on a surface functionalized using a reverse photoresist process as described in Example 5. The plot has a top line, a middle line, and a bottom line. Each line represents an intensity signal obtained from a different light sensor on a camera after exposure to white light. The center line corresponds to the sensor with the most effective contrast for the sample oligonucleotides on the chip.
Figure 17C:
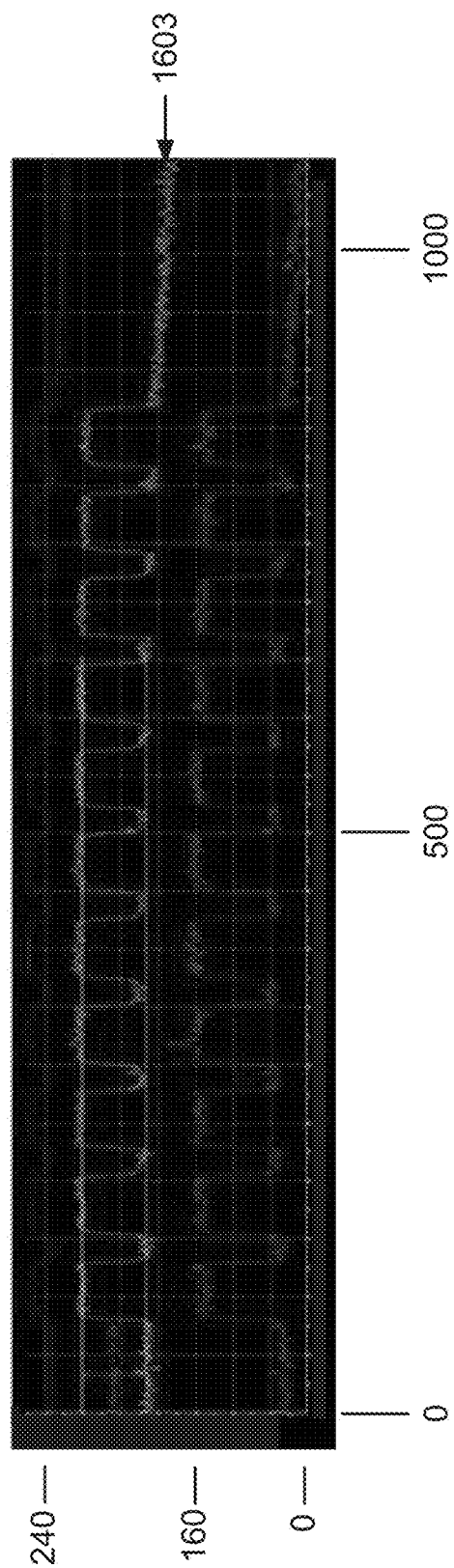
FIG. 17C is a plot of DNA intensity profiles for oligonucleic acids synthesized on a surface functionalized using a deep UV process as described in Example 5. The plot has a top line, a middle line, and a bottom line. Each line represents an intensity signal obtained from a different light sensor on a camera after exposure to white light. The center line corresponds to the sensor with the most effective contrast for the sample oligonucleotides on the chip.

FIG. 17C shows an intensity profile for oligonucleic acids synthesized on a surface functionalized using a deep UV

TABLE 3

| Reverse photoresist (PR) | Forward photoresist (PR) | Deep UV |
|---|---|---|
| 1) Wet clean (optional) | 1) Wet clean (optional) | 1) Wet clean (optional) |
| 2) Dry clean (O2 plasma) | 2) Dry clean (O2 plasma) | 2) Dry clean (O2) |
| 3) Deposition of active layer | 3) PR coat | 3) Deposition of passive layer |
| 4) PR coat | 4) PR Exposure | 4) Deep UV exposure |
| 5) PR Exposure | 5) PR development and bake | 5) Deposition of active layer |
| 6) PR development and bake | 6) Dry clean (O2) | 6) Activation of active layer |
| 7) Dry clean (O2) | 7) Deposition of passive layer | |
| 8) Deposition of passive layer | 8) PR strip | |
| 9) PR strip | 9) Deposition of active layer | |
| 10) Activation of active layer | 10) Activation of active layer | |

Figure 16:
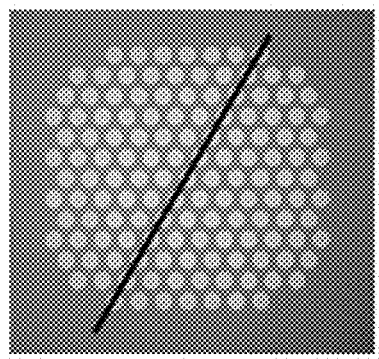
FIG. 16 shows image captures of surfaces differentially functionalized with an active and passive layer by different process steps.
Figure 16:
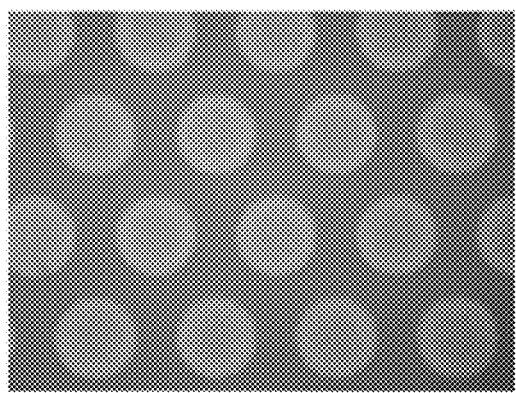
Figure 16:
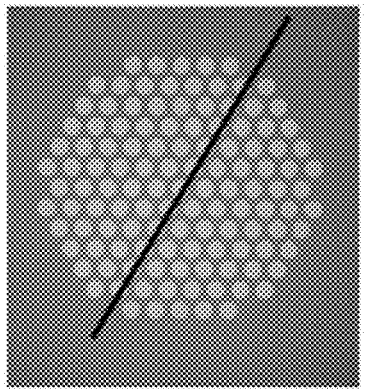
Figure 16:
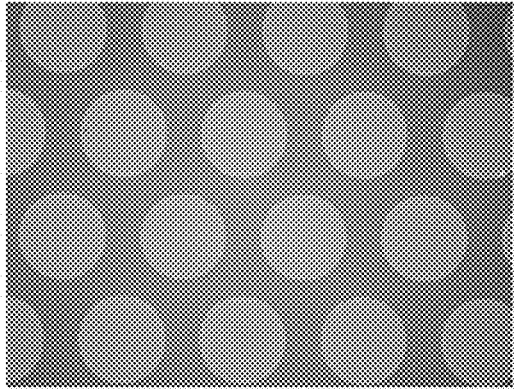
Figure 16:
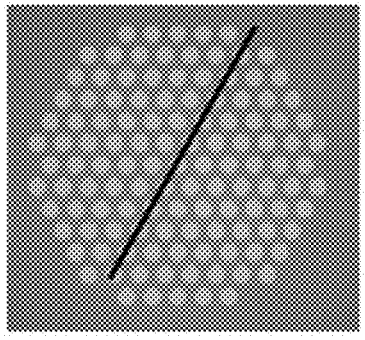
Figure 16:
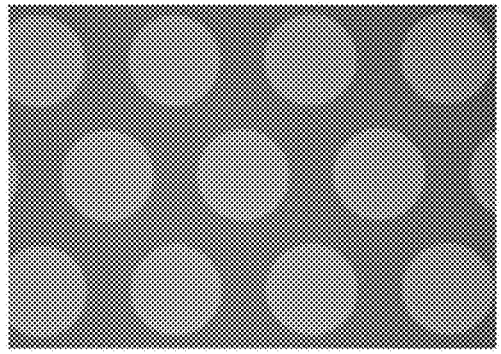

FIG. 16 shows digital image captures of surfaces differentially functionalized with an active and passive layer by the different process steps outlined in Table 3. Each photograph shows a surface after oligonucleic acid synthesis on a layer of active agent. FIG. 16 (part A) shows 10× and 50× magnifications of a surface functionalized using a forward photoresist process as described in Example 5. FIG. 16 (part B) shows 10× and 50× magnifications of a surface functionalized using a reverse photoresist process as described in Example 5. FIG. 16 (part C) shows 10× and 50× magnifications of a surface functionalized using a deep UV process as described in Example 5. In the images, areas of the surface comprising synthesized oligonucleic acids appear as clear while generally circular areas of the surface. In contrast, areas coated with the passive layer appear darker in the images.

DNA intensity profiles were generated oligonucleic acids synthesized on surfaces differentially functionalized by the various process steps outlined in Table 3. FIG. 17A shows an intensity profile for oligonucleic acids synthesized on a surface functionalized using a forward photoresist process as described in Example 5. The X axis on the plot corresponds to the distance across each locus and the Y axis on the plot corresponds to the intensity of the signal. The plot has a top line, a middle line 1601, and a bottom line, corresponding to blue, green, and red wavelength recordings using a Nikon DS Fi2 camera. Each line represents an intensity signal obtained from a different light sensor on the camera. The middle line 1601 is a recording of light emissions from about 500 nm to about 530 nm in wavelength. The middle line 1601 was resulted in generation of the most effective contrast for measuring the sample oligonucleotides on the surface. White light was generated using a Nikon Eclipse L200 microscope.

FIG. 17B shows an intensity profile for oligonucleic acids synthesized on a surface functionalized using a reverse photoresist process as described in Example 5. The X axis on the plot corresponds to the distance across each locus and the Y axis on the plot corresponds to the intensity of the signal. The plot has a top line, a middle line 1602, and a bottom line, corresponding to blue, green, and red wavelength recordings using a Nikon DS Fi2 camera. Each line represents an intensity signal obtained from a different light sensor on the camera. The middle line 1602 is a recording of light emissions from about 500 nm to about 530 nm in wavelength. The middle line 1602 was resulted in generation of the most process as described in Example 5. The X axis on the plot corresponds to the distance across each locus and the Y axis on the plot corresponds to the intensity of the signal. The plot has a top line, a middle line 1603, and a bottom line, corresponding to blue, green, and red wavelength recordings using a Nikon DS Fi2 camera. Each line represents an intensity signal obtained from a different light sensor on the camera. The middle line 1603 is a recording of light emissions from about 500 nm to about 530 nm in wavelength. The middle line 1603 was resulted in generation of the most effective contrast for measuring the sample oligonucleotides on the surface. White light was generated using a Nikon Eclipse L200 microscope.

In the forward resist process, the photoresist (PR) was coated prior to active layer coating. In the reverse process, PR was deposited after active layer coating and residues remaining on the surface created a non-homogeneous layer of synthesized oligonucleic acids. The surface patterned with deep UV had the highest percentage of uniformity among synthesized oligonucleic acid strands. The percentage of non-uniformity was about 31% for the reverse PR process, about 39% for the forward PR process, and about 23% for the deep UV process (and likewise the percent of uniformity was about 69% for the reverse PR process, about 61% for the forward PR process, and about 77% for the deep UV process). The non-uniformity was calculated by dividing the amplitude of signal variation by the total signal intensity. As shown in the trace highlighted in FIGS. 17A-17C, the signal variation was greater for oligonucleic acids synthesized on surfaces prepared using the forward and reverse photoresist processes than for the oligonucleic acids synthesized on surfaces prepared using the deep UV process.

Example 6: Patterning a Functionalized Material on a Surface

Figure 21:
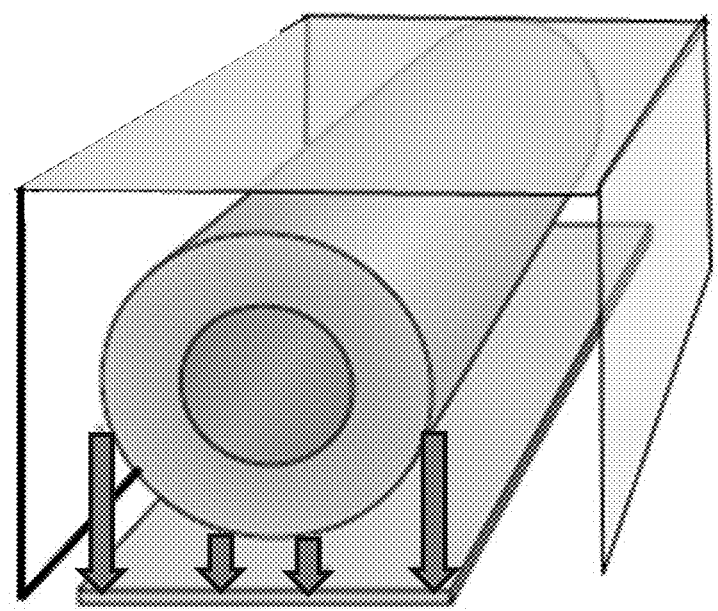
FIG. 21 shows a cylindrical lamp, similar to an Ushio lamp, having a distance between the lamp and the chip that is closer at the center than at either edge.

A patterned functionalized surface was created on fluorinated silicon plates using a Ushio MinExcimer deep UV (DUV) lamp (FIG. 21) and quartz mask with Suss MA-6 mask aligner. The quartz mask allows some of the UV light to go through at 172 nm. A chrome or dielectric cover is used to create shadows on the chip. The mask was held in place by loading the mask into the mask aligner and the vision system was aligned on the alignment fiducial of the mask. The chip was loaded into the alignment system and the mask was aligned over the chip using screws on the mask aligner and visualizing the chip and the mask with a microscope. A controlled atmosphere was created between the mask and the substrate using a backfill of nitrogen gas. The mask was then brought into close contact with the chip. Once the mask was aligned correctly over the chip, the microscope was removed and the DUV lamp was moved into place over the mask. A controlled atmosphere was also created between the mask and the lamp using nitrogen backfill. DUV light was applied to activate the chip surface chemistry. The chip was exposed to DUV for about 100 seconds using the Ushio MinExcimer lamp, providing approximately 10 mW/cm$^2$. Ozone created by the low wavelength light was purged using the nitrogen backfill and ozone exhaust. After DUV exposure, 3-glycidoxypropyltrimethoxysilane (GOPS) was deposited onto the surface of the chip and the surface was activated for DNA synthesis.

Figure 18:
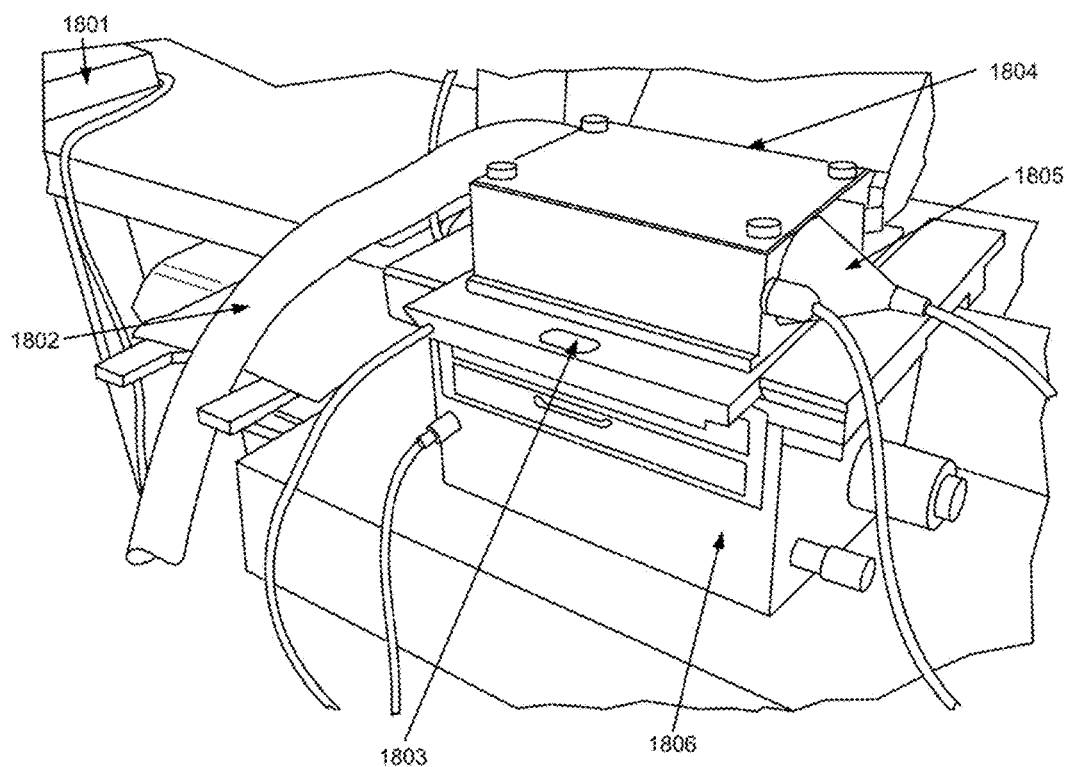
FIG. 18 shows an exemplary setup for the functionalization of a surface with two different coating materials patterned using EMR.
Figure 19:
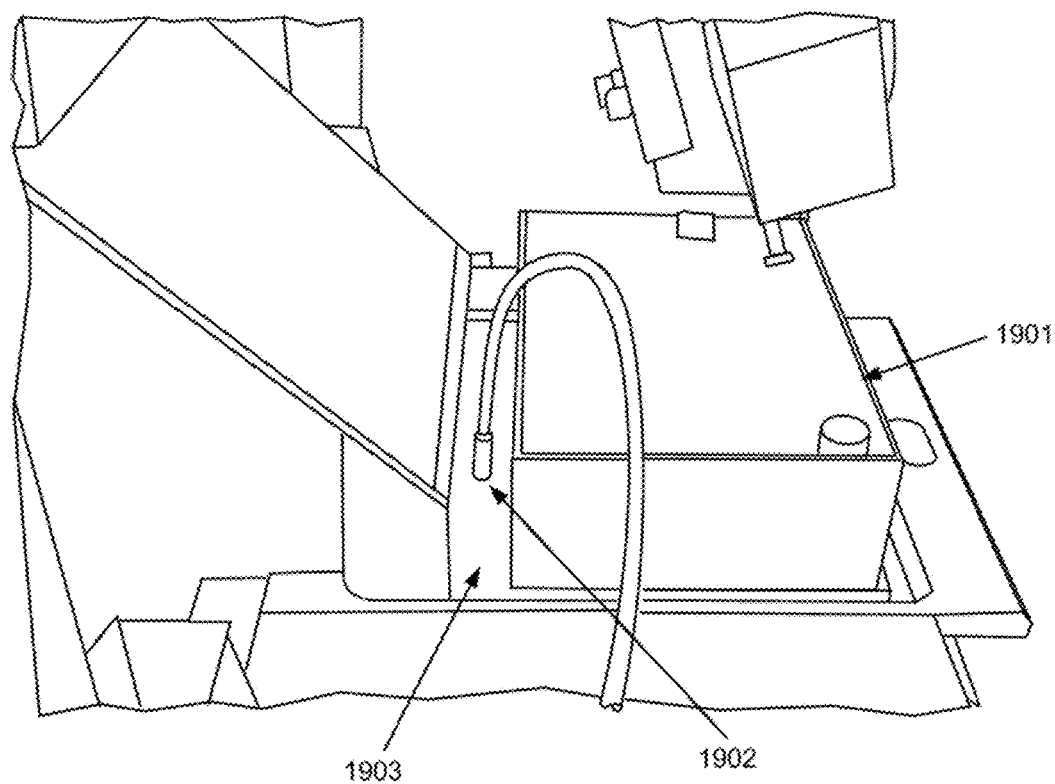
FIG. 19 shows an alternative view of the exemplary setup in FIG. 18.

The apparatus used for patterning is shown in FIGS. 18-19. FIG. 18 depicts a lamp power unit 1801 which powers the illumination unit 1804 which provides the DUV light. The mask his held in the mask holder 1803. Ozone is eliminated from the system using a nitrogen backfill 1805 and an ozone exhaust 1802. In some instances, the ozone exhaust 1702 is optional. FIG. 19 depicts an illumination unit 1901, a plate with window 1903 for location of the illumination unit on the modified mask plate, and a nitrogen backfill for the space between the light source and the mask 1902. A tubing loop with punched holes blowing nitrogen is introduced around the substrate during loading, alignment and exposure to remove oxygen and prevent ozone formation around the exposed area.

Figure 22:
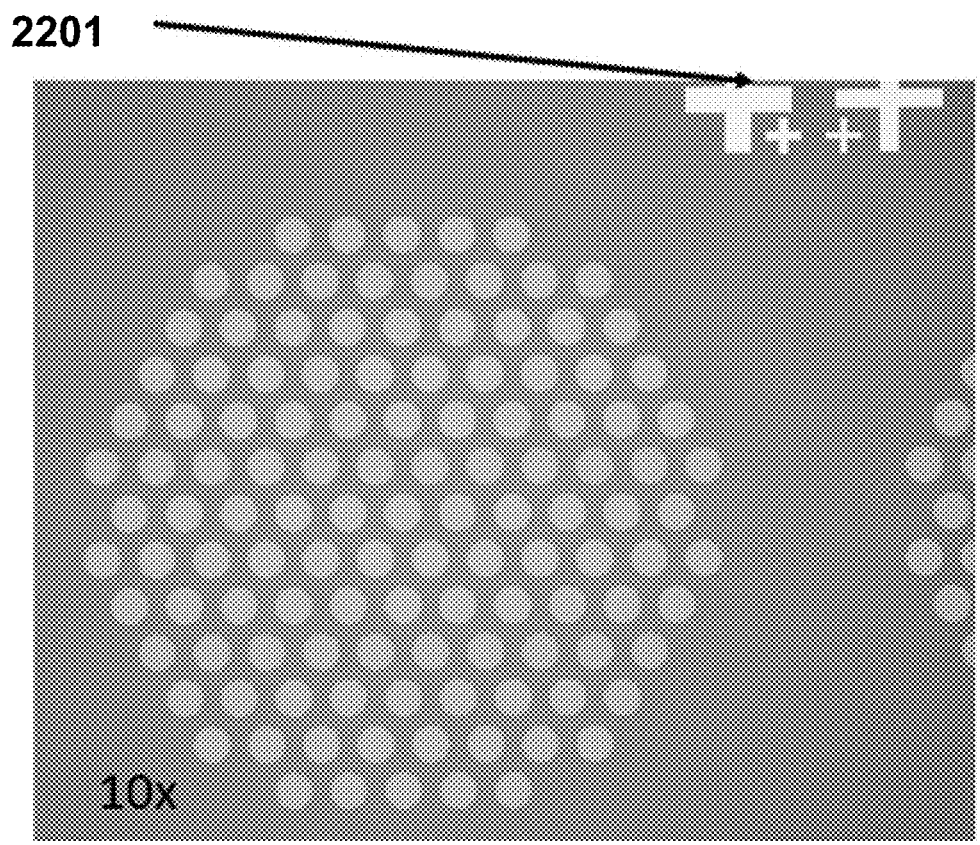
FIG. 22 shows a chip after writer synthesis of oligonucleotides extending form 121 discrete loci. In this view of the chip, the alignment is shown on the chip's fiducials 2101.

Alignment of the loci was confirmed using fiducials 2201. (FIG. 22) The diameter of the loci after the process was completed varied from about 51 μm to about 58 μm. This variation in loci diameter was observed over the surface of the chip with differences observed between the center of the chip and the edges of the chip. DNA yield and quality (error rate) on the surface was determined to be similar to standard chips (data not shown). NGS was done on the DNA spots and an error rate was determined to be similar to that observed with standard chips.

In a separate run, surfaces were prepared using the cylinder UV lamp in pattern for extending oligonucleic acids in parallel lines on the surface. Oligonucleic acid extension was observed wherein each line was about 3 um in width, and having a 6 um pitch (image capture not shown). Measurements for line width in one image capture included 2.90 um, 3.08 um, and 2.71 um.

Example 7: Patterning a Surface Using a Flat Lamp

Figure 20:
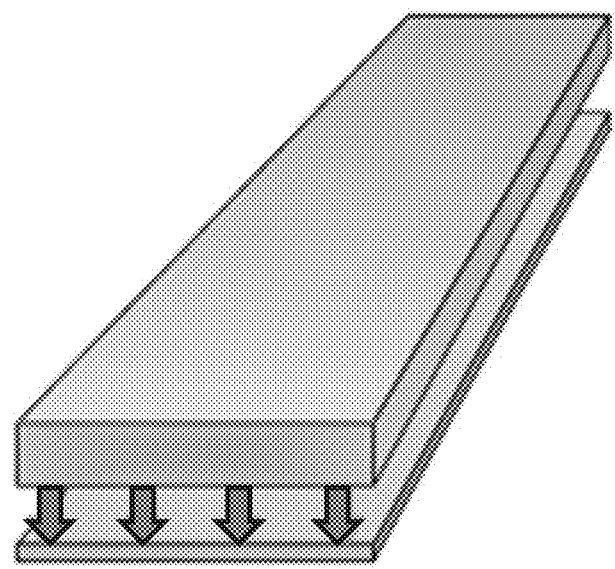
FIG. 20 shows a flat lamp having a distance between the lamp and the chip that is equidistant over the entire surface.

A patterned functionalized surface was created on a fluorinated silicon dioxide coated plate using a flat ultra violet lamp (Hamamatsu deep UV (DUV) lamp, FIG. 20) and quartz mask with a mask aligner. The quartz mask allows UV light to go through at 172 nm. The lamp has a flat shape that allows the surface to be exposed to the DUV light with increased uniformity across the plate surface. The mask is held in place by loading the mask into the mask aligner and the vision system is aligned on the alignment fiducial of the mask. The plate is loaded into the alignment system and the mask is aligned over the chip using screws on the mask aligner and visualizing the plate and the mask with a microscope. A controlled atmosphere is created between the mask and the substrate using a purge combined with a backfill of nitrogen gas. The mask is then brought into close contact with the chip. Once the mask is aligned correctly over the chip, the microscope is removed and the DUV lamp is moved into place over the mask. A controlled atmosphere is also created between the mask and the lamp using the purge and nitrogen backfill. DUV light is applied to activate the chip surface chemistry. The chip is exposed to DUV for about 20 seconds using the lamp, providing approximately 50 mW/cm$^2$. Ozone created by the low wavelength light is purged using the nitrogen backfill and ozone exhaust.

Figure 23:
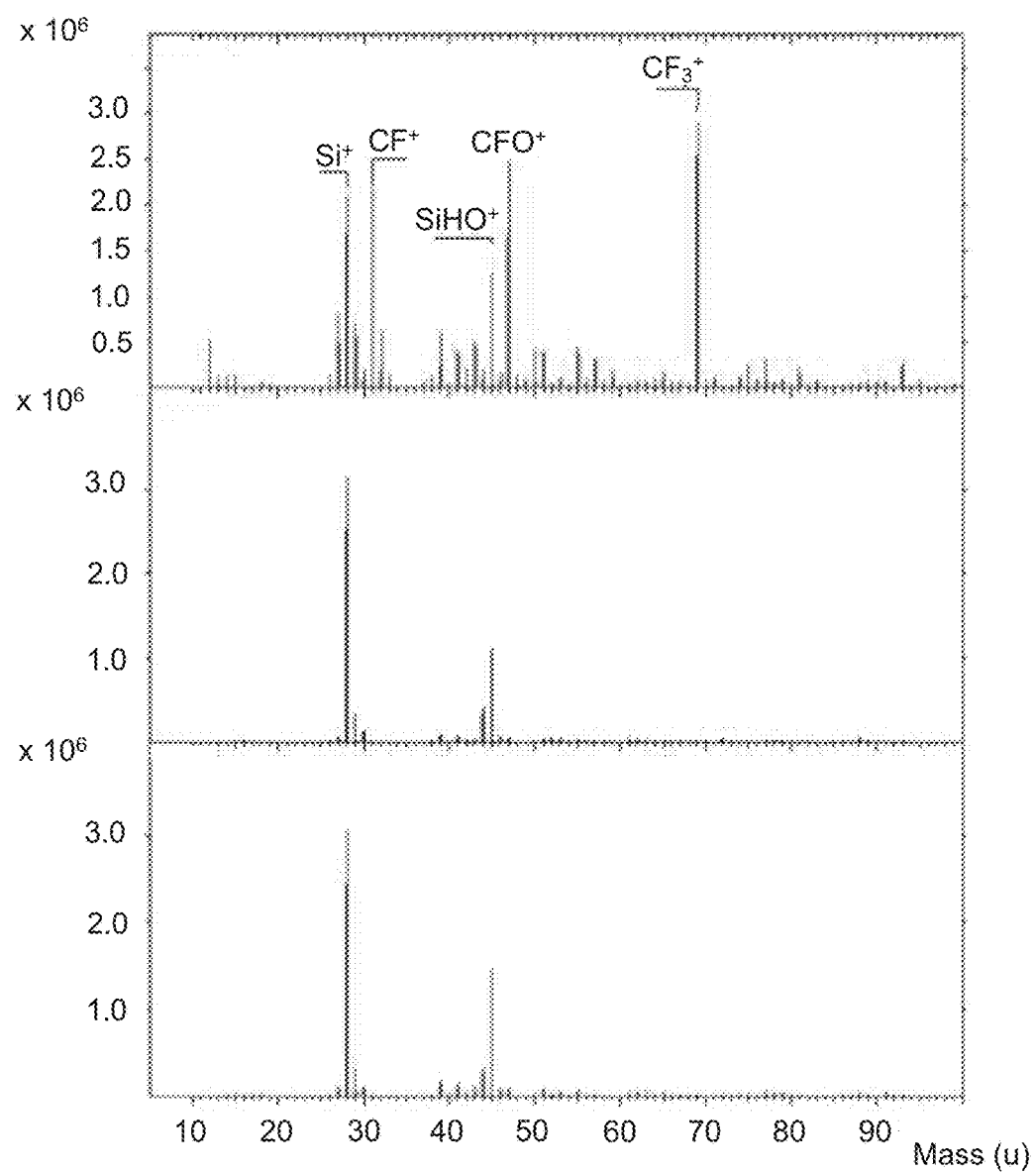
FIG. 23 depicts plots from a TOF-SIMS analysis of an area 150 um×150 um of a silicon dioxide chip (bottom), with a flourosilane coating (top), and after DUV removal of the functional group (middle). The Y axis is for Intensity counts and the X axis is for Mass (u).

A TOF-SIMS analysis of an area 150 um×150 um was performed to analyze surface chemistry. Referring to FIG. 23, the bottom chart is a background reference reading from a silicon dioxide coated plate; the top chart is a reading from a silicon dioxide coated plate having fluorosilane layer coated on top; and the middle chart is a reading taken after DUV exposure to a previously fluorinated section of the chip. As can be seen in the chart, fluorosilane is not detected in the DUV treated section. The X axis is for Intensity counts and the Y axis is for Mass (u).

Example 8: Patterning Oligonucleic Acids on a Surface

A SOI wafer is provided and prepared prior to application of a set of molecules by a wet or dry cleaning process. The wafer is deposited with 3-glycidoxypropyltrimethoxysilane (GOPS) and nucleotide extension reactions are performed to extend from the surface oligonucleic acids at least 20 bases in length. A protecting group having a trityl group is applied to the terminal end of the oligonucleic acids. The layer of active agent and oligonucleic acid platform is subsequently patterned by removing the layers from defined regions of the surface via exposure to EMR at 172 nm. A shadow mask is positioned over the surface so that only the defined regions are exposed to EMR through openings in the shadow mask. The layer of active agent and platform oligonucleic acids coated on the exposed regions of the surface is cleaved from the surface and washed away with a wash solution. After the surface is patterned, the exposed regions of the surface are exposed to tridecafluoro-1,1,2,2-tetrahydrooctyl)trichlorosilane or tridecafluoro-1,1,2,2-tetrahydrooctyl)trimethoxysilane. The platform oligonucleic acids de-protected and extension of a predetermined sequence of oligonucleic acids 100 bases in length is performed. The resultant surface will comprise a cluster of loci within a diameter of 1.15 mm wherein each loci has a width of 10 um. The loci each comprise an oligonucleic acid which is different from that extending on another locus. Each cluster will comprise about 121 loci and the loci will collectively encode predetermined sequence for a single preselected nucleic acid, e.g., a gene.

Example 9: Patterning a Surface Using a Large Flat Lamp

A patterned functionalized surface is created on a fluorinated silicon plate using a flat ultra violet lamp (Quark deep UV (DUV) lamp) and quartz mask with a mask aligner. The quartz mask allows UV light to go through at 172 nm. A chrome or dielectric cover is used to create shadows on the chip. The lamp has a flat shape that allows the surface to be exposed to the DUV light with increased uniformity across the chip surface over an increased surface area. The mask is held in place by loading the mask into the mask aligner and the vision system is aligned on the alignment fiducial of the mask. The plate is loaded into the alignment system and the mask is aligned over the chip using screws on the mask aligner and visualizing the chip and the mask with a microscope. A controlled atmosphere is created between the mask and the substrate using a purge combined with a backfill of nitrogen gas. The mask is then brought into close contact with the chip. Once the mask is aligned correctly over the chip, the microscope is removed and the DUV lamp is moved into place over the mask. A controlled atmosphere is also created between the mask and the lamp using the purge and nitrogen backfill. DUV light is applied to activate the chip surface chemistry. The chip is exposed to DUV for about 35 seconds using the lamp, providing approximately 30 mW/cm$^2$. Ozone created by the low wavelength light is purged using the nitrogen backfill and ozone exhaust. After DUV exposure, 3-glycidoxypropyltrimethoxysilane (GOPS) is deposited onto the surface of the chip and the surface is activated for DNA synthesis.

Example 10: Patterning a Surface Using a Laser

A patterned functionalized surface is created on a fluorinated silicon plate using a laser. The plate is aligned to a reference to guide the laser and a controlled atmosphere is created between the plate and the laser using a purge and nitrogen backfill system. The laser is applied using pulses while moving the chip synchronized with the laser pulses to create a pattern of exposed areas on the chip to activate the chip surface chemistry. After DUV exposure, 3-glycidoxypropyltrimethoxysilane (GOPS) is deposited onto the surface of the chip and the surface is activated for DNA synthesis.

Example 11: Preparing a Nylon Substrate

A nylon surface is created using a molecular layer deposition of nylon for functionalization and nucleic acid synthesis. A nylon film is deposited on a tape made from another synthetic material. (Alternatively, a nylon tape or silicon wafer is used.) The surface is then dosed with glutaryl chloride for 10 seconds (room temperature ampoule, 10 sccm N$_2$ carrier). The surface is purged 5 Torr N$_2$ for 20 seconds, evacuated for 5 seconds, purged 5 Torr N$_2$ for 20 seconds, and evacuated for 5 seconds. The surface is then dosed with ethylenediamine for 5 seconds (room temperature ampoule, 0 sccm N$_2$ carrier). The surface is purged 5 Torr N$_2$ for 20 seconds, evacuated for 5 seconds, purged 5 Torr N$_2$ for 20 seconds, and evacuated for 5 seconds. These steps are repeated for 30 cycles.

Example 12: Patterning a Nylon Surface Using a Flat Lamp

A patterned functionalized nylon is exposed to emissions from a flat UV lamp, a Hamamatsu deep UV (DUV) lamp, and quartz mask with mask aligner. The quartz mask allows UV light to go through at 172 nm. A chrome or dielectric cover is used to create shadows on the tape. The Hamamatsu lamp has a flat shape that allows the surface to be exposed to the DUV light with increased uniformity across the chip surface. The mask is held in place by the mask aligner and aligned over the tape using screws on the mask aligner and visualizing the chip and the mask with a microscope. Once the mask is aligned correctly over the chip, the microscope is removed and the DUV lamp is moved into place over the mask. DUV light is applied to activate the chip surface chemistry. After DUV exposure, the surface is activated for DNA synthesis. Increased DNA yields are observed using the nylon surface than those observed using a two-layered surface.

Example 13: Patterning a Nylon Surface Using a Laser

A patterned functionalized surface is created on a nylon flexible surface using a laser. The nylon flexible surface is aligned to a reference to guide the laser and a controlled atmosphere was created between the tape and the laser using a purge and nitrogen backfill system. The laser is applied using pulses while moving the tape synchronized with the laser pulses to create a pattern of exposed areas on the tape to activate the chip surface chemistry. After DUV exposure, the surface is activated for DNA synthesis.

Example 14: Patterning Passive Agent Using Microcontact Printing

Polydimethylsiloxane (PDMS) stamps are made using a UV photolithography process. A silicon wafer coated with photoresist is exposed to UV light through a mask, creating a pattern on the silicon wafer. The exposed wafer is then exposed to a solution of developer creating a master which is used to cast the PDMS stamp. The PDMS prepolymer is mixed with a curing agent and poured onto the prepared master. The cured stamp is then peeled from the template and is ready for inking. The finished stamp is about 100 μm to about 1 cm thick and the raised portions of the stamp range from about 1 μm to about 500 μm.

Stamps are inked with a solution containing a passive agent, tridecafluoro-1, 1, 2, 2-tetrahydrooctyl)trichlorosilane. After inking, the passive agent solution is transferred to a silicon plate. Care is taken to not deform the stamp while stamping the microchip. Each inked stamp is used to pattern three microchips before reloading the stamp.

Example 15: Patterning Active Agent Using Microcontact Printing

Polydimethylsiloxane (PDMS) stamps are made using a UV photolithography process. A silicon wafer coated with photoresist is exposed to UV light through a mask, creating a pattern on the silicon wafer. The exposed wafer is then exposed to a solution of developer creating a master which is used to cast the PDMS stamp. The PDMS prepolymer is mixed with a curing agent and poured onto the prepared master. The cured stamp is then peeled from the template and is ready for inking. The finished stamp is about 100 μm to about 1 cm thick and the raised portions of the stamp range from about 1 μm to about 500 μm. Stamps are inked with a solution containing an active agent, 3-glycidoxypropyltrimethoxysilane (GOPS). After inking, the active agent solution is transferred to a silicon plate. Care is taken to not deform the stamp while stamping the microchip. Each inked stamp is used to pattern three microchips before reloading the stamp.

Example 16: Gene Assembly Using PCA from Reaction Mixtures Transferred from a Device for Oligonucleotide Synthesis A PCA reaction mixture is prepared as described in Table 4 using a population of oligonucleic acids synthesized using the protocol of Example 2 and surface preparation procedures consistent with EMR based protocols in Examples 3-14.

TABLE 4

| PCA | 1 (x100 ul) | final conc. |
|---|---|---|
| H2O | 62.00 | |
| 5x Q5 buffer | 20.00 | 1x |
| 10 mM dNTP | 1.00 | 100 uM |
| BSA 20 mg/ml | 5.00 | 1 mg/ml |
| Oligo mix 50 nM each | 10.00 | 5 nM |
| Q5 pol 2 U/ul | 2.00 | 2u/50 ul |

Drops of about 400 nL were dispensed using a Mantis dispenser (Formulatrix, MA) on top of a cluster of loci which have been cleaved from the surface. A nanoreactor is chip is manually mated with the oligonucleotide device to pick up the droplets having the PCA reaction mixture. The droplets are picked up into the individual nanoreactors in the nanoreactor chip by releasing the nanoreactor from the oligonucleotide synthesis device immediately after pick-up. The nanoreactors are sealed with a Heat Sealing Film/Tape cover (Eppendorf) and placed in a suitably configured thermocycler that is constructed using a thermocycler kit (OpenPCR).

Alternatively, a pin-based system is used to contact a cluster of loci which have been cleaved from the surface. In such an arrangement, a pin having water on the tip contacts a cluster, transfers it to a well in a plate, such as a 96 or 384 well plate having PCA buffer in each well.

The following temperature protocol is used on the thermocycler:

1 cycle: 98 C, 45 seconds
40 cycles: 98 C, 15 seconds; 63 C, 45 seconds; 72 C, 60 seconds;
1 cycle: 72 C, 5 minutes
1 cycle: 4 C, hold An aliquot of 0.50 ul is collected from individual wells and the aliquots are amplified in plastic tubes, in a PCR reaction mixture (Table 5) and according to the following thermocycler program, using a forward and a reverse primer:

Thermocycler:
1 cycle: 98 C, 30 seconds
30 cycles: 98 C, 7 seconds; 63 C, 30 seconds; 72 C, 90 seconds
1 cycle: 72 C, 5 minutes
1 cycle: 4 C, hold

TABLE 5

| PCR | 1 (x25 ul) | final conc. |
|---|---|---|
| H2O | 17.50 | |
| 5x Q5 buffer | 5.00 | 1x |
| 10 mM dNTP | 0.50 | 200 uM |
| F-primer 20 uM | 0.63 | 0.5 uM |
| R-primer 20 uM | 0.63 | 0.5 uM |
| BSA 20 mg/ml | 0.00 | |
| Q5 pol 2 U/ul | 0.25 | 1u/50 ul |
| template (PCA assembly) | 0.50 | 1 ul/50 ul rxn |

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for surface patterning, the method comprising:
applying a first set of molecules to a surface of a structure, wherein each of the first set of molecules binds to the surface and lacks a reactive group capable of binding to a nucleo side;
applying electromagnetic radiation (EMR) to predetermined regions of the surface, wherein the EMR comprises a wavelength from about 100 nm to about 300 nm, wherein application of the EMR results in removal of the first set of molecules at the predetermined regions, thereby defining different loci for oligonucleotide extension; and
synthesizing a plurality of oligonucleotides, wherein each oligonucleotide extends from a different locus, and wherein the different loci are at least about 75% uniform when measured by calculating amplitude of signal variation for oligonucleotides extending from each locus divided by total signal intensity following white light illumination using an optical microscope.

2. The method of claim 1, wherein greater than about 90% of the first set of molecules are removed at the predetermined regions of the surface following application of EMR.

3. The method of claim 1, wherein about 100% of the first set of molecules are removed at the predetermined regions of the surface following application of EMR.

4. The method of claim 1, wherein the predetermined regions have a width of about 1 um to about 500 um.

5. The method of claim 1, wherein the first set of molecules comprises a fluorosilane.

6. The method of claim 1, wherein the first set of molecules comprises perfluorooctyltrichlorosilane, (tridecafluoro-1,1,2,2-tetrahydrooctyl)trichlorosilane, or tridecafluoro-1,1,2,2-tetrahydrooctyl)trimethoxysilane.

7. The method of claim 1, further comprising applying a second set of molecules to the surface after application of the EMR, wherein each of the second set of molecules binds to the predetermined regions of the surface and comprises the reactive group capable of binding to a nucleoside.

8. The method of claim 7, wherein the second set of molecules comprises an aminosilane.

9. The method of claim 7, wherein the second set of molecules comprises N-(3-triethoxysilylpropyl)-4-hydroxybutyramide (HAPS), 11-acetoxyundecyltriethoxysilane, n-decyltriethoxysilane, (3-aminopropyl)trimethoxysilane, (3-aminopropyl)triethoxysilane, 3-glycidoxypropyltrimethoxysilane (GOPS), or 3-iodo-propyltrimethoxysilane.

10. The method of claim 1, wherein each of the oligonucleotides comprises about 25 bases to about 2 kb in length.

11. The method of claim 1, wherein the oligonucleotides extending from each locus are about 80% uniform when measured by calculating amplitude of signal variation for oligonucleotides extending from each locus divided by total signal intensity following white light illumination using an optical microscope.

12. The method of claim 1, wherein the EMR comprises a wavelength from about 150 nm to about 200 nm.

13. The method of claim 1, wherein the EMR comprises has a wavelength of about 172 nm.

14. The method of claim 1, wherein the surface is substantially planar.

15. The method of claim 1, wherein the surface comprises microstructures.

16. The method of claim 15, wherein the microstructures comprise channels or wells.

17. The method of claim 1, wherein the EMR is emitted from a lamp or a laser.

18. The method of claim 17, wherein the lamp comprises an emission source in a shape of a cylinder or a flat panel.

19. The method of claim 1, wherein the structure is a plate, tape, or belt.

20. A method for gene synthesis, the method comprising:
providing predetermined sequences for a plurality of oligonucleotides, wherein the plurality of oligonucleotides collectively encode for a plurality of genes;
providing a surface for oligonucleotide synthesis;
synthesizing the plurality of oligonucleotides from the surface, wherein each oligonucleotide extends from a different locus, and wherein the different loci are at least about 75% uniform when measured by calculating amplitude of signal variation for oligonucleotides extending from each locus divided by total signal intensity following white light illumination using an optical microscope; and
assembling the plurality of genes from the plurality of oligonucleotides.

21. The method of claim 20, further comprising, prior to synthesizing:
providing the surface for oligonucleotide synthesis, wherein the surface comprises a first set of molecules, wherein each of the first set of molecules lacks a reactive group capable of binding to a nucleoside;
applying electromagnetic radiation (EMR) to predetermined regions of the surface, wherein the EMR comprises a wavelength from about 100 nm to about 300 nm, wherein application of the EMR results in removal of the first set of molecules at the predetermined regions, thereby defining loci for oligonucleotide extension.

* * * * *

UNITED STATES PATENT AND TRADEMARK OFFICE
CERTIFICATE OF CORRECTION

PATENT NO. : 9,895,673 B2  
APPLICATION NO. : 15/365826  
DATED : February 20, 2018  
INVENTOR(S) : Bill James Peck et al.

Page 1 of 1

It is certified that error appears in the above-identified patent and that said Letters Patent is hereby corrected as shown below:

In the Claims

Column 48, Line 64, Claim 13, the portion "wherein the EMR comprises has a wavelength of about 172 nm." should read -- wherein the EMR comprises a wavelength of about 172 nm. --

Signed and Sealed this  
Thirtieth Day of July, 2019

Andrei Iancu  
*Director of the United States Patent and Trademark Office*